US009367631B2

(12) United States Patent
Hern et al.

(10) Patent No.: US 9,367,631 B2
(45) Date of Patent: Jun. 14, 2016

(54) DYNAMIC DIRECTORY AND CONTENT COMMUNICATION

(71) Applicant: Personally, Inc., Del Mar, CA (US)

(72) Inventors: Alexander Hern, Del Mar, CA (US); William Dean Kosage, Encinitas, CA (US)

(73) Assignee: REVOLUTION TECHNOLOGIES, INC., Del Mar, CA (US)

( * ) Notice: Subject to any disclaimer, the term of this patent is extended or adjusted under 35 U.S.C. 154(b) by 0 days.

(21) Appl. No.: 14/689,799

(22) Filed: Apr. 17, 2015

(65) Prior Publication Data

US 2015/0302098 A1 Oct. 22, 2015

Related U.S. Application Data

(60) Provisional application No. 62/024,907, filed on Jul. 15, 2014, provisional application No. 61/981,665, filed on Apr. 18, 2014.

(51) Int. Cl.
*G06F 7/00* (2006.01)
*G06F 17/30* (2006.01)
*G06F 21/41* (2013.01)
*G06F 21/62* (2013.01)

(52) U.S. Cl.
CPC .......... *G06F 17/30867* (2013.01); *G06F 21/41* (2013.01); *G06F 21/6218* (2013.01)

(58) Field of Classification Search
None
See application file for complete search history.

(56) References Cited

U.S. PATENT DOCUMENTS

| 7,668,821 | B1 | 2/2010 | Donsbach et al. |
| 7,970,868 | B2 | 6/2011 | Garg et al. |
| 8,095,574 | B2 * | 1/2012 | Boyer ............... G06F 17/30893 707/805 |
| 8,316,000 | B2 | 11/2012 | Srivastava et al. |
| 8,340,275 | B1 | 12/2012 | Brandwine et al. |

(Continued)

FOREIGN PATENT DOCUMENTS

| KR | 10-2001-0094138 | 10/2001 |
| KR | 10-2002-0077546 | 10/2002 |

(Continued)

OTHER PUBLICATIONS

Herrell, Elizabeth. "Chat Enhancements Optimize Customers' Web Experience." Communication Initiatives. http://www.avaya.com/usa/resource/assets/whitepapers/AvayaReportOptimizeCustomers-WebExperiencewithAutomatedChat.pdf. 9 pages. Mar. 2013.

(Continued)

*Primary Examiner* — Hexing Liu
(74) *Attorney, Agent, or Firm* — Knobbe Martens Olson & Bear LLP

(57) ABSTRACT

Features for dynamic directory and content communication are described which provide bidirectionally optimize searches for users and/or content. One type of message which may be associated with a contact is a private descriptor identifying how the user wishes to identify the contact (e.g., other user). Other users of the system will not see this tag. Accordingly, when the user who provided the tag submits a search, the tag will be considered as part of the search. A global or public descriptor may also be associated with the contact. The public descriptor is added to the system by the contact and indicates how the contact wants the world to find and view him. All users of the system will see this tag. The public and private descriptors are used by a search engine to dynamically optimize searches conducted therewith.

16 Claims, 30 Drawing Sheets

(56) References Cited

U.S. PATENT DOCUMENTS

| | | | | |
|---|---|---|---|---|
| 8,484,191 | B2* | 7/2013 | Maghoul | G06F 17/30867 707/707 |
| 8,515,936 | B2* | 8/2013 | Hansen | G06F 17/3087 707/706 |
| 8,554,783 | B2* | 10/2013 | Safo | G06F 17/30722 707/765 |
| 8,560,565 | B2* | 10/2013 | Howard | G06T 11/60 707/769 |
| 8,606,297 | B1 | 12/2013 | Simkhai et al. | |
| 2002/0120554 | A1 | 8/2002 | Vega | |
| 2006/0161599 | A1 | 7/2006 | Rosen | |
| 2007/0219901 | A1 | 9/2007 | Garbow et al. | |
| 2008/0019353 | A1* | 1/2008 | Foote | H04L 12/1822 370/352 |
| 2008/0208749 | A1 | 8/2008 | Wallace et al. | |
| 2008/0214157 | A1* | 9/2008 | Ramer | G06F 17/30749 455/414.1 |
| 2008/0222142 | A1 | 9/2008 | O'Donnell | |
| 2008/0243784 | A1 | 10/2008 | Stading | |
| 2008/0282169 | A1 | 11/2008 | Chang et al. | |
| 2009/0005067 | A1 | 1/2009 | Ernst et al. | |
| 2009/0055355 | A1* | 2/2009 | Brunner | G06Q 30/02 |
| 2009/0164594 | A1 | 6/2009 | Turbeville et al. | |
| 2009/0222755 | A1 | 9/2009 | Drieschner | |
| 2009/0222759 | A1 | 9/2009 | Drieschner | |
| 2010/0064354 | A1 | 3/2010 | Irvine | |
| 2010/0106796 | A1 | 4/2010 | Van Gassel et al. | |
| 2010/0114887 | A1* | 5/2010 | Conway | G06F 3/0237 707/737 |
| 2010/0161600 | A1* | 6/2010 | Higgins | G06F 17/30867 707/736 |
| 2010/0185656 | A1* | 7/2010 | Pollard | G06F 17/30578 707/769 |
| 2010/0250526 | A1* | 9/2010 | Prochazka | G06F 17/30867 707/723 |
| 2010/0331016 | A1* | 12/2010 | Dutton | H04W 4/02 455/456.3 |
| 2011/0055200 | A1* | 3/2011 | Sovio | H04L 12/5695 707/715 |
| 2011/0093515 | A1 | 4/2011 | Albanese | |
| 2011/0137946 | A1* | 6/2011 | Siress | G06F 21/6227 707/784 |
| 2011/0167003 | A1 | 7/2011 | Nice et al. | |
| 2011/0179064 | A1* | 7/2011 | Russo | G06Q 10/10 707/769 |
| 2012/0109996 | A1 | 5/2012 | Asterbadi | |
| 2012/0123857 | A1 | 5/2012 | Surve et al. | |
| 2012/0220314 | A1 | 8/2012 | Altman et al. | |
| 2012/0252497 | A1 | 10/2012 | Altscher | |
| 2012/0311046 | A1 | 12/2012 | Grigoriev | |
| 2012/0330750 | A1 | 12/2012 | Ramer et al. | |
| 2013/0018913 | A1 | 1/2013 | Jones et al. | |
| 2013/0031169 | A1 | 1/2013 | Axelrod et al. | |
| 2013/0102248 | A1 | 4/2013 | Jay et al. | |
| 2013/0110802 | A1 | 5/2013 | Shenoy et al. | |
| 2013/0110946 | A1 | 5/2013 | Bradshaw | |
| 2013/0138751 | A1 | 5/2013 | Allen et al. | |
| 2013/0151425 | A1 | 6/2013 | Feinstein | |
| 2013/0218874 | A1 | 8/2013 | Liggett et al. | |
| 2013/0226704 | A1 | 8/2013 | Fernandez | |
| 2013/0246525 | A1 | 9/2013 | Patil et al. | |
| 2013/0254104 | A1 | 9/2013 | Fernandez | |
| 2013/0311339 | A1 | 11/2013 | Jeremias | |
| 2013/0325870 | A1 | 12/2013 | Rouse et al. | |
| 2014/0052576 | A1 | 2/2014 | Zelenka et al. | |
| 2014/0089111 | A1 | 3/2014 | Fernandez | |
| 2014/0108932 | A1 | 4/2014 | Soderstrom | |
| 2014/0155092 | A1 | 6/2014 | Ben-Dayan et al. | |
| 2014/0156499 | A1 | 6/2014 | Cavazos et al. | |

FOREIGN PATENT DOCUMENTS

| | | |
|---|---|---|
| KR | 10-0390556 | 7/2003 |
| KR | 10-2014-0004601 | 1/2014 |
| WO | WO 03/077164 | 9/2003 |
| WO | WO 2009/008985 | 1/2009 |
| WO | WO 2013/180474 | 12/2013 |
| WO | WO 2014/028647 | 2/2014 |

OTHER PUBLICATIONS

Kling et al. "Assessing Anonymous Communication on the Internet: Policy Deliberations." http://smg.media.mit.edu/library/Kling.AssessAnon.pdf. The Information Society. 15:79-90. Apr. 1999.

Louwers, Dirk. "Using Plot to Create Context-Aware Coupons,Offers and Promotions." http://www.plotprojects.com/using-plot-to-create-context-aware-coupons-offers-and-promotions/. Sep. 10, 2013. Downloaded Apr. 14, 2015. 7 pages.

Rainie et al. 28% of Online Americans Have Used the Internet to Tag Content. Pew Internet and American Life Project. Jan. 31, 2007. 9 pages.

Report:Engineering Village/Other Features. Intellogist. http://www.intellogist.com/wiki/Report:Engineering_Village/Other_Features. Downloaded Jun. 14, 2014. 7 pages. (Dec. 2010).

Shek, Sidney. "Next-Generation Location-Based Services for Mobile Devices." CSC. http://assets1.csc.com/innovation/downloads/CSC_Grant_2010_Next_Generation_Location_Based_Services_for_Mobile_Devices.pdf. Feb. 2010. 66 pages.

International Search Report for International Application No. PCT/US2015/040759 dated Oct. 30, 2015.

International Search Report for International Application No. PCT/US2015/040144 dated Oct. 28, 2015.

Steele, Billy. "Google's Eddystone serves up location-based info via Bluetooth beacons," Engadget.com (Jul. 14, 2015) (available at (http://www.engadget.com/2015/07/14/google-eddystone-bluetooth-beacons/).

Gilbert, Ben. 'Proximity' is Samsung's equivalent of Apple's iBeacon, coming to a mall near you Engadget.com (Nov. 12, 2014) (available at http://www.engadget.com/2014/11/12/samsung-proximity/ ).

Lee, Nicole. "Foursquare wants to be the mayor of personalized local search," Engadget.com (Aug. 6, 2014) (available at http://www.engadget.com/2014/08/06/foursquare-app/).

* cited by examiner

DYNAMIC DIRECTORY AND CONTENT COMMUNICATION

CROSS-REFERENCE TO RELATED APPLICATIONS

The present application claims the benefit of:

U.S. Provisional Patent Application Ser. No. 61/981,665, filed Apr. 18, 2014 and entitled "SYSTEM AND METHOD FOR DYNAMIC DIRECTORY AND COMMUNICATION;" and U.S. Provisional Patent Application Ser. No. 62/024,907, filed Jul. 15, 2014 and entitled "SYSTEM AND METHOD FOR DYNAMIC DIRECTORY AND COMMUNICATION,"

each of which are hereby expressly incorporated by reference in their entirety. Furthermore, any and all priority claims identified in the Application Data Sheet, or any correction thereto, are hereby incorporated by reference under 37 C.F.R. §1.57.

BACKGROUND

1. Field

The present application relates generally to creating and maintaining a dynamic directory and discovery and communication of content between a plurality of users included therein.

2. Background

The variety of devices and methods of communication performed by these devices continues to increase. More information is available today than ever before. Searching has been proposed as one way to help users identify content and each other. Searching through centrally managed catalogs or directories is one technique which may be used to discover content or users. However, due to the pace that information is introduced or changed, the moment a directory is published, it will likely be out of date. Accordingly, improved methods and devices for dynamic directory and content communication are desirable.

SUMMARY

The systems, methods, and devices of the disclosure each have several innovative aspects, no single one of which is solely responsible for the desirable attributes disclosed herein.

In one innovative aspect, a communication device is provided. The communication device includes an access controller. The access controller receives credentials from a sender device of a user account and provides access to the user account based on the received credentials. The communication device also includes a contact manager. For an accessed user account, the contact manager receives contact information for a contact. The contact information includes a contact identifier, a public descriptor, and a private descriptor. The public descriptor is received from a central contact directory and the private descriptor is provided by the user account. The private descriptor is searchable only for a search request for the user account (e.g., submitted by a device logged into the user account). The contact manager also transmits a public user account descriptor to the central contact directory. The public user account descriptor includes information for the user account, the information being searchable during searches submitted by other users. The communication device further includes a search engine. The search engine receives a search string from the sender device of the user account and compares the search string to at least one of the public description for the contact and the private descriptor for the contact to identify the contact. The communication device also includes a conversation module. The conversation module receives an identifier for the identified contact, receives content to be transmitted to a receiver device of the identified contact, and communicates the content between the user account and the identified contact based at least in part on the conversation rule.

In some implementations of the communication device, the conversation module is further configured to receive a conversation rule. The conversation rule identifies one or more of available response actions to respond to the content, a receipt time period identifying a period of time the content may be accessed, a response time period identifying a period of time during which an associated response action may be taken.

Some implementations of the communication device may include a transaction module. The transaction module consummates a transaction between the user and one or more identified contacts based on content communicated between the user account and the identified contact.

At least one of the public descriptor or the private descriptor may include location information. The search engine may be configured to receive device location information and compare the device location information to the location information included in the at least one of the public description for the contact and the private descriptor for the contact to identify the contact.

In a further innovative aspect, a communication server is provided. The communication server includes an account manager. The account manager receives user account information including credentials. The communication server also includes a tag manager. The tag manager receives public descriptors and private descriptors for a user account. The communication server further includes a search engine. The search engine receives and executes search requests. Execution of a search request for the user account may include consideration of the public descriptor for the user account. Execution of the search request from the user account may include consideration of the private descriptors for the user account. The communication server also includes a conversation module. The conversation module receives and transmits content between user accounts based at least in part on a conversation request. The conversation request identifies the content, and users to receive the content.

In some implementations of the communication server, the conversation request further includes a conversation rule. The conversation rule may identify available response actions to respond to the content. The conversation rule may identify the response actions including a transaction. The conversation rule may include a receipt time period identifying a period of time the content may be accessible by the users. The conversation rule may also include a response time period identifying a period of time users may take an associated response action. The content may be received and transmitted using the conversation rule.

The communication server may also include a transaction module. The transaction module may consummate a transaction between users based on a conversation between the users.

In a further innovative aspect, a computer-implemented method for bidirectional searching under control of one or more computing devices configured with specific computer-executable instructions is provided. The method includes receiving a request to create a public account descriptor for a user account based on one or more strings. The method includes generating the public account descriptor based on the one or more strings. The method includes associating the public account descriptor to the user account. The associating of the public account descriptor is a factor for a public search. The method includes receiving another request to create a private descriptor based on another one or more strings. The method also includes generating the private descriptor based on the another one or more strings. The method further includes associating the private descriptor to a contact of the user account. The associating of the private descriptor is a factor for a private search.

In some embodiments of the computer-implemented method, the public account descriptor may be viewable by a user who is not associated with the user account, and the private account descriptor may be viewable only by a user of the user account.

In some implementations, the public search includes a search for one or more public account descriptors, and the private search includes a search for one or more private account descriptors.

The computer-implemented method may include receiving a request to remove at least one of the public descriptor or the private descriptor. Such implementations may also include dissociating the at least one of the public descriptor or the private descriptor from the user account.

The computer-implemented method may further include receiving a request to create a communication thread between a several users and generating the communication thread. In implementations including communication threads, the method may include applying one or more filters of at least one of the users, wherein the communication thread is not provided to the at least one of the several of users if a value in the communication thread matches an applied filter.

The method may include receiving a request to restrict the communication thread between specified users and restricting the communication thread based on the request to restrict. The request to restrict may include at least one of: limiting an addition of users to the communication thread, restricting a view of a recipient list for the communication thread, or restricting users permitted to reply to the communication thread. Some implementations of the method may include receiving a request to create a public communication descriptor for the communication thread based on a string input, creating the public communication descriptor based on the string input, and associating the public communication descriptor to the communication thread.

It may be desirable, in some implementations, for the method to include receiving a request to perform a transaction between users and performing the transaction between the users.

The method may include receiving a request to pause the communication thread from a device associated with a requesting user account, and pausing transmission of information for the communication thread devices associated with the requesting user account.

In another innovative aspect, a bidirectionally guided directory system is provided. The system includes a user directory of user accounts. The user directory identifies a first association of a public descriptor to a user account and a second association of a private descriptor to a contact of the user account. The system includes a content directory that identifies available content items, each available content item associated with another public descriptor. The system includes a search engine. The search engine is configured to receive a search request transmitted from a client device associated with the user account, the search request including a descriptor. The search engine is configured to search the content directory and the user directory based on the received search request. The search of the user directory is based on a comparison of the descriptor included in the search request with the private and public descriptors associated with the requesting user account.

In some implementations of the system, the search engine is further configured to transmit a search result including at least an identifier for a user account or a content item matching the search request. The system may include a communication module configured to receive a communication request from a requesting device. The communication request may include the identifier of the user account or the content item. The communication module may be further configured to initiate a communication session between the requesting device and a device of the user account or the content item.

In some implementations of the system, the communication request includes a second identifier for another user account or another content item. In such implementations of the system, the communication module may be further configured to initiate the communication session between the requesting device and another device of the another user account or another content item. The user account or the content item may not be identified to the another user account or another content item.

Details of one or more implementations of the subject matter described in this specification are set forth in the accompanying drawings and the description below. Other features, aspects, and advantages will become apparent from the description, drawings, and claims. Note that the relative dimensions of the following figures may not be drawn to scale.

DETAILED DESCRIPTION

Figure 1:
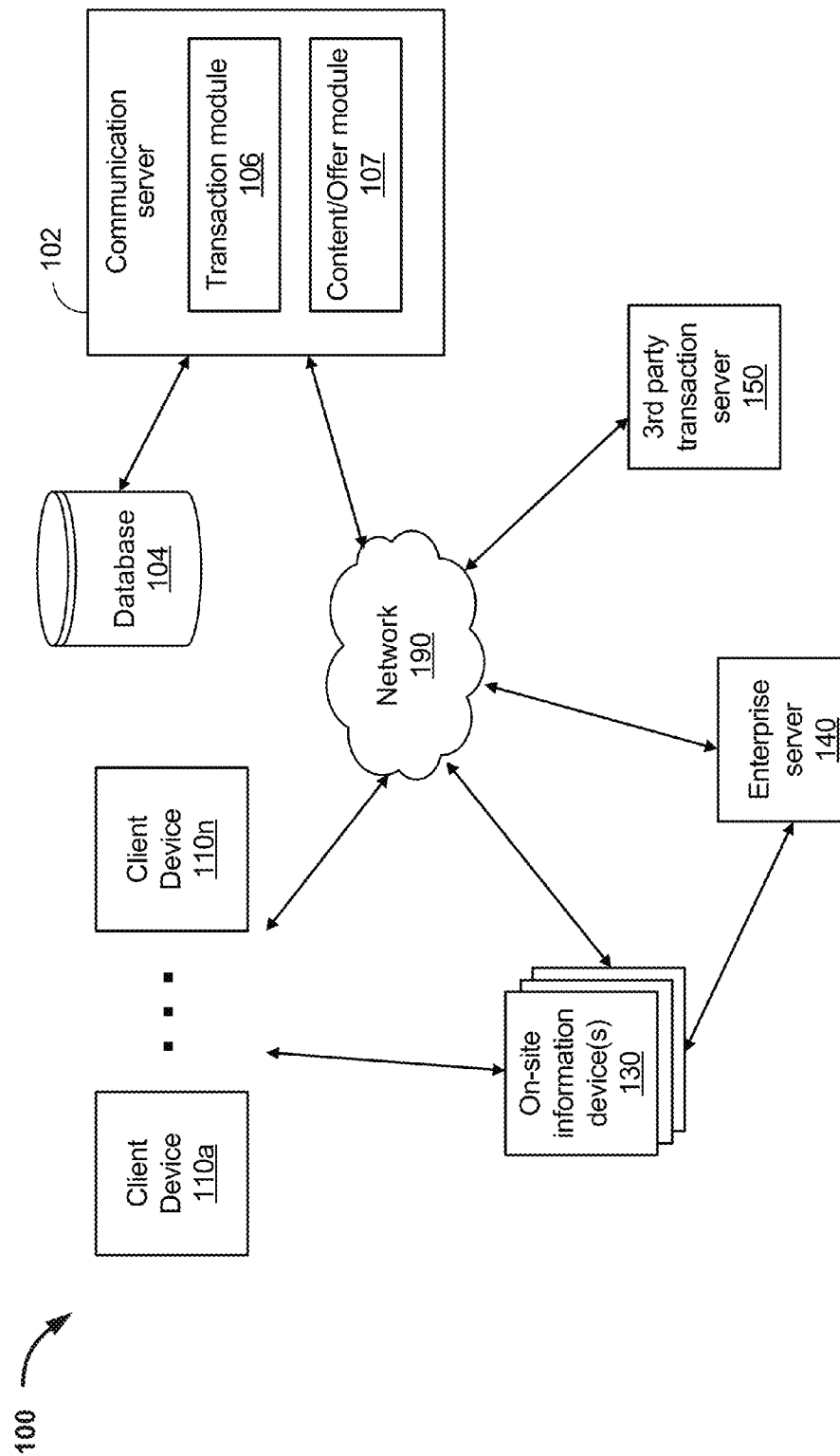
FIG. 1 is a functional block diagram of an exemplary communications network system in accordance with one embodiment.

Features for dynamic directory and content communication are described which provide bidirectionally optimize searches for users and/or content. One type of message which may be associated with a contact is a private descriptor identifying how the user wishes to identify the contact (e.g., other user). Other users of the system will not see this tag. Accordingly, when the user who provided the tag submits a search, the tag will be considered as part of the search. A global or public descriptor may also be associated with the contact. The public descriptor is added to the system by the contact and indicates how the contact wants the world to find and view him. All users of the system will see this tag. The public and private descriptors are used by a search engine to dynamically optimize searches conducted therewith.

One non-limiting advantage of the described systems and methods is self-discovery. Self-discovery is directed to being searchable in the marketplace as the user desires. For example, a user may identify themselves as a surfer, an iOS developer, looking for Laker tickets, or other custom set of strings which are accessible by users of the system searching, for example, the marketplace. Each user of the system is able to define and associate tags with their account and device for other users to see. Another non-limiting advantage of the described systems and methods is self-tagging. Whereas self-discovery allowed the user to specify to the world how they would like to be found, self-tagging allows users to define and associate tags with contacts (e.g., phonebook entry, other users' accounts, merchants, brands) for the user to see and use to manage interactions (e.g., conversation, transactions, offers, content) with their contacts. Self-discovery and self-tagging afford flexibility and control in how each user sees the world and how the world sees the user.

Another aspect that relates to self-discovery is the bidirectionally optimized search. Through the use of tags (as one example), users can influence their searches submitted to the system. For example, the user may associate a tag with contact identified as potential business leads. When the user searches for contacts nearby while on a business trip, including the business leads tags further refines, identifies, and presents the information according to how the user understands their contacts. This takes the optimization out of the "one-size-fits-all" optimizations and allows each individual user to develop their personal view of their online world.

Users also influence searches by tagging themselves. These tags provide ways the user wishes to be identified, if at all, within the system. For example, a user may enjoy public singing, but is typically known as an excellent realtor. The user's credentials as a realtor may be discovered via standard search engine optimizations such as those which mine the Internet for web content. However, little or no information may be available about the singing abilities of this user. By enabling custom optimizations through tags, the user influence searches for singers to include him in the result list.

Finding users or conversations in this manner is very powerful. It may be desirable to further facilitate communication with the people and ideas discovered. One non-limiting advantage of the communication systems and methods described is personally controlled privacy. Features such as unique identifiers for contacts and communications, disclosure or privacy by design, pausing conversations, snoozing conversation, and adding or removing contacts from your network allow the system to provide dynamic real-time management of who, what, and where communications occur.

In one implementation including self-discovery and a central communication engine, the system may be configured to request one or more tags from a user accessing the system via client device. Using the client device, the user enters one or more tags and submits the tags to system. Just like the user can add tags to associate the user's account and the user's device with the tags and identity established based thereon, the user can dissociate and port the user's identity to another device to take advantage of device-neutral identity. For example, the user may perform credential exchanges to associate the user with the user's current device by logging in to the user's account in the cloud, by establishing wireless or near-field connection, e.g., handshake, between a user-carried mobile token or fob and a location-specific machines, such as a vending machine, register, billboard, monitor, etc., or by transmitting biometric authentication information, such as fingerprint, retina, iris, voice, face, etc. Once the user authentication is established, the user's identity stored within the system can be ported to the authenticated user device to further the management of self-discovery and communication with others according to the system described herein. Therefore, the user and the user's current device provides context to the user's self-established identity and real-time activities.

A client device may be provided to exchange messages with a central communication server. The messages may include information to bidirectionally optimize searches. One type of message which may be communicated is a tag for a friend (e.g., contact). The message may include one or more strings. This may be referred to as a local tag, a private tag, or a private descriptor because the tag is how the user wishes to identify the friend. Other users of the system will not see this tag. Accordingly, when the user who provided the tag submits a search, the tag will be considered as part of the search. When the friend or another user searches, the tag will be omitted from consideration.

The system may be configured to receive multiple messages to assign multiple tags to friends. The system may provide biographical user interfaces (UI) (e.g., pages) for each user. Via the biographical UI tags may be submitted. The tag may be one or more strings. The tag may be custom text (e.g., user defined). In some implementations, the system may suggest a tag based on previously provided tags. For example, if a user has previously tagged contact with "surfing buddy," when the same user begins entering a new tag for a contact, if the tag begins with "surf" the system may suggest a completion of "surfing buddy."

A user's contact may have additional tags associated with them. In addition to the local tags, the system may be configured to automatically tag the contact based on information retrieved from third party systems such as social media sites. Once tagged, the contact can be searched by tag such as when you create conversation threads. A conversation thread or a threadsite is a message session initiated by at least one user of the system whereby the user (or other target users) are allowed to add content to the message session (such as photos, texts, audio, video, etc.), modify or select settings related to the participants, communication stream (bidirectional or one-way communication) and settings related to the conversation thread (e.g., direct or blind carbon copy (BCC)). For example, if the surfing conditions are going to be good, the user may initiate a conversation thread with all contacts tagged "surfing buddy." As another example, a search may include multiple tags such as "male" and "photographer" and "L.A." The contacts retrieved may be included in an instant group conversation thread created from that three tag search. This may be referred to as personal relationship management.

Another type of message may be a tag identifying the user. This tag may be referred to as a global tag, public tag, or public descriptor. The global tag may be specified via one or more strings. The global tag indicates how the user wants the world to find and view the user. As such, searches submitted by any user will consider the global tag. This facilitates locating the user by anyone in the system.

As with other contacts, a user may also be provided a biography UI. The biography UI may include one or more controls to receive tags for the user indicating how the user wants the world (e.g., other users of the system) to find and view them. The global tag may identify a service offered by the associated user. An example of a service may be hair stylist, attorney, or a product for sale. The global tag may identify terms the user wishes to be associated with such that when other users search the marketplace, the user can be located or associated with the tag.

Consider the use case of selling an item. A user may tag themselves with the following tags: name (e.g., "john smith"), iOS7 developer for hire (a service), little league coach, baby sitter needed, surfer, and MacBook pro for sale. When people search for any of these tags in the marketplace John Smith will be identified instantly (e.g., real time relevance). The tagging described has a non-limiting advantage of bidirectional search optimization whereby a user need not wait for a search engine to crawl and optimize searches. A user may add or remove tags which are instantly used to adapt searches. This can also be useful once the MacBook pro is sold. John Smith need only remove the tag and he will no longer be identified when someone searches for sellers of a MacBook pro.

These features allow the system to keep pace with users who are constantly changing each month, even sometimes daily. Individuals can search engine optimize (SEO) themselves in real time. Individuals can also un-SEO themselves by simply deleting tags she no longer wants to be found for. This provides a further non-limiting advantage of providing control of the history of information for a user unlike a online classifieds or the general Internet where users are not in control of what history is out there (e.g., cached, searchable) about them.

As a further illustration of the bidirectional optimization, consider a person who tags himself "ios developer" at 8 am because he has availability to pick up some work that day. He also tags himself with "baby sitter needed." At 10 am someone searches in the marketplace for an ios developer who is for hire right now. The search considers the global tag submitted at 8 am and is selected by the searcher for an instant conversation thread each participating via respective client devices. The developer agrees to take the job and at 11 am deletes the tag created at 8 am (ios developer). Instantly, the developer will no longer show up when people search for that tag. The developer is no longer bothered with people contacting for this tag and no cached information is retained which may result in stale information. However, the developer is still SEO for a babysitter needed because he still needs that and has not removed the associated tag. This example shows how the SEO is real time, simple, and highly localized, personalized, and relevant. Unlike current SEO solutions where the average user has no idea how to SEO themselves or their companies, the described features allow anyone to list or delist tags thereby optimizing searches at any time with minimal effort.

One non-limiting advantage of the features described is simplified SEO. The systems and methods allow a user to self-tag to associate their account with specific keywords. The systems and methods further allow users to untag themselves to delete SEO tags and keywords associated with their account.

A further non-limiting advantage of the described features is that because the optimization is performed within the system, no history of the tags is maintained. This prevents stale information about a user account from being attributed to the user longer than is appropriate. Furthermore, it provides a more accurate representation of the content items (e.g., services or products) offered in the marketplace because each item is tagged for offer in real time rather than delaying the discovery of an item once available or prolonging the discovery of an item beyond its availability.

Further innovative aspects are provided which facilitate communications. As discussed above, the client device may be configured to search for users by tags. Conversation threads can be created and filtered based on bidirectional information. From the user's perspective, the local tags can be used to filter users based on how the user sees the world. From the perspective of any user of the system, global tags can also be used to filter users based on how each user wishes to be seen. This bidirectional optimization enables efficient and flexible communications such as: one to one conversations between two users, group conversations amongst several users, group "blind carbon copy" (Bcc) broadcast conversations such as advertisements or announcements, group broadcast only (e.g., all recipients identified, no responses permitted). The system may be configured to pause communications. Pausing communications generally refers to suspension of receipt of conversation item for a conversation thread. The system may be further configured to re-enable the thread upon receipt of a conversation item from the user or upon satisfaction of a predetermined condition (e.g., time period expires, client device enters an area). The system may be configured to add or delete participants at any time to an existing conversation thread. The system may also be configured to maintain a curated history of all types of media included in a threaded conversation to organize and display the conversation thread by different types of media such as video, audio, or text.

Consider the following example of the communication features described. As a first step, a user submits via a client device a search of the conversations conducted via the client device for a tag the user previously created before such as "Miami Dolphins Player." The result of this search is an instant list of everyone that had previously had this tag assigned. Next, the user chooses a type of group conversation to conduct. The type may include: group conversation, group Bcc, group broadcast only (e.g., one way communication, no one can respond to the author). Then, the user selects the type of media to send. The media types may include text, audio, picture, video, or emoticon. The user may thus initiate the communication session based on the provided information. At any time, the author may pause the conversation thread. In some implementations, this may pause the conversation thread for everyone included in the conversation thread. Later, the user may re-enable the thread to resume the conversation.

As further discussed below, the system may be configured to consummate transactions for one or more users of the system. The transactions may be consummated in conjunction with the various communication features described above. One type of transaction is a mobile payment. Payment credentials or information such as payment card information or digital wallet information may be stored in the network. This allows the payment information to be retained outside the client device (e.g., phone). The payment transaction aspects of the system may be configured to utilize encryption and/or tokenization to protect information needed to effect the payment such as card information, confirmation codes, personal identification numbers (PINs), passwords, personal identification information (e.g., date of birth, social security number, etc.), and the like. In some implementations, the system may include features to identify card-present rates for transactions at a rate that depends on physical presentation of card such as to a reader. For example, a beacon may be provided which is configured to acquire payment information. The payment transactions may be configured to integrate with payment networks or payment processing entities such as Europay, MasterCard, Visa (EMV) (a.k.a. "chip and pin") systems. In some implementations, transaction may include authorization by, for example, a PIN, one-time password (OTP), biometric information, bank-to-bank authorization, peer-to-peer (P2P) authorization, and the like. The system may receive the authorization information from a client device. The authorization information is then securely transmitted to the central server for processing payments such as via automated clearing house (ACH).

In some implementations, the transaction consummated through the system described herein may be in the form of mobile remittance. Mobile remittance may generally refer to sending money from one account to another and making payments such as bills. In some implementations, mobile remittance may be consummated across two or more nations, which may be referred to as cross-border remittance.

A further non-limiting advantage of the systems and methods described is the combination of communications and transactions in a single platform. Consider a user sitting in a café in New York. The user thinks of a friend who is living somewhere in South America. The user has previously tagged (e.g., self-tagged) this friend in his contacts as "friend" and "south America." Searching the contacts using these two tags, the user identifies and begins a conversation thread with the friend. During the discussion, it comes up that the friend has found a great opportunity but needs some money to invest. The friend may transmit a video presentation of this great opportunity. After viewing the video in New York and from within the same conversation thread, the user may want to join by sending a conversation item "Can I send you $100 to invest?" Using, for example, textual analysis of the conversation text, the system may identify that the conversation thread is related to a potential transaction (e.g., it's a question, includes "send" and a dollar amount). The system may be configured globally (e.g., system-wide keywords or formatting) or dynamically (e.g., for each user, for a payment source) to identify transactional language. Once identified, the system may provide an interface element to initiate and consummate the transaction. Upon authorization from the user, the transaction may affect the transfer of the requested amount from an account associated with the user to the friend.

One aspect of the systems and methods described relate to messaging which is conducted via broadcasting hardware such as beacons, or other wireless transmitting devices. Examples include the m1Beacon™ and m2Beacon™ manufactured by Netclearance Systems, Inc. of Escondido, Calif. Further examples include the Gimbal™ proximity beacons manufactured by Qualcomm Retail Solutions, Inc. of San Diego, Calif.; RadBeacon beacons manufactured by Radius Networks, Inc. of Washington, D.C.; and Estimote Beacons manufactured by Estimote, Inc. of New York, N.Y. By configuring the broadcasting hardware to transmit and receive conversations and/or tags as described in further detail below, physical locations can easily be transformed into virtual worlds.

The power provisioning for the broadcasting hardware is important because any physical limits placed on the location of the hardware limits access to mobile devices. Accordingly, it is desirable to power the broadcasting hardware via batteries or readily available power sources such as power over Ethernet, solar or other photovoltaic means, or Universal Serial Bus power.

The broadcasting hardware may be configured to communicate with client devices or a communication server via one or more wireless communication protocols. Examples of the wireless protocols include WiFi™, low power Bluetooth™, or iBeacon.

The broadcasting hardware may be placed such that each element creates a zone. The zones represent a discrete area within which tags or conversations may be transmitted and received and transactions conducted related to the area. For example, a restaurant may want customers to visit their new taco bar. A beacon may be placed near the taco bar transmitting a coupon for a free dessert to customers who visit the taco bar. When a customer enters the zone, the client device may receive the beacon signal awarding the customer the dessert credit. In such an implementation, the client device may be a smartphone owned by the customer or a client device provided by the restaurant such as a tablet computer or electronic pager. Other zones may be established on premise in parking lots or other indoor or zones. Zones may also be established off premise such as at a kiosk or in a public park.

The broadcasting hardware may include a native application configured to communicate with client devices and/or communication server as described in further detail herein.

For example, a user can meet someone and exchange and start to communicate with a unique identifier (e.g., personal ID code) without giving up your personal information such as cell phone number, email, or mailing address.

During a conversation, at any time you can pause or resume the conversation thread. At any time the system is configured to receive and process a request to delete the entire conversation thread off not just the user's client device, but everyone else's device that was on the thread. The system may be configured to allow deletion requests from the author of the thread, a participant in the thread, or based on another user role defined in relation to the thread.

Consider an implementation where a person meets someone at an event and they want a way to stay in touch and to communicate with them. However, the person does not know them well enough to give out their personal contact information such as a cellphone number, email, or social network site profile. The systems and methods described allow the person to exchange personal ID codes. The personal ID code may be entered into the system by each person and used to connect, communicate, and even transact with each other. In today's connected and transient world, temporary relationships are commonplace. A limited time relationship may be formed between people based on projects they are working on, sales people they are dealing with, or events attended (e.g., conferences). By communicating through the system using the personal ID code, a user may disassociate with a person whom they no longer wish to interact with. This provides a polite way to end those relationships without having to take public (e.g., "unfriending") and potentially expensive (e.g., block them with your cell phone carrier) steps.

Communication may also enable broadcasting of tags or conversations throughout the system. Also, beacons or other communication means, for example may serve as a location-specific portal to the network for the user to connect.

During the course of communication, the need to perform a transaction may arise. For example, if a user is selling tickets to a concert, a communication may be sent to contacts having a tag value identifying the band playing at the concert. Once a user wants to buy the tickets, the systems and methods described enable the consummation of the transaction. It should be appreciated that the above mentioned privacy measures may be maintained throughout the transaction. This provides a further non-limiting advantage of conducting transactions with limited exchange of personal information.

While the example transaction described above is a payment based transaction, the transactions included in the systems and methods disclosed below can include payments, remittance, coupons, and offers. The transactions may be real time, on demand, or predetermined. The transactions may be consummated using near field communication (NFC), one or more networked computing systems (NCS), or a combination thereof.

The system may also be configured to add automatic or inferred tags. The automatic or inferred tags may be based on demographic information provided by the user such as during account creation, information from social media accounts linked by the user or publicly available, geo-location information such as GPS coordinates of the client device used to access the system, and the like.

The system is configured to associate the received tags with the user's account and store them in a database. The system may be configured to generate and store a search index to enhance the searching based on the newly provided tag information. The system may also be configured to derive and store metadata such as statistical rankings for the tag information received. The system may be further configured to generate and store a social graph for the user based at least in part on the provided tag information indicating relationships for the user with other actors within the system (e.g., brands, companies, schools, religious institutions).

The system may be configured for real time contextual search and discovery. For example, a user may input, via a client device, one or more search criteria. Search criteria may include search phrases (e.g., strings) or search attributes (e.g., locations), which may vary depending on searching the user's threadsite space or the marketplace. The system receives and analyzes search phrase and attributes for terms. The analysis may include identifying free text, tags, categories, geography, products, events, and/or proper names. Using the identified terms and attributes, a search of one or more datastores is performed. The datastores may include structured schemas (e.g., categories and directory), unstructured schemas (e.g., tagging), search index (e.g., relevance scored), and social graph analysis (e.g., relationships). The search may be configured to consider and aggregate these multiple datasources. The search is real-time and up to date with respect to the latest available global and local tags as well as privacy controls. The search provides as an output ranked search results. The results are then displayed to user via the client device.

Having conducted a search, the user may then enter a discovery phase. Discovery may include the user evaluating the search results. The evaluation may include browsing ranked results, browsing categorized results, filtering the search results, and refining the search. The results may include items available via the marketplace and/or contacts.

In some circumstances, the user may transmit an identification of a contact to initiate a conversation thread. The conversation thread may include real time communication between the client devices. The system is configured to identify the receiving user on the network. Once the receiving user is identified, the system identifies a route to the user on the network. The route may include an online route to device. If the receiving user is offline, the route may include a queue for later delivery. The receiving device is notified of a request for a new connection. The connection may be automatically accepted or the client device may prompt user for acceptance. If accepted, a real time connection is established and the users may communicate as well as conduct transactions with one another, such as book appointments, schedule events, receive conversation items, purchase a product, transmit money.

The connection was facilitated by self-tagging, contextual search, and discovery. The connection is a result of search and discovery.

In one innovative aspect, there is a communication device comprising an access controller configured to receive credentials and provide access to a user account based on the received credentials, a contact manager configured to, for an accessed user account, receive contact information for a contact, the contact information including a contact identifier, a public descriptor, and a private descriptor, wherein the public descriptor is received from a central contact directory and the local descriptor is provided by the user account, wherein the private descriptor is searchable only for a search request for the user account, transmit a public user account descriptor to the central contact directory, the public user account descriptor including information searchable during searches submitted by other users, a conversation module configured to receive a conversation rule identifying contacts to receive the content, available response actions to respond to the content, a receipt time period identifying a period of time the content may be accessible by the users, and a response time period identifying a period of time users may take an associated response action, and communicate content between the user account and an identified contact based at least in part on the conversation rule, and a transaction module configured to consummate a transaction between the user and one or more identified contacts based on content communicated between the user and the one or more identified contacts.

In another innovative aspect, there is a communication server comprising an account manager configured to receive user account information including credentials, a tag manager configured to receive public descriptors and private descriptors for a user account, a search engine configured to receive and execute search requests, wherein execution of a search request for the user account includes consideration of the public descriptor for the user account, and wherein execution of the search request from the user account includes consideration of the private descriptors for the user account, a conversation module configured to receive and transmit content between user accounts based at least in part on a conversation rule, the conversation rule identifying users to receive the content, available response actions to respond to the content, the response actions including a transaction (e.g., buy, view, or vote), a receipt time period identifying a period of time the content may be accessible by the users, and a response time period identifying a period of time users may take an associated response action, and a transaction module configured to consummate a transaction between users based on a conversation between the users.

In another innovative aspect, there is a method for generating a dynamic directory comprising receiving a request to create a public account descriptor for a user account based on one or more strings, generating the public account descriptor based on the one or more strings, associating the public account descriptor to the user account, wherein said associating of the public account descriptor is a factor for a public search, receiving another request to create a private descriptor based on another one or more strings, generating the private descriptor based on the another one or more strings, and associating the private descriptor to a contact of the user account, wherein said associating of the private descriptor is a factor for a private search.

In another innovative aspect, there is a bidirectionally guided directory system, the system comprising a user directory of user accounts, the user directory identifying a first association of a public descriptor to a user account, the user directory further identifying a second association of a private descriptor to a contact of the user account, a marketplace directory identifying a plurality of goods and services available, each available good or service associated with another public descriptor, and a search engine configured to receive a search request transmitted from a client device associated with the user account, the search request including a descriptor, and search the marketplace directory and the user directory based on the received search request, wherein the search of the user directory is based on a comparison of the descriptor included in the search request with the private and public descriptors associated with the requesting user account.

Example implementations of the system and method discussed above are described below in further detail in connection with FIGS. 1-24. Further illustrations, implementations, and descriptions are provided in Appendix B.

FIG. 1 is a functional block diagram of an exemplary communications network system in accordance with one embodiment. The system 100 may be implemented via a client-server architecture where a client device has an application running locally that performs a set of functions that require communication with a server in order to support desired functionality. The client application may be configured to allow users to input their desired request of the application, after which the request is sent to the server for processing. The server may be configured to optionally archive some information (e.g., tags, user contacts information, conversation archives, offers, transaction information, etc.), and the request may be routed either back to the initiating user and/or to a target user device. The system 100 shown includes multiple client devices (e.g., a client device 110a and a client device 110n). It will be appreciated that fewer or more client devices may be included in the system 100. The client device 110a and the client device 110n (collectively or individually hereinafter referred to as "client device 110") may be an electronic communication device configured to transmit and receive conversation items in a conversation thread. Examples of such electronic communication devices include smartphones, feature phones, laptop computers, desktop computers, tablet computers, personal digital assistants, set-top devices, gaming consoles, automotive dashboard systems, kiosks, self-service consoles, and the like.

The messages the client device 110 may be configured to transmit and receive may include the tagging and conversation items described herein. The client device 110 may include specialized circuitry configured to transmit, receive, generate, and process the messages discussed in further detail below. In some implementations, the client device 110 may include a processor which is configured to execute stored instructions which cause the client device 110 to transmit, receive, generate, and process the messages described. The client device 110 may include additional modules as described in connection with FIGS. 2A-2B below.

The system 100 includes a network 190. The client device 110 may be configured to transmit and receive messages via the network 190. Examples of the network 190 include a wide area network (WAN), metropolitan area network (MAN), local area network (LAN), wireless local area network (WLAN), or personal area network (PAN). Although shown as one network, the network 190 may include several interconnected networks. The networks which may be included in the system 100 may differ according to the switching and/or routing technique used to interconnect the various network nodes and devices (e.g., circuit switching vs. packet switching), the type of physical media employed for transmission (e.g., wired vs. wireless), and the communication protocols used (e.g., Internet protocol suite, SONET (Synchronous Optical Networking), Ethernet, etc.). Regardless of the form the network 190 may take, the network 190 is configured to facilitate machine-to-machine messaging for tagging and communication as described herein.

The system 100 includes on-site information device(s) 130. An on-site information device may be an electronic communication device configured to transmit messages at a location. For example, an on-site information device may be implemented as a beacon. The beacon may be configured to transmit and receive tagging and communication messages to the client device 110 within, for example, a store. This allows a store owner to configure messages for broadcasting to the client device upon entry into a predetermined area. Sites may include stores, amusement parks, cruise ships, restaurant, hotels, convention centers, arcades, campuses, hospitals, and casinos. The beacon may be implemented as disclosed in U.S. Patent Pub. No. 2013/0226704, titled "CONSUMER INTERACTION USING PROXIMITY EVENTS," U.S. Patent Pub. No. 2013/0254104, titled "CONSUMER INTERACTION USING PROXIMITY EVENTS," and U.S. Patent Pub. No. 2014/0089111, titled "MOBILE DEVICE ORDER ENTRY AND SUBMISSION USING PROXIMITY EVENTS," which are and expressly incorporated by reference in their entirety.

The on-site information device(s) 130 may communicate directly with the client device 110. In some implementations, the on-site information device(s) may communication with the client device 110 via the network 190.

The on-site information device(s) 130 may be configured by a site operator. As shown in FIG. 1, the site operator may be a merchant. The system 100 includes an enterprise server 140. The enterprise server 140 is configured to provide tagging and communication information. For example, the enterprise server 140 may provide one or more tags for transmission by the on-site information device(s) 130 at the site. The tags may facilitate the discovery of an item, location, or person at the site. The communication information may include a conversation item in a conversation thread regarding an event at the site. In a merchant implementation, the conversation item may indicate a sale on a particular item. In a hospitality implementation, the conversation item may identify the starting time for a performance. In a variety of settings, the conversation item may be used to convey emergency information such as a fire, earthquake, or other time and location sensitive event information.

The enterprise server 140 may communicate directly with the on-site information devices 130. In some implementations, it may be desirable to have a centrally located enterprise server 140 and transmit the tagging and communication information via the network 190 to on-site information device(s) 130 located at one or more sites.

The client device 110 may transmit and receive tags and communication information. Similarly, the enterprise server 140 may transmit and receive tags and communication information. The tags and communication information may be processed by a communication server 102. The communication server 102 is configured as a hub to tagging and communication activities within the system 100. The communication server 102 is configured to receive tags for user accounts (e.g., the enterprise server 140 or the client device 110). The communication server 102 may be configured to process the received tags such as by verifying the associated account, validating the tag, storing the tag in a database 104, and transmitting global tags via the network 190. The communication server 102 may be configured to provide searching of user accounts. The searching may be based on the tags stored in the database 104. The database 104 may store offer rules as described further below. The database 104 may store contacts and conversation archives. The database 104 may also store transaction history when a transaction module 260 (FIG. 2) completes a transaction request. In some implementations, the database 104 may store information in an encrypted format via encrypted communication medium. In some implementations, the database may store information for a predetermined period of time. For example, the database 104 may store conversation archives up to 30 days and transaction history up to 7 years.

The communication server 102 may be configured to receive conversation threads for user accounts. The conversation threads may be associated one or more tags. The conversation threads may be associated with one or more user accounts. The communication server 102 may be configured to also receive distribution information for a given conversation thread. For example, the conversation thread may not be distributed outside a predetermined set of users. As another example, the conversation thread may have limited visibility such as only to users associated with a predetermined tag. Accordingly, when a user performs a search, the conversation thread may be provided if the tags (e.g., global and/or personal) associated with the user satisfy the distribution rules for the conversation thread. As one example, consider a merchant interested in providing a promotion for a new product. The merchant may post a conversation thread to their account with a tag "OurNewCoolThing". If a customer having a user account which is not associated with the tag "OurNewCoolThing" searches the system 100, the new product conversation is not provided. However, if the customer adds the tag "OurNewCoolThing" to the merchant contact as a personal tag, the new product may be returned in a search by the customer.

The communication server 102 may further manage the distribution and life of a conversation. For example, the communication server 102 may pause or snooze an ongoing conversation. The communication server 102 may also allow a conversation thread to be deleted. Receiving a message to delete a conversation thread cause the communication server 102 to ensure the user account requesting the deletion is authorized to do so and, if so, transmitting one or more messages to client devices to remove the conversation thread. This allows users a higher degree of control over conversation items.

The communication server 102 may include a transaction processing module 106. The transaction processing module 106 is configured to perform payment processing or payment remittance. The transaction processing module 106 may be configured to consummate the transaction. In some implementations, the transaction processing module 106 may be configured to communicate with a third party transaction server 150 to consummate the transaction. The third party transaction server 150 may be, in some implementations, a remittance and/or payment processing server such as an e-wallet, a bank, an automated clearing house, an online money transfer service, or a digital currency exchange.

The communication server 102 may include a content/offer module 107. The content/offer module 107 may be configured to provide coupons, offers, or content. The coupons, offers, or content may be provided on demand. The demand triggering the coupon or offer may be a search by a user including specific terms or having predetermined account characteristics. For example, a user account may be identified as associated with a 39 year old iguana owner located in a specific geographic area. A merchant within that area may wish to provide a coupon to lizard owners searching the system. In this example, when the iguana owner searches, the coupon from the merchant may be included in their search result. It should be understood that the coupon need not necessarily be linked to the search. However, the demand may include, for example, the search terms, stored user profile information (e.g., interests, age, home town, gender), current user information (e.g., device type, device connectivity, device operating system, GPS location information for a device), the user's tags, the user's conversations, and usage history for the user.

The demand may be based on proximity sensing via a beacon. For example, a merchant may deploy a beacon within a store. As a customer holding a wireless device (e.g., smartphone, tablet computer) enters a coverage area for the beacon, the wireless device may transmit information to the beacon. The information transmitted to the beacon may include identification information for the device, for a user of the device, and/or for an account associated with the device. The beacon may receive this information and transmit the information to the content/offer module 107 to receive a customized offer for the user. The customization may be based on the information provided by the wireless device. In some circumstances, the user may not have previously established a personal account with the communication server 102. In such cases, information about the device such as the media access control identifier may be used to determine characteristics of the device holder. Characteristics may include device type, device model, and device interactions (e.g., with this or other beacons). In some circumstances, the user may have previously established a personal account with the communication server 102. In doing so, the user may have provided tags describing themselves to the world (e.g., self-discovery tag). The user may also be associated with private tags assigned by the merchant (e.g., self-tagging tags). In such cases, the additional tag data may be used to further select an appropriate offer for the user.

The selection of the offer may be based on offer rules store in the database 104. An offer rule may include one or more criteria (e.g., device characteristic, tag information, location, date, time, etc.) and an associated offer. In some implementations, a user may qualify for multiple offers. The offer rule may specify whether the associated offer may be combined with other offers, supersedes other offers, or is a default offer in the event another is selected. The offer rules may be provided by the merchant such as via a client device.

For example, a coupon code may provide content or features for download to the presenting user. The content/offer module 107 may be configured to confirm the content or features made accessible and transmit these to the client device 110. As another example, consider a casino implementation whereby the transaction may be a complimentary buffet dinner for users. The content/offer module 107 may be configured to identify users who qualify for the dinner and provide a conversation thread or threadsite including an identifier for the dinner to the user. The identifier may include a code, an image (e.g., QR code or other machine readable indicator), or other identifying information for the promotion. The identifier may then be presented at the restaurant for the dinner. In some implementations, the presentation may be via the messaging application on the client device 110. The communication server 102 may be configure to identify a recipient for this promotion, generate an identifier for the promotional offer to the identified recipient, transmit the identifier to the restaurant or casino management system, and consummate the redemption of the offer. In some implementations, the restaurant or casino management system acting as a third party transaction server may redeem the promotion in concert with the content/offer module 107.

The communication server 102 may be configured to communicate with the third party transaction server 150 via the network 190. The communication server 102 may include additional modules as described in connection with FIGS. 2A-2B below.

Figure 2A:
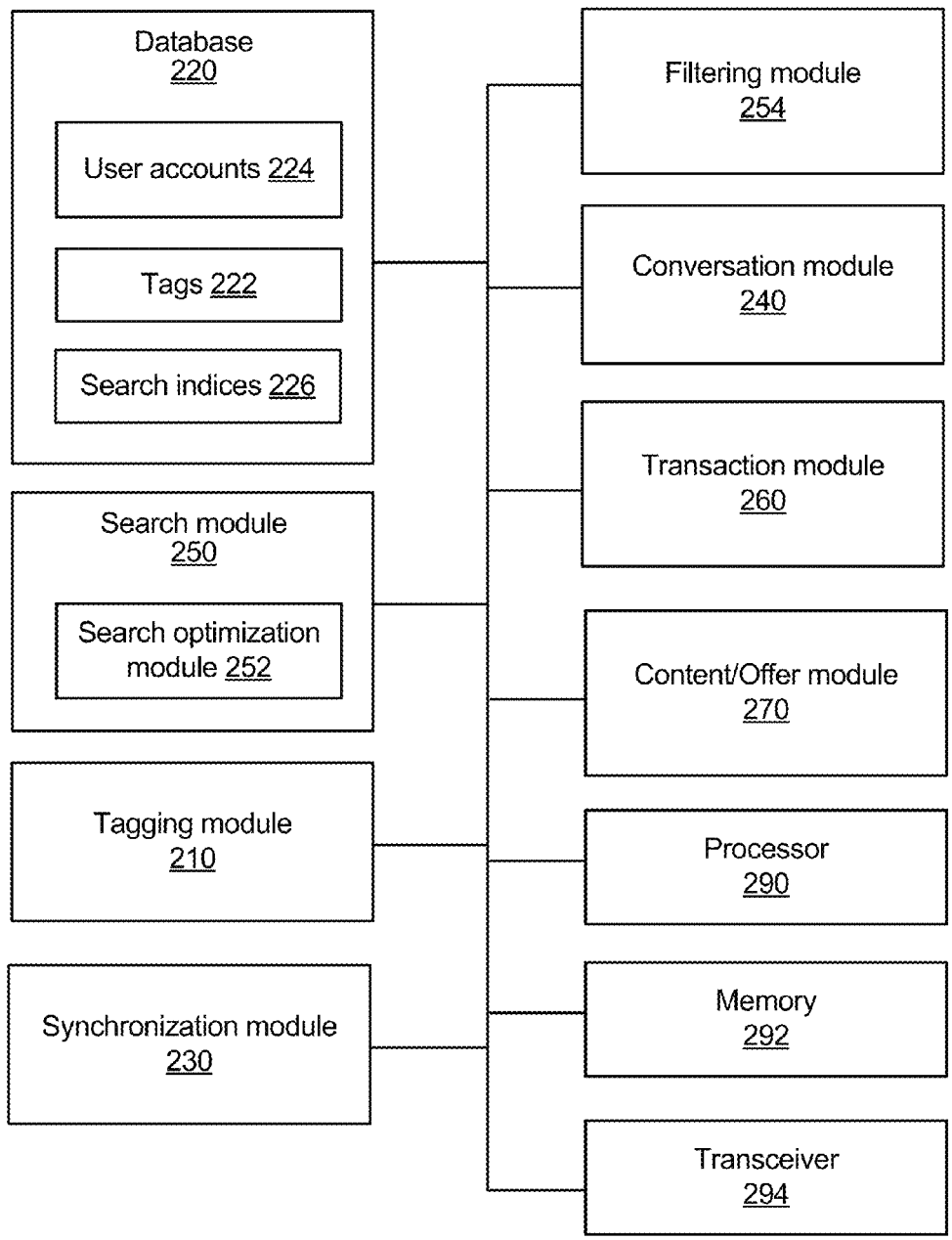
FIG. 2A is a functional block diagram of an exemplary wireless communication system in accordance with one embodiment.

FIG. 2A is a functional block diagram of an exemplary wireless communication system in accordance with one embodiment. The electronic communication system 200 may be implemented in whole or in part as the client device 110 or the communication server 102.

When implemented as the client device 110, the elements shown may be configured to provide tagging and communication services via the client device 110. To support tagging, a tagging module 210 is included. The tagging module 210 is configured to receive tags from a user such as via a user interface. The tagging module 210 may be configured to verify the tags such as verifying that: the tag is locally or globally unique, to ensure the tag is not offensive, the tag conforms to formatting requirements (e.g., minimum length, maximum length, characters included), or that the target item (e.g., conversation or contact) can be tagged by the user.

The tagging module 210 may be configured to communicate with a database 220 to conduct the tag verification. The database 220 may be implemented as in the database 104 (FIG. 1). The database 220 may include tags 222. The tagging module 210 may allow for predefined set of tags (e.g., tags 222), may allow rules to allow tags to be acceptable by a server (e.g., the communications server 102 in FIG. 1), and may allow for communication of the tags 222 between the client (e.g., the client device 110 in FIG. 1) and the database 220. The tags 222 are associated with one or more user accounts 224 which may also be stored in the database 220. The database 220 may further include tag verification rules. The tag verification rules may be provided through a user interface on the client device 110 to allow personal verification rules. In some implementations, the tag verification rules may be provided by the communication server 102 to enforce system-wide tag verification.

Continuing with the client device implementation of the electronic communication system 200, a synchronization module 230 may be included. The synchronization module 230 is configured to synchronize information stored on the client device 110 with the communication server 102. For example, the client device 110 may be configured to operate without a network connection (e.g., "offline"). In such a configuration, the client device 110 may receive tag information (e.g., new tags, updated tags). Similarly, while the client device 110 is offline, the communication server 102 may receive new tag information. The synchronization module 230 determines which information to transmit to the communication server 102 to synchronize the locally stored information with the centralized storage on the communication server 102. The determination may be based on a timestamp associated with the tag information. For example, when a record is created, modified, or deleted in the database 220, a timestamp may be applied to the record. The synchronization module 230 may identify a point in time to synchronize with the communication server 102 based on one or more of time, electronic communication device characteristics (e.g., power, processing bandwidth, network connectivity, temperature, memory, location), or based on a request for synchronization received from the communication server 102. Once the point in time is identified for synchronization, the synchronization module 230 may determine which records have been modified since the last synchronization time. These records are then transmitted to the communication server 102.

As noted, the synchronization module 230 may be configured to receive information from the communication server 102. The synchronization module 230 in receiving the information for updating is configured to reconcile the received information with the local information. For example, if a tag is updated in the database 220 and, prior to synchronization, another user creates the tag, the synchronization module 230 may be configured to transmit a message indicating the tag had previously been added. Alternatively, the synchronization module 230 may be configured to simply skip any updating of the tag information since the system reflects the desired state.

The synchronization module 230 thus far has described synchronization between a client device and a communication server. In some implementations, it may be desirable to synchronize a group of client devices. For example, if the client devices are sales associate electronic communication devices (e.g., point-of-sale tablet) at a store, it may be desirable to synchronize the tags between each associate's device. This provides a non-limiting advantage of allowing all associates to share information and enhance a customer's experience. For instance, a first associate in the shoe department may assist a customer with a new pair of Italian leather shoes. The first associate may tag the customer as interested in leather. While assisting the customer, the first associate may learn the customer is preparing for her thirtieth reunion next month. The first associate may subsequently transmit additional tags indicating the age, school, and reunion event for the customer. When the customer is seen browsing a different section of the store, say in the eveningwear department, because the tags from the first associate are synchronized onto other associates' devices, a second associate may use the previous information to direct the customer to a choice which is suited to their current interests and purchases (e.g., reunion attire for someone who graduated about 30 years ago and likes Italian leather).

The synchronization module 230 may store synchronization rules such as the synchronization point(s) and/or which devices to synchronize with in the database 220 or in a memory 292. While shown in FIGS. 2A-2B as separate elements, the database 220 may be included in a portion of the memory 292.

The synchronization module 230 may also be configured to coordinate conversation threads. A conversation module 240 may be included in the electronic communication system 200. The conversation module 240 is configured to manage threaded conversations. The conversation module 240 may allow conversation threads to be communicated from the client (e.g., the client device 110 in FIG. 1) to the database 220. The conversation module 240 may handle client requests to create a conversation thread with a target device and respond back to the client (e.g., the client device 110 in FIG. 1) and the target device with information related to the conversation thread that is created as a result of the client-initiated request. The target device may be another client device, for example. The conversation module 240 may receive information for a new conversation. The new conversation information may include one or more contacts to include in the conversation. The new conversation information may include conversation content such as text, image, video, or executable instructions (e.g., application). The content may be static or streaming (e.g., real-time). The new conversation information may include distribution rules. The distribution rules allow the conversation starter to control when, where, and with whom the conversation may be conducted. For example, the initiator may lock the list of recipients. Once locked, only the recipients identified by the initiator may participate in the conversation. Participation in a conversation can include one or more of accessing the conversation content, replying to the conversation content, forwarding the conversation content, and deleting the conversation content.

Another distribution rule may be to remove a conversation. Once removed by the initial author, all copies of the conversation thread are removed from the system. For example, consider a special promotion by a sports team wherein the first one thousand responders receive a limited edition sweatband. The promotion may be published in a conversation to all users tagged as fans of the team. Once one thousand people have responded to the promotion, the conversation thread may be deleted from the system. This affords, as one non-limiting advantage, robust control over various conversation thread or threadsite campaigns.

Once a conversation is started, the conversation module 240 may be configured to receive additional content contributed to the conversation. The additional content may be stored in the database 220. The additional content may be presented such as via a graphical user interface. In some implementations, the conversation module 240 may provide a conversation thread or threadsite indicating additional content has been received. For example, the conversation module 240 may receive the promotion from the sports team and provide a summary for display on via the client device "Limited Time Promotion from Sports Team!" In some implementations, the conversation module 240 may generate the conversation thread based on the conversation information (e.g., sender, content). In some implementations, the conversation information may include a summary for quick display.

As discussed above, a client device may operate offline. In such circumstances, conversations may be read, responded to, deleted, or started. The conversation information, like the tags, may be synchronized using the synchronization module 230. The synchronization module 230 may identify a point in time to synchronize with the communication server 102 and/or other client devices as discussed above with reference to tag synchronization.

The electronic communication system 200 may include a transaction module 260. In a client device, the transaction module 260 is configured to receive payment information and transmit the received information for processing or payment remittance. The payment information received by the transaction module 260 may include username, account number, password, personal identification number, and the like.

The electronic communication system 200 may include an offer/content module 270. The offer/content module 270 may be configured to receive coupons or offers. The coupons or offers may be received from the communication server 102 or from an on-site information device 130 (e.g., beacon). In some implementations, the coupons or offers are received on demand. The demand triggering the coupon or offer may be a search by a user including specific terms or having predetermined account characteristics as described above in reference to FIG. 1. The triggering demand may be the location of the electronic communication system 200 (e.g., entering an area covered by a beacon). In some implementations, the offer/content module 270 in a client device may transmit to and receive from information the offer/content module 107 of the communication server 102.

The electronic communication system 200 may include a search module 250. The search module 250 may be optimized in a way to return efficient result sets based upon client initiated public tag search requests. When implemented in a server (e.g., the communication server 102 in FIG. 1), the search module 250 may have the most up to date information related to public tags and may be able to provide this up to date information. When implemented in a client device (e.g., the client device 110 in FIG. 1), the search module 250 is configured to receive search terms and attributes and execute a search based on the received information. The search module may be configured to identify free text, tags, categories, geography, products, events, and/or proper names included in the received information. Using the identified terms and attributes, the search module 250 performs a search of one or more datastores. The datastores may include structured schemas (e.g., categories and directory), unstructured schemas (e.g., tagging), search index (e.g., relevance scored), and social graph analysis (e.g., relationships). The datastore may include the database 220 at the electronic communication system 200. In some implementations, the search module 250 may be configured to transmit the search information via the transceiver 294 to the communication server 102 for searching of a central datastore.

As shown in FIG. 2A, the database 220 includes search indices 226. The search indices may be used by the search module 250 to expedite searches and provide relevance information for a given search. For example, a tag may be associated with many users. As such, a search for the exact tag may associate the accounts associated with the exact match as a highly ranked result, while an account associated with a tag including the tag text may be given a lesser rank. When searching multiple datastores, the search module 250 may be configured to aggregate the results received from each source. The ranking of the results may also be based on the source. For example, if a search result was obtained from the database 220 on the client device, the rank may be higher than the ranking assigned to a remote source.

The search module 250 may be configured to communicate via a predefined search service interface (not shown). This can facilitate the search module 250 providing and consuming search services which conform to the service interface. Thus, any third party may publish the location of their search interface and allow client devices to configure these as searchable destinations. Similarly, the user may assign a ranking to each datasource to further personalize how much weight to give to a result from a particular source.

As discussed above, beacons may be deployed to transmit tags or other communications to devices which enter a predetermined area. To allow client devices to control the flow of information from beacons, a filtering module 254 may be included in the electronic communication system 200. The filtering module 254 may be configured to receive beacon conversation items in a conversation thread, such as coupons or offers, and selectively process the received conversation items. The selective processing may be based on rules stored in the database 220. A rule may identify beacons sources which the client device will receive beacon conversation items from. Beacon sources may be identified by a unique identifier associated with the entity responsible for deploying the beacon (e.g., merchant). A rule may identify communication types to receive via beacon conversation items. For example, a rule may accept offers from merchants or brands associated with specified tag information. The content of the conversation item may also be limited such as by media type included in the conversation item. This allows the client device to manage resource usage during discovery by dynamically adjusting the content it can/will handle based on available resources (e.g., power, processing, memory, bandwidth).

When the electronic communication system 200 is implemented as either a client device of a communication server, the memory 292 may include both read-only memory (ROM) and random access memory (RAM). The memory 292 may provide instructions and data to a processor 204. A portion of the memory 292 may also include non-volatile random access memory (NVRAM).

The processor 290 is configured to control operations of the electronic communication system 200. The processor 290 may also be referred to as a central processing unit (CPU). The processor 290 may perform logical and arithmetic operations based on program instructions stored within the memory 292. The instructions in the memory 292 may be executable to implement aspects of the methods described herein. The elements included in the electronic communication system 200 may be coupled by a bus 299. The bus 299 may be a data bus, communication bus, or other bus mechanism to enable the various components of the electronic communication system 200 to exchange information. It will further be appreciated that while different elements have been shown, multiple features may be combined into a single element, such as bidirectional search configuration and related communications.

The electronic communication system 200 may also include a transceiver 294. The transceiver 294 may include a transmitter and a receiver configured to transmit and receive data between the electronic communication system 200 and a remote location. The transceiver 294 may be configured for wired, wireless, or hybrid wired/wireless communication. In some implementations, the transceiver 294 may include one or more of an antenna, a network interface controller, a signal generator, an amplifier, and a signal filter.

When the electronic communication system 200 is implemented as the communication server 120 (FIG. 1), the elements provide services which mirror those described in reference to the client device above. However, as the communication server 120 provides service to many client devices, the communication server 120 implementation of the electronic communication system 200 is configured to control the access of the system and data to authorized users. For example, the search optimization module 252 for the communication server 120 may be configured to differentially optimize searches for each user. For example, the search optimization module 252 may consider the local tags defined by a user for searches submitted by the user in addition to the global tags included in the tags 222. Other optimizations consistent with the methods described may be included in the search optimization module such as consideration of a social graph, search indices, metadata searching, and the like. In another example, a user may initiate a public tag search, and the user request may be performed by the search module 252 in the communication server 102 and processed through the search optimization module 252 in the communication server 102 based in part on predefined system local rules as well as search rules in the communication server 102.

Figure 2B:
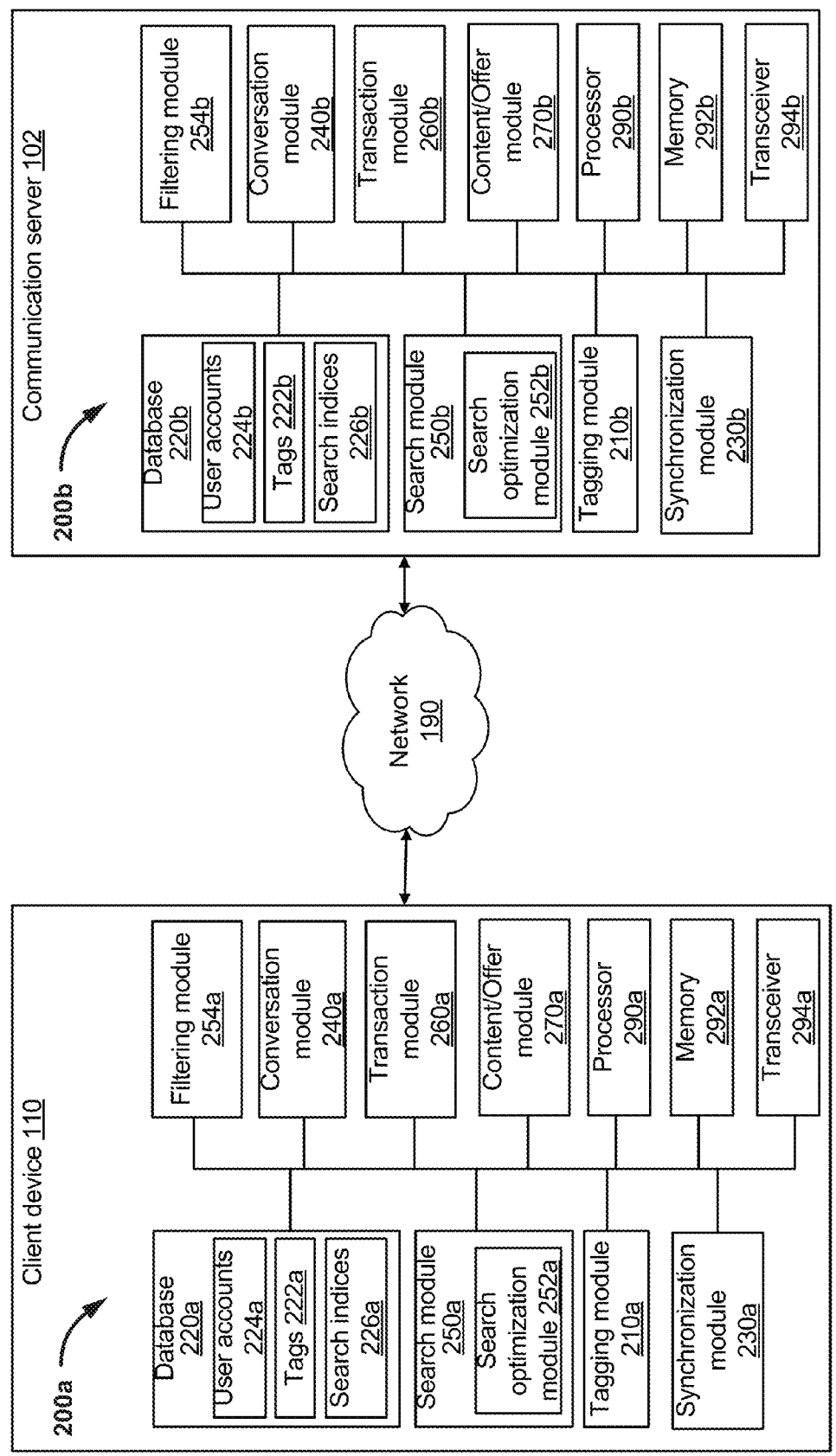
FIG. 2B is a functional block diagram of an exemplary implementation of the wireless communication system in FIG. 2A.

FIG. 2B is a functional block diagram of an exemplary implementation of the wireless communication system in FIG. 2A. As illustrated in FIG. 2B, the electronic communication system 200 (FIG. 2A) may be implemented as an electronic communication system 200a in the client device 110 and/or as another electronic communication system 200b in the communication server 102. Reference to the electronic communication system 200 (FIG. 2A) herein refers to any implementations of the electronic communication system 200a, 200b. The client device 110 may be in communication with the communication server 102 through the network 109. Individual modules of the electronic communication systems 200a, 200b may further in communication with one another either within each of the electronic communication systems 200a, 200b through the network 190. Reference to the modules in the electronic communication system 200 (FIG. 2A) herein, such as the tagging module 210, refers to any implementations of such module in either the client device 110 or the communication server 102, such as tagging modules 210a, 210b.

Figure 3:
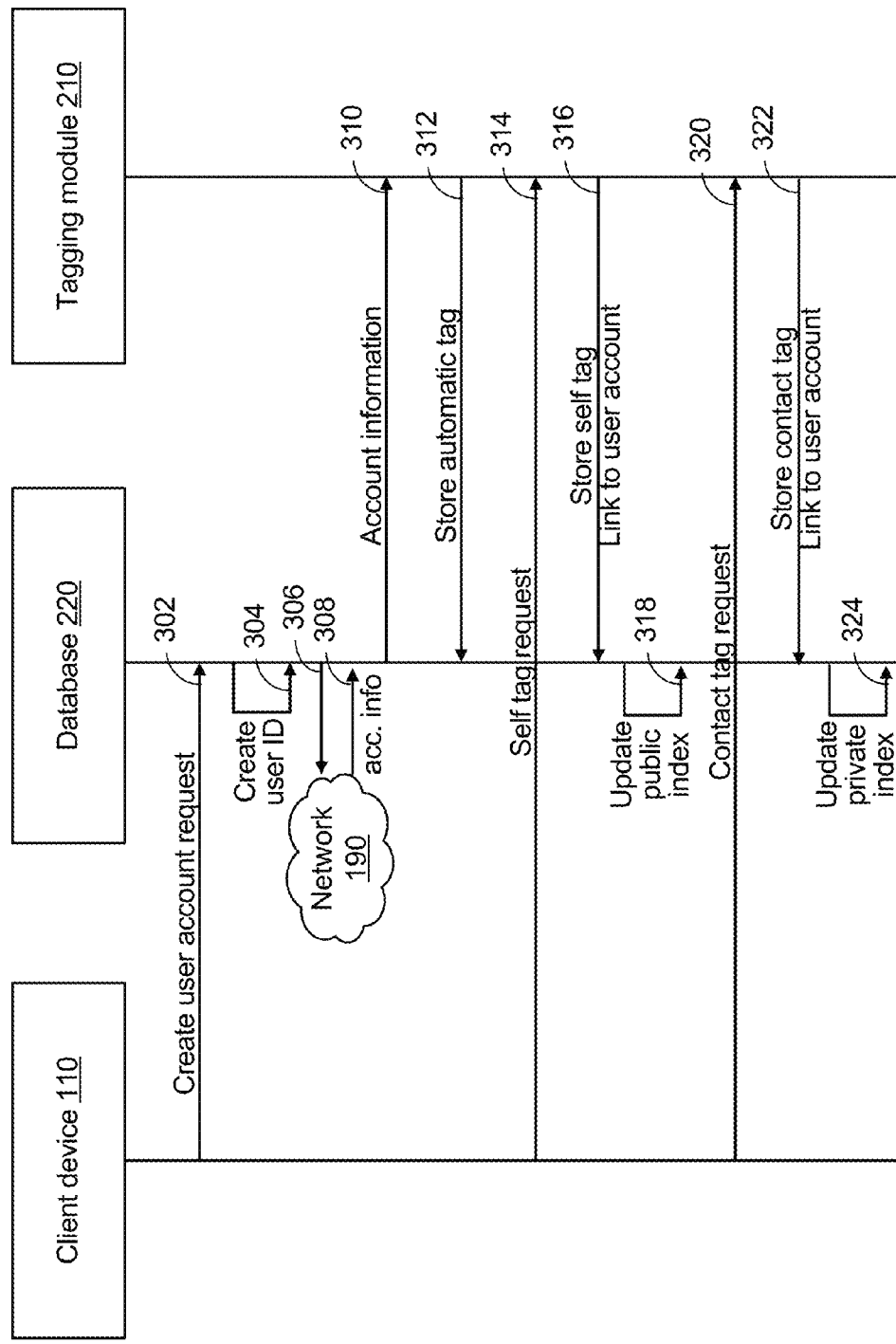
FIG. 3 is an exemplary message diagram for creating tags in accordance with one embodiment.

FIG. 3 is an exemplary message diagram for creating tags in accordance with one embodiment. The message flow of FIG. 3 shows messages exchanged between several entities which can be included in a communication system. For ease of explanation, the number of entities shown has been limited. However, it will be understood that additional entities can be added or multiple entities combined consistent with the description herein. In one implementation. the tagging module 210 may be implemented in the communication server 102 and/or the client device 110 (FIGS. 1-2B).

Messaging 302 may be performed to create a new user account and can be performed by accessing the database 220. In order to create a user account the client device 110 may send identifying information, such as name, location, school, job title, etc., of the user's existing online accounts for social networking services (e.g., Facebook™ Twitter™, Google+™, etc.) or any other online services such as e-mail accounts, additional personal information, and new account information such as ID and password with the service provider of the communication server 102. In one embodiment, the user may be given an option to input connection information (e.g., username, password, address) for the user's existing online accounts. In another embodiment, the user may only be given an option to create a new account with the service provider. In another embodiment, existing online account information may be automatically searched based on user-provided profile information (e.g., name, age, gender, location, school, work, name of business, place of business, industry, etc.), and the user may be prompted to link the automatically searched existing online user personal or business accounts. The message 302 may be received by an access controller. In response to message 302, a new user account space may be created in the database 220 to store further information about the user of the client device 110. The user account may be further linked to the user's existing online account and additional information provided by the user of the client device 110.

Messaging 304 may be performed to create an automatic user ID specific to the new user of the service. The automatic user ID may function as a unique identifier of the user in the system 100 and may further function as a public identifier of the user. The automatic user ID may also be the only public identifier of the user as the user may change privacy settings associated with the user account. The automatic user ID may be linked to the newly created user account in the database 220. In one embodiment, the communication server 102 may automatically generate and assign an internal user ID. The automatic user ID may be of random alphanumeric characters.

Messaging 306 may be performed to access existing user information from the user's existing online accounts through the network 190. Messaging 306 may further involve one or more modules to search, request, or select relevant user data from the existing user in the user's existing online account information.

Messaging 308 may be performed to gather existing user information from the user's existing online accounts through the network 190. Messaging 308 may further involve one or more modules to parse and organize the received existing user information to optimize storing the information in the database 220. The new user account and ID created in response to the messages 302 and 304 in the database 220 may be linked to the received existing user information.

Messaging 310 may be performed to create automatic tags based on the user information associated with the newly created user account in the database 220. In one embodiment, the received existing user information may be automatically forwarded from the database 220 to the tagging module 210 for the tagging module 210 to generate one or more new tags. In another embodiment, the user may be prompted with pre-populated potential tags and asked to confirm creation of the pre-populated tags. Once the tagging module 210 receives the user information, it may generate one or more tags based on the user information associated with the user account in the database 220. The tagging module 210 may be configured to parse user information to generate one or more new tags, and it may be further configured to determine the optimal key words or phrases so that the new tags are not redundant and yet adequately represent automatically gathered user information, for example.

Messaging 312 may be performed to store the newly generated tags in the database 220. In one embodiment, the newly generated tags may be linked with the user account created in response to message 302. In another embodiment, the new tags may be further linked with one or more existing tags associated with other user accounts in the database 220 to facilitate searching of the tags and associating of the tags with related key words or information. In one embodiment, a search index in the database 220 may be updated reflecting the addition of the new tags and their association with the new user account.

After the user creates the new user account, the use may further make a public self tag request, and messaging 314 may be performed to generate one or more public self tags through the tagging module 210. The user may select and input on the client device 110 one or more words or phrases to create public self tags, which may be self-descriptions the user would like to be associated with. The client device 110 then may send the user inputted words or phrases and request the tagging module 210 to create public self tags based on the words or phrases. In one embodiment, the client device 110 may display a message to the user suggesting a better tag words or phrases. In another embodiment, the client device 110 may display a message to the user notifying of tagging restrictions and that the tag the user intends to create is too long, spelled incorrectly, inappropriate, or offensive. In one embodiment, the user may be allowed to override the tagging restrictions, and in another embodiment, the user may be allowed to override only some of the tagging restrictions. Upon receiving the public self tag requests, the tagging module may generate one or more tags based on the user inputted words or phrases.

Messaging 316 may be performed to store the user generated public self tags in the database 220. The public self tags may be linked to the user's account in the database 220 so that searching for the tags, for example, would lead to the user account.

Upon storing the public self tags and linking them to the user account, messaging 318 may be performed to update a public search index. Reflecting various implementations of a public search, the public search index may be one of many search indices in the database 220 and may link and organize various tags to optimize public searches. In one embodiment, a public search may be for searching the entire user accounts in the database 220 regardless of whether the search requester has any connection with the users of the user accounts. In another embodiment a public search may be for searching the entire user accounts except the ones listed in the search requester's contacts. In another embodiment a public search may be searching the entire accessible conversation threads in the database 220 regardless of the search requester's involvement in the conversation threads. In one embodiment, a public search may be tailored to the search requester's user account. In another embodiment, a public search may universal to all the user accounts in the database 220.

The user may connect with other users in the system 100 and request to add one or more private contact tags to those other users, and messaging 320 may be performed to generate private contact tags through the tagging module 210. The user may input through the client device 110 one or more words or phrases to generate private contact tags, which may be associated with one or more of the user's contacts. In one embodiment, the private contact tags are user-specific, and they may reflect the user's own description of the contact only available to the user.

Messaging 322 may be performed to store the private contact tags created by the user in the database 220. The private contact tags may be linked to the user account to allow only the user linked to the private contact tags can view the private contact tags, for example.

Upon storing the private contact tags and linking them to the user account, messaging 324 may be performed to update a private search index. The private search index may be one of many search indices in the database 220. In one embodiment, the private search index may be linked to the user account in the database 220 to allow the user's exclusive access to the private contact tags.

Figure 4:
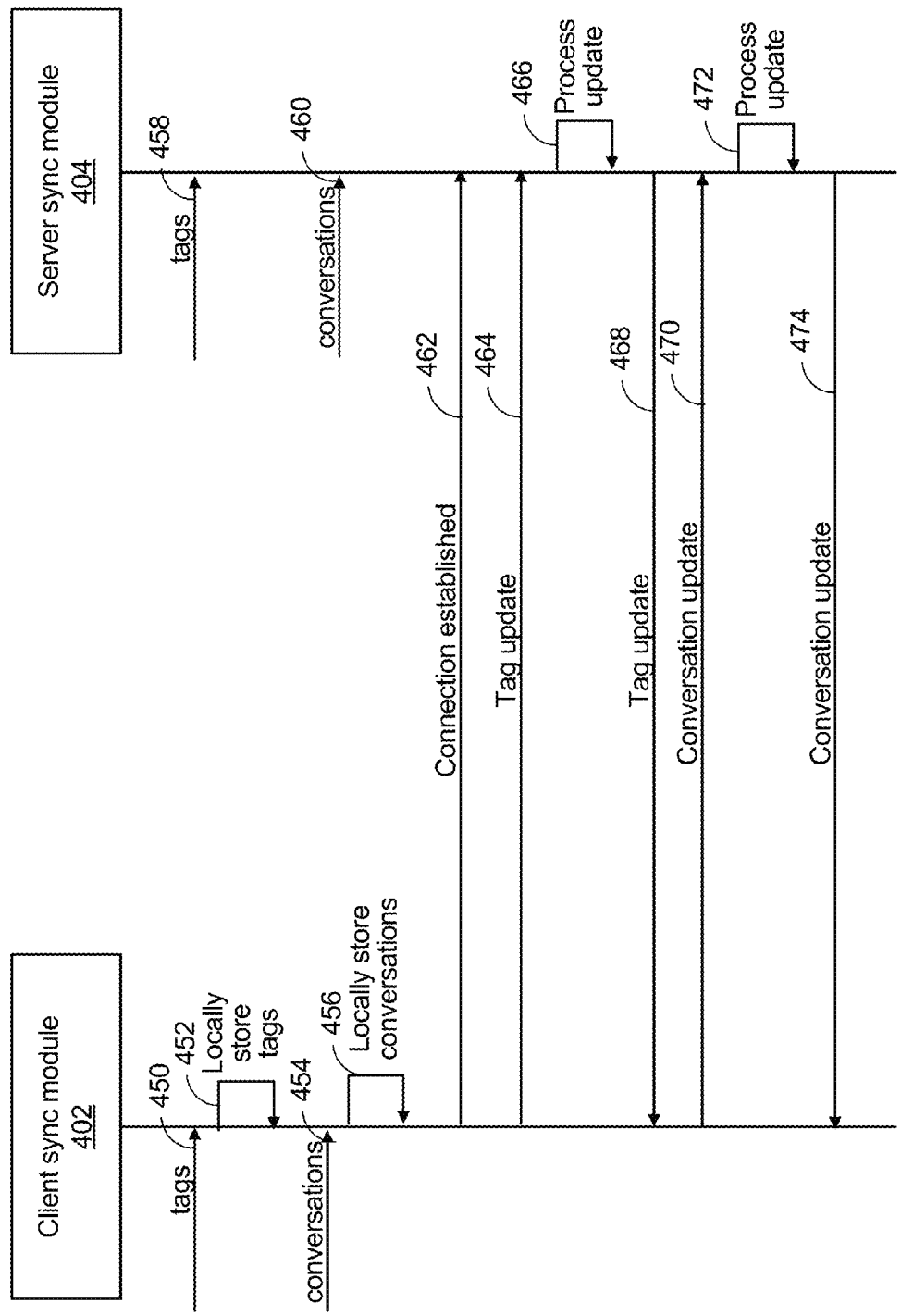
FIG. 4 shows a messaging diagram for an example synchronization session between a client device and a communication server.

FIG. 4 shows a messaging diagram for an example synchronization session between a client device and a communication server. While the messaging diagram of FIG. 4 shows messages between a client synchronization module 402 and a server synchronization module 404, it will be appreciated that other intermediary elements may be included. For the sake of clarity, these intermediaries have been omitted from the discussion of FIG. 4.

The synchronization session may be used to transfer information obtained while a client device is off line. The information may be obtained at the client device or received from other users at the communication server. As such, when the client device reconnects to the network and establishes a link with the communication server, both the client and server may be configured to synchronize to ensure the real time search and discovery is maintained.

Via message 450, the client synchronization module 402 receives one or more tags from the client device 110 (FIG. 1). Via message 452, the tags are stored locally. In storing the tags locally, the client synchronization module 402 may include information indicating that the tags have not been communicated to the server.

Similarly, via message 454, the client synchronization module 402 receives one or more conversations. Via message 456, the client synchronization module 402 locally stores the conversations. As with the tags, the conversations may be stored in association with information indicating the conversations have not been communicated to the server. As shown in FIG. 4, the server synchronization module 404 may also receive tags and conversations via messages 458 and 460, respectively, while the client is disconnected.

At a point in time, the client device may connect to the communication server. Via message 462, a connection between the client synchronization module 402 and the server synchronization module 404 is established. Establishing a connection may include transmitting a message identifying the client device and a user account for which synchronization is to be performed. Via message 464, the tags to be synchronized are transmitted to the server synchronization module 404. The server synchronization module 404 is configured to process the updated tag information via message 466. Processing the updated tag information may include validating the received tags, updating the database for the received tags, triggering re-indexing, triggering the rebuild of a social graph, triggering the regeneration of search metadata, or the like. The update may include adding new tag, deleting a tag, or modifying a tag for a contact, conversation, or user account.

Processing the tag update may also include reconciling the updates received from the client device with any tag information received while the client device was disconnected. The reconciliation process ensures that redundant tags are not stored, thereby conserving resources such as processing time, power, and memory. In some implementations, the server synchronization module 404 may be configured to transmit tags to the client synchronization module 402. For example, a contact included in the contact list at the client device may update their global tags with the server while the client device is offline. Accordingly, when the client device reconnects, the new tag information may be transmitted to the client device such as via message 468.

A similar process is performed for conversations whereby via message 470 conversations identified for synchronization are transmitted to the server synchronization module 404 and processed via message 472. Any conversations including the user of the client device which are updated while the client device was offline will be provided to the client synchronization module 402 via message 474.

Figure 5A:
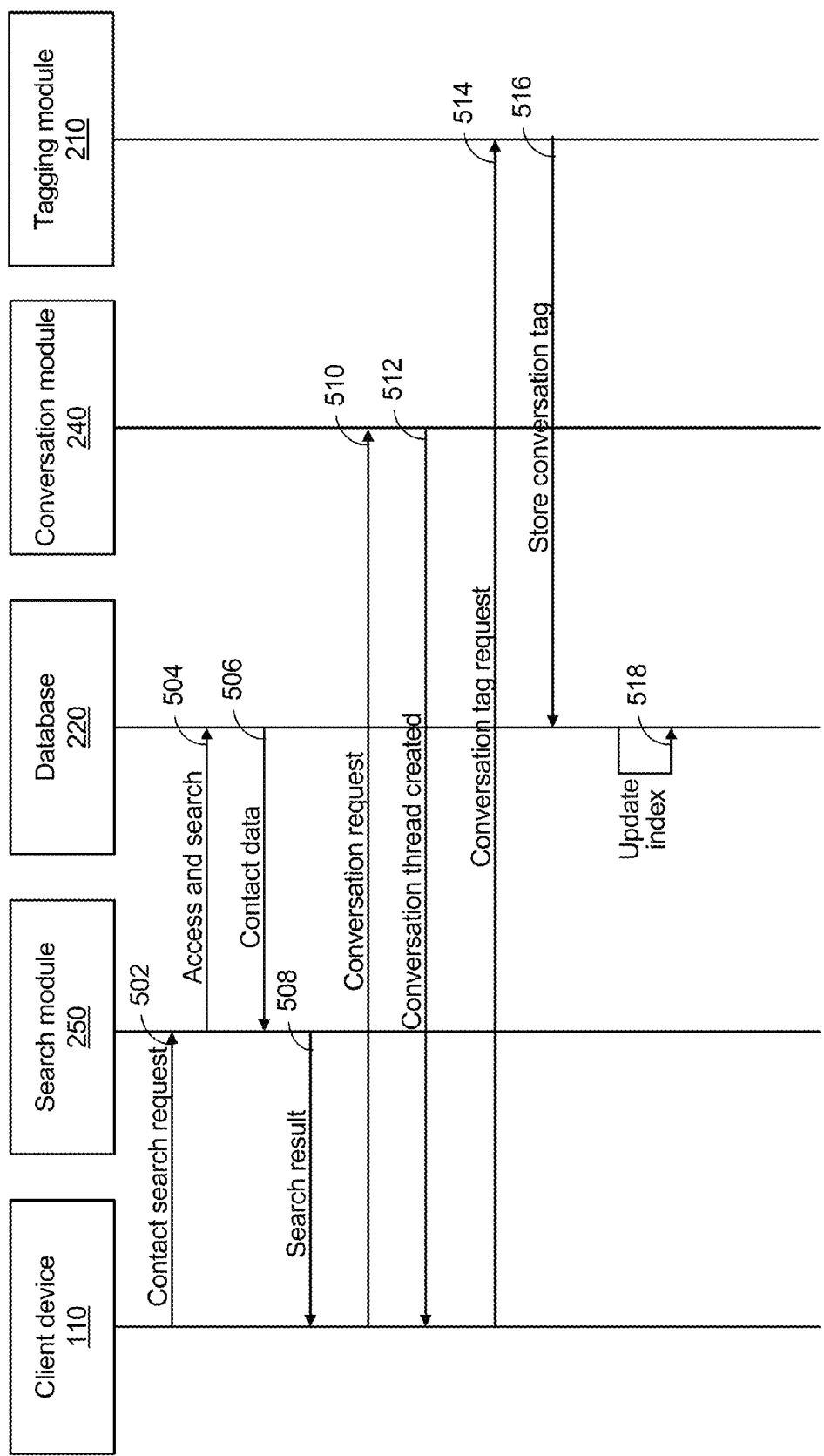
FIG. 5A is an exemplary message diagram for creating a conversation thread in accordance with one embodiment.

FIG. 5A is an exemplary message diagram for creating a conversation thread in accordance with one embodiment. The message flow of FIG. 5A shows messages exchanged between several entities which can be included in a communication system. For ease of explanation, the number of entities shown has been limited. However, it will be understood that additional entities can be added or multiple entities combined consistent with the description herein. In one implementation, the search module 250, the conversation module 240 and the tagging module 210 may be implemented in the communication server 102 and/or the client device 110 (FIGS. 1-2B).

Messaging 502 may be performed to request a private search to be executed by the search module 250. The client device 110 may send search terms inputted by the user of the client device 110. In one embodiment, the user may be prompted with options to select a subset of the user's contacts to narrow the search target. The options may be predefined (e.g., categories) or dynamically specified such a via a user input value. In one embodiment, the user may be given an option to exclude certain contacts from the private search. In another embodiment, a private search may be performed to search the user's entire contacts. In one embodiment, a private search may be performed on the user's conversation threads with one or more of the user's contacts. In another embodiment, the user may be given an option to exclude conversation threads from the private search. In one embodiment, the user may be given suggested search terms which the user may select instead of the user inputted search terms.

Messaging 504 may be performed to access and search relevant portions of the database 220 by the search module 250. Once the search module 250 receives a private search request with search terms, for example, the search module 250 may process the search terms to optimize the private search. In one embodiment, only the private search index in the database 220 may be searched in response to the private search request. In another embodiment, the search module 250 may be configured to prioritize the private search index over other types of information of the user's contacts in the database 220. In one embodiment, the search module 250 may search the user's private tags. In another embodiment, the search module 250 may search the user's private tags in conjunction with the user's contacts' public tags. In one embodiment, the search module 250 may access only information on the user's contacts in the database 220 in response to the private search request. In one embodiment, the search module 250 may access information on the user's contacts as well as the user's conversation with any of the user's contacts in the database 220 in response to the private search request.

Messaging 506 may be performed to retrieve contact data from the database 220 by the search module 250. After the search module 250 performs a search on relevant subsets of data in the database 220, the search module 250 may receive contact data as a result of the private search. The search module 250 may further process the retrieved contact data in preparation for presenting the search result to the user of the client device 110.

Messaging 508 may be performed to receive and display search result by the client device 110. In one embodiment, the search module may sort and organize the contact data it retrieved from the database 220. In another embodiment the search module 250 may send raw search result to the client device 110, and the client device may sort and organize the raw search result contact data it received from the search module 250. In one embodiment, the search result may be presented to the user based on user-defined priorities. In one embodiment, the search result may be prioritized based on relevance and/or the user's communication frequency with the contacts, for example.

Once the user is provided with a private search result, the user may select one or more of the contacts from the search result, and messaging 510 may be performed to request to create a conversation thread by the client device 110. In one embodiment, the user may select one or more contacts from the private search result to start a conversation thread. In one embodiment, anyone who joins the conversation thread may invite and add others. In one embodiment, the user may select to create a locked conversation thread, which may limit adding a new participant to the conversation thread by participants but may allow the conversation originator the option to add participant at any time. In one embodiment, the user may select to create a broadcast conversation thread, which only allows one-way communication from the user to other participants of the thread. In one embodiment, a broadcast conversation thread may allow participants to identify others within the broadcast. In another embodiment, a broadcast conversation thread may disallow participants from identifying others within the broadcast if the user elects to enable blind carbon copy (BCC). In one embodiment, the user may select to blind carbon copy (BCC) the conversation thread recipients so that the recipient may not be able to view other conversation participants nor their response to the user. The client device 110 may receive from the user all the requisite and optional inputs for creating a conversation thread and may send a conversation request based on the user's inputs.

Messaging 512 may be performed by the conversation module 240 to create a conversation thread based on the conversation request from the user of the client device 110. The conversation module 240 may be configured to create a communication or conversation thread to which multiple users of the system 100 may be added. In one embodiment, the conversation thread may also be stored in the database 220. In one embodiment, the conversation thread may be linked to all the participants of the conversation, and in another embodiment, the conversation thread may be only linked to the conversation requester. The conversation module 240 may be configured to allow multiple participants to send and receive instant conversation items including text, audio, video, image, other content, etc. through the conversation thread. According to the user's conversation request, the conversation module 240 may be configured to limit the thread participant's ability to reply to the communication, view other thread participant, and/or add additional participants.

Messaging 514 may be performed to add one or more tags to the conversation created in response to the user's conversation request. The user may input one or more words describing the conversation thread on the user device 110, and the user device may send the conversation tag information to the tagging module 210. In one embodiment, the conversation tag may be searchable by any user in the system 100. In another embodiment, the conversation tag may be searchable only by the user's contacts. In another embodiment, the conversation tag may not be searchable by users other than the creator of the conversation thread. In one embodiment, the conversation tags may be public tags, which may be searchable by any user of the system. In another embodiment the conversation tags may be private tags, which may be searchable only by the tag creator. In another embodiment, the conversation tags may be either private or public and the tag creator may be given an option to choose either.

Messaging 516 may be performed to store the conversation tags created in response to the user's conversation tag request. In one embodiment, the conversation tags may be linked to the conversation thread in the database 220. In one embodiment, the conversation tags may also be linked to all the participants of the conversation thread, and in another embodiment, the conversation tags may only be linked to the conversation tag creator.

Messaging 518 may be performed to update one or more indices in the database 220 based on the newly created conversation tags. In one embodiment, the private search index may be updated to reflect a creation of the private conversation tags. In another embodiment, the public search index may be updated to reflect a creation of the public conversation tags. In another embodiment, both the private and public search indices may be updated to reflect a creation of the private and public conversation tags.

Figure 5B:
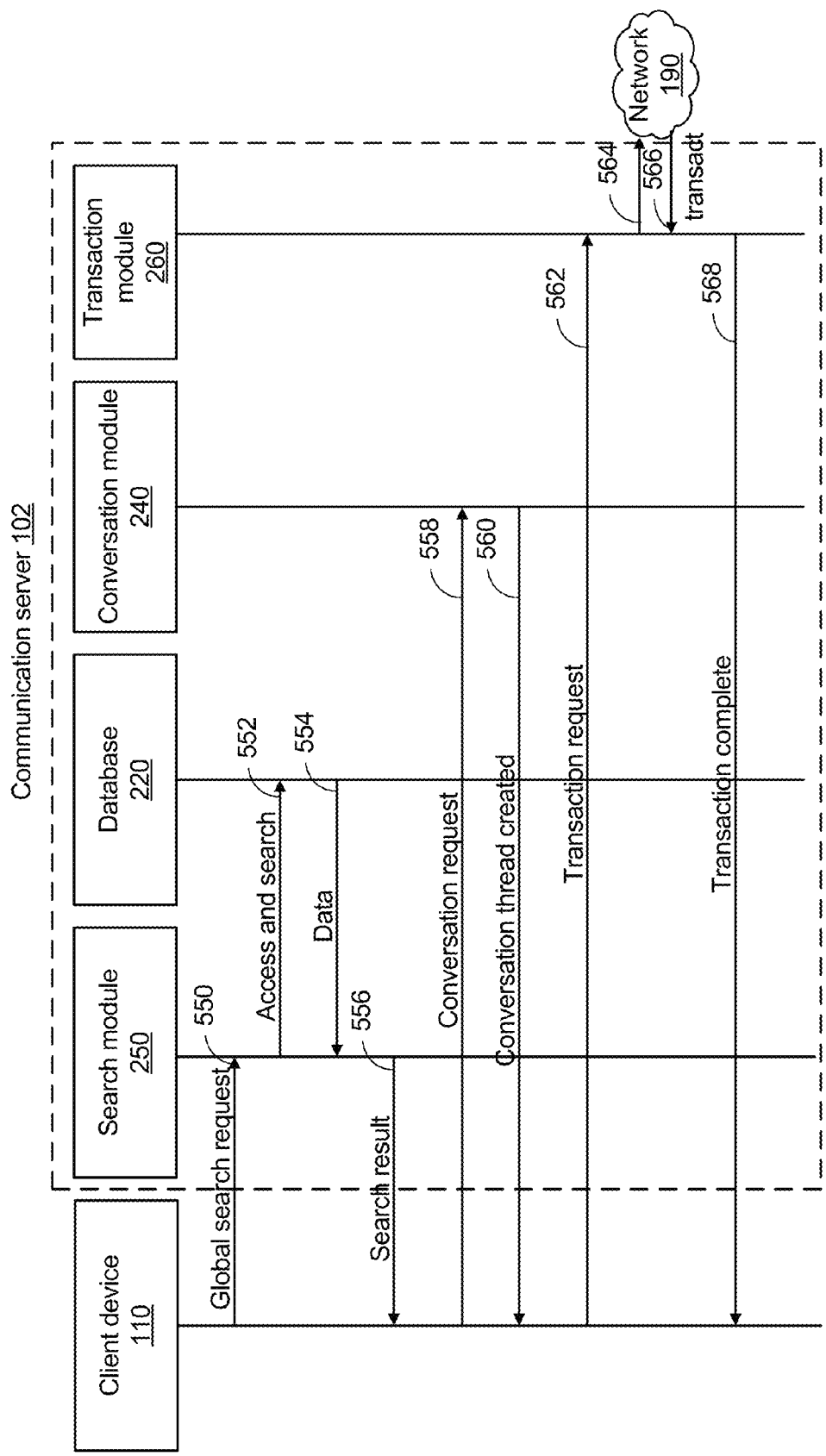
FIG. 5B is an exemplary message diagram for transacting through a conversation thread in accordance with one embodiment.

FIG. 5B is an exemplary message diagram for transacting through a conversation thread in accordance with one embodiment. The message flow of FIG. 5B shows messages exchanged between several entities which can be included in a communication system. For ease of explanation, the number of entities shown has been limited. However, it will be understood that additional entities can be added or multiple entities combined consistent with the description herein. In one implementation the search module 250, the conversation module 240, and the transaction module 260 may be implemented in the communication server 102 and/or the client device 110 (FIGS. 1-2B).

Messaging 550 may be performed to request a public search to be executed by the search module 250. The client device 110 may be configured to send search terms inputted by the user of the client device 110. In one embodiment, the user may be prompted with options to select a subset of the database 220 to narrow the search target. In one embodiment, the user may be given an option to exclude the user's entire contacts from the public search, in another embodiment, the user by given an option exclude some of the user's contacts from the public search. In one embodiment, a private search may be performed to search the database 220. In one embodiment, a public search may be performed on the public conversation threads regardless of whether the user or any one of the user's contacts is participating in the conversation. In one embodiment a public search may be performed on public conversation tags. In another embodiment, the user may be given an option to exclude conversation threads from the public search. In one embodiment, the user may be given suggested search terms which the user may select instead of the user inputted search terms.

Messaging 552 may be performed to access and search relevant portions of the database 220 by the search module 250. Once the search module receives a public search request with search terms, for example, the search module 250 may be configured to process the search terms to optimize the public search. In one embodiment, the public search index in the database 220 may be searched in response to the public search request. In one embodiment, the search module 250 may be configured to search other users' public tags. In another embodiment, the search module 250 may be configured to search the user's private tags in conjunction with other users' public tags. In one embodiment, the search module 250 may access information on other users' public profile information in the database 220 in response to the private search request. In one embodiment, the search module 250 may be configured to access information on other users' public profile as well as other users' conversation having public tags in the database 220 in response to the public search request.

Messaging 554 may be performed to retrieve public search data from the database 220 by the search module 250. After the search module performs a search on relevant subsets of data in the database 220, the search module 250 may receive data as a result of the public search. The search module may further process the retrieved public search data in preparation for presenting the search result to the user of the client device 110.

Messaging 556 may be performed to receive and display search result by the client device 110 to the user. In one embodiment, the search module 250 may be configured to sort and organize the public data it retrieved from the database 220. In another embodiment the search module may send raw search result to the client device 110, and the client device may sort and organize the raw search result data it received from the search module. In one embodiment, the search result may be presented to the user based on user-defined priorities. In one embodiment, the search result may be prioritized based on relevance, priority, location, and/or distance from the user, for example.

Once the user is provided with a public search result, the user may select one or more of the entries (e.g., other personal users, business users, etc.) in the search result, and messaging 558 may be performed to request to create a conversation thread by the client device 110. In one embodiment, the user may select one or more entries from the public search result to start a conversation thread. In one embodiment, anyone who joins the conversation thread may invite and add others. In one embodiment, the user may select to create a locked conversation thread, which may limit adding a new participant to the conversation thread. In one embodiment, the user may select to create a broadcast conversation thread, which only allows one-way communication from the user to other participants of the thread. In one embodiment, the user may select to blind carbon copy (BCC) the conversation thread recipients so that a recipient may not be able to view other conversation recipients who received the same conversation item through the conversation thread. The client device 110 may be configured to receive from the user all the requisite and optional inputs for creating a conversation thread and may send a conversation request based on the user's inputs.

Messaging 560 may be performed by the conversation module to create a conversation thread based on the conversation request from the user of the client device 110. The conversation module may create a communication thread to which multiple users of the system 100 may be added. In one embodiment, the conversation thread may also be stored in the database 220. In one embodiment, the conversation thread may be linked to all the participants of the conversation, and in another embodiment, the conversation thread may be only linked to the conversation requester. The conversation module 240 may be configured to allow multiple participants to send and receive instant conversation items including text, audio, video, image, other content, etc. through the conversation thread. According to the user's conversation request, the conversation module 240 may be configured to limit the thread participant's ability to reply to the communication, view other thread participant, and/or add additional participants.

Messaging 562 may be performed to request transaction with one of the participants of the conversation thread. As the user communicates with one or more other users through the conversation thread, the user may decide to transact with one of the participants. In one embodiment, the user may create a transaction channel associated with the conversation thread. In one embodiment, the conversation thread may have embedded transaction options for the user to choose from. In another embodiment, a transaction channel may have been created when the conversation was tagged by the user or other participants as a transactional thread. In one embodiment, the user may be prompted to add the amount of money to be exchanged and the method of exchanging money. In another embodiment, the transactional information (e.g., amount of money, method of payment, etc.) may be prepopulated based on the conversation among the participants in the conversation thread and/or one or more conversation threads. In one embodiment, the user may be prompted to edit transaction information and/or add additional information (e.g., place to meet, delivery method, return or exchange policy information, customer service, information, promotional information, discounts, etc.) in connection with the transaction.

Messaging 564 may be performed to send transactional information to the network 190 to consummate the transaction requested by the user of the client device 110. Once the transaction module 260 receives and processes the transaction information provided by the user, the transaction module 260 may be configured to forward that information to a different server (e.g., the third party transaction server 150 in FIG. 1) through the network 190. In one embodiment, a single transaction may involve more than one transaction servers and may involve more than one of messages similar to message 564.

Messaging 566 may be performed to report back to the transaction module 260 to indicate whether the transaction requested by the user of the client device 110 was successful. In one embodiment, the third party transaction server 150 may be configured to send a confirmation code or a receipt number upon completion of the transaction. In one embodiment, more than one servers may be involved in the transaction, and there may be more than one messages such as message 566 to consummate the transaction. In one embodiment, the transaction module 260 may be configured to receive a transaction unsuccessful message through the network 190, and there may be one or more following messages between the transaction module 260, client device 110, and/or third party servers 150 (FIG. 1) to complete a successful transaction. In one embodiment, the transaction may not need a third party server, and the entirety of the transaction may be consummated within the communication server 102 (FIG. 1) without messages 564 and 566. In one embodiment, the transaction module 260 implemented in the client device 110 (FIG. 1) may transmit a transaction request to a server by means of the network 190 for processing without requiring that a response (successful or unsuccessful) being received by the transaction module 260 implemented in the client device 110 (FIG. 1) from the network 190 in order to finalize the transaction.

Messaging 568 may be performed to send a transaction complete report to the client device 110 in response to the transaction request of the user of the client device 110. Upon completion of a successful transaction, the transaction module 260 may have obtained a confirmation code or a receipt number of the completed transaction. The transaction module 260 may forward that information to the client device 110 for further reference for the user of the client device 110. The transaction module 260 may also send to the client device a message confirming the additional information exchanged between the conversation participants associate with the transaction, such as place to meet, delivery method, return or exchange policy information, customer service, information, promotional information, discounts, etc. Upon receiving the transaction complete message, the client device 110 may further prompt the user to set up an appointment or a reminder for the user based on the additional transaction information (e.g., delivery estimate date reminder, time and place to meet, promotion expiration date reminder, return or exchange expiration date reminder, etc.).

Figure 6:
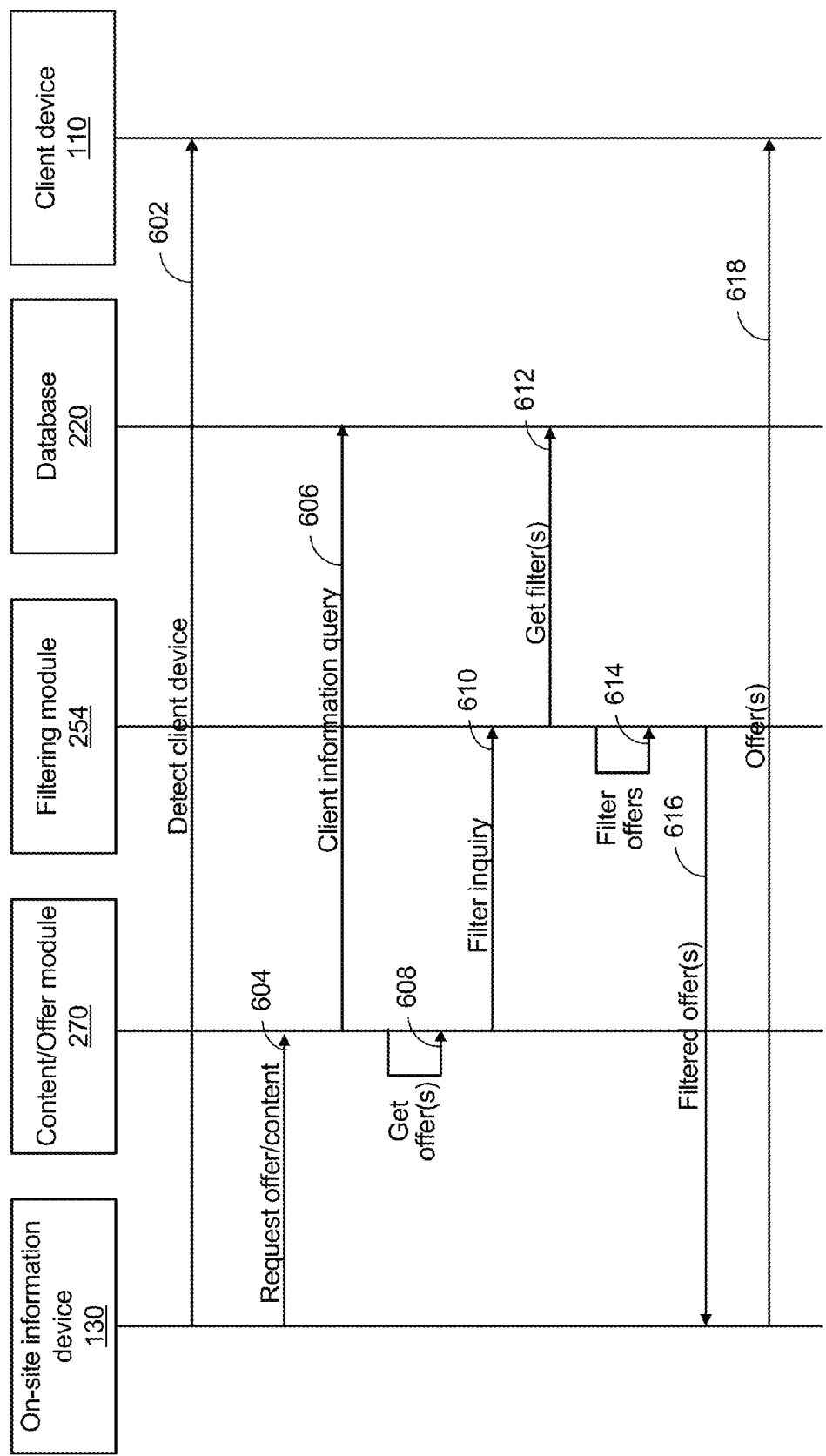
FIG. 6 is an exemplary message diagram for receiving and filtering promotional information in accordance with one embodiment.

FIG. 6 is an exemplary message diagram for receiving and filtering promotional information in accordance with one embodiment. The message flow of FIG. 6 shows messages exchanged between several entities which can be included in a communication system. For ease of explanation, the number of entities shown has been limited. However, it will be understood that additional entities can be added or multiple entities combined consistent with the description herein.

Messaging 602 may be performed to detect a presence of the client device 110 by one of the on-site information device(s) 130. The on-site information device 130 may be a beacon configured to detect the client device presence through Bluetooth, Wi-Fi, or other wireless technology. The on-site information device 130, for example may detect the presence of the client device 110 through Wi-Fi and receive the MAC address of the client device 110 for further a processing of the user data in conjunction with the user profile data already available in the database 220. In the implementation using the Wi-Fi technology may allow the system 100 long-term tracking of the user activities and behavior by identifying the user of the client device 110 through the on-site information device(s) 130.

Messaging 604 may be performed to request promotional information to eventually send to the user of the client device 110 from the on-site information device 130 upon the detection of the client device 110. Message 604 may include information about the client device 110, such as the MAC address of the device, as detected by the on-site information device 130, such as a beacon. Message 604 may also include information about the beacon itself, such as the location of the beacon and associated merchant of the beacon.

Messaging 606 may be performed to access the user account in the database 220 by the content/offer module 270 in response to the receipt of the promotional information request. The content/offer module 270 may be configured to request to obtain, for example, user preferences, account information, tags, or filters linked to the user account to determine whether and what kind of promotional information the user would like to receive. In response to the client information query, the client/offer module 270 may receive the requested client information. As discussed above, the client device 110 may not be associated with an account within the system. However, the device attributes may be identifiable and included in the client information. Even the absence of information for a client device can have meaning to a merchant such as to indicate this is the first time this customer device is in their store. This type of information can help tailor the interaction with this client device, at this merchant location, at this point in time.

Messaging 608 may be performed to generate promotional information, such as offers, by the content/offer module 270 once the content/offer module 270 receives client information, if any. In one embodiment, the promotional information may be generated by an internal or external targeting engine that processes user profile information, user-created tags, user activities, and other user-specific data accessible through the client information query from the database 220. In one embodiment, promotional information may consist of location-specific promotional information, such as a coupon relevant to one section of a mall. Promotional information may consist of time-specific promotional information, such as a coupon that would expire in an hour.

Messaging 610 may be performed to determine if the content/offer should be further filtered according to the filters or other preferences set by the user of the client device 110. Message 610 may include information on or the nature of the offer(s) generated by the content/offer module 270 and the client identifying information, such as client account information, and client device information, such as the MAC address.

Messaging 612 may be performed to request filtering based on the filters stored and linked to the user account in the database 220. A filter parameter may be based on one or more public or private tags described in connection with FIGS. 3, 5A, and 5B. A filter parameter may also be based on the user's managing (e.g., pausing, snoozing, or deleting) a conversation thread described in connection with FIGS. 9-11 below. In one embodiment, the user may have an option to create a filter (not shown) and be asked to enter filtering parameters, and the client device 110 may send the filtering parameters along with the request. In one embodiment, a filter request may be pre-populated and be confirmed by the user based on the user's public or private tags and conversation thread management. In one embodiment, a filter may be automatically generated based on the user's public or private tags and conversation thread management. In one embodiment, a filter may be an entity internal to the search module 250 and/or the search optimization module 252 not viewable to the user. In another embodiment, a filter may be an entity viewable and alterable by the user. In another embodiment, some filters but not others may be viewable and alterable by the user. Once the client's filters are determined, further messaging may be performed to store the filter requested by the user of the client device 110. In one embodiment, the filter may be stored in the form of a tag. In one embodiment, the filter may be stored in the form of a conversation thread management (e.g., pausing, snoozing, or deleting, described in connection with FIGS. 9-11 below). In one embodiment, the filter may be created separate from tags or conversation thread management but may still be based on tags or conversation thread management. In one embodiment, the filter may be created based on user inputted filtering parameters at the time of the user's filter request. Upon receiving the filter request and creating the filter, the filtering module 254 may store the filter in the database 220 and link the filter to the user account.

Messaging 614 may be performed to filter promotional information by the filtering module 254 once the user's existing filters in the database 220 are determined and a filtering query is sent to the filtering module 254. In one embodiment, filtering may be based on the tags or conversation thread management (e.g., pausing, snoozing, or deleting, described in connection with FIGS. 9-11 below). In one embodiment, filtering may be based on separate user-specified filtering parameters. Based on the user's filters and the promotional information it received from message 610, the filtering module 254 may be configured to determine whether the promotional information should be presented to the user as is, presented with some information blocked, or not presented at all.

Messaging 616 may be performed to send filtered promotional information to the on-site information device 130. After the filtering module 254 processes the promotional information data based on the user's filters, the filtered promotional information may be sent to the on-site information device 130 to be eventually presented to the user of the device 110. For example, if the user's filters indicate that the user is not interested in purchasing clothes and the promotional information is exclusively related to clothes sales, the promotional information may not be displayed at all. In another example, if the user's filters indicate that the user is interested in buying only a new car and the promotional information contains both new and old car sales information, the promotional information may be filtered to display only new car sales information. In another example, if the user's filters through the conversation thread management indicate that the user does not want to be disturbed by promotional information, the promotional information may not be presented to the user of the client device 110.

Messaging 618 may be performed to provide offers to the client device 110. In one embodiment, the transmission of promotional information may be in the form of a conversation thread. In such an example, the promotional information may be a publicly tagged conversation thread, which may be searchable by the users of the system 100. In one embodiment, the transmission of promotional information may be in the form of a locked conversation thread privately tagged by the merchant, established only between the user of the client device 110 and the merchant. In another embodiment, the transmission of promotional information may be in the form of a sponsored conversation item or thread or advertisement distinct from a conversation thread. In one embodiment, the transmission of the promotional information may trigger a prompt to the user of the client device whether to accept or rejection to receive the promotional information. In one embodiment, the transmission of the promotional information may require the client device 110 to determine whether any prompt to the user may be displayed. The client device 110 may be configured to make such determination based on the account information of the user of the client device 110.

One non-limiting advantage of the system is bidirectionally tailored communication between merchants and customers. Through on-site information devices such as beacons in conjunction with the communication system, such as tagging, disclosed herein, merchants may easily gather, track, and process customer data to tailor promotional information to individual customers. On the other hand, through tagging and conversation thread management, customers may influence and manage how the tailored promotional information is presented to them through the highly-personalized communication platform disclosed herein.

Figure 7:
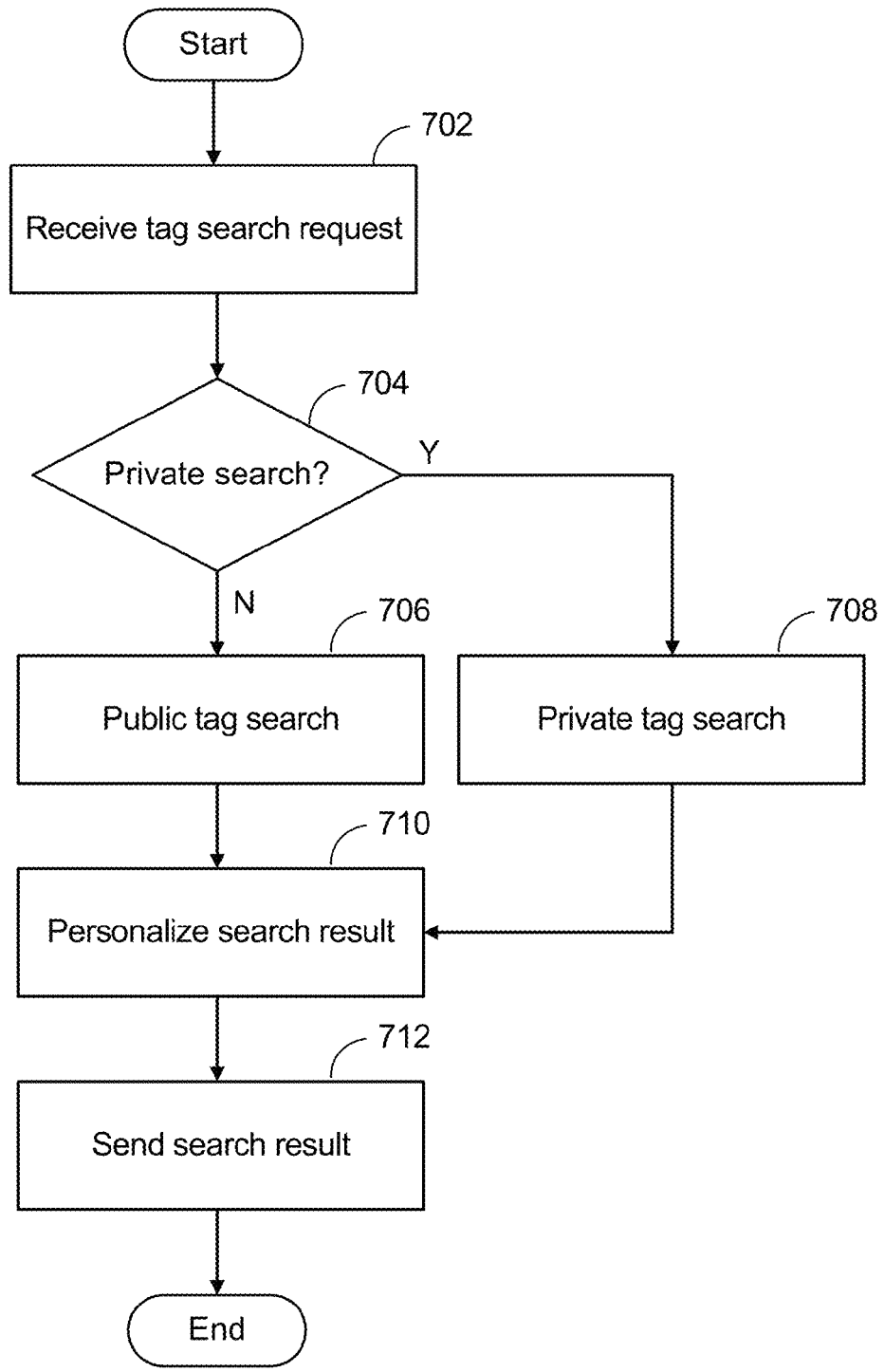
FIG. 7 is a flowchart for an exemplary method of searching tags in accordance with one embodiment.

FIG. 7 is a flowchart for an exemplary method of searching tags in accordance with one embodiment. The method shown in FIG. 7 may be implemented in the search module 250 that is in communication with the database 220 in the communication server 102 as described in connection with FIGS. 2, 5A, and 5B.

At block 702, a search request may be received. In one embodiment, the search module 250, upon receipt of the search request, may be configured to process the search request which includes the search terms to facilitate an accurate search. The processing of the search request may include identifying free text, tags, categories, geography, products, events, and/or proper names included in the received information. The processing may further include identification of the data sources for the search. After the search request is received, the process may continue to decision block 704.

At decision block 704, a determination is made as to the search request is a private search request or a public search request. If the search request is a public search request, the process continues to block 706. If the search request is a private search request, the process may continue to block 708.

At block 706, a public tag search may be performed. In one embodiment, the public index in the database 220 may searched to perform the public tag search. After the public tag search is performed, the process may continue to block 708.

At block 708, a private tag search may be performed. In one embodiment, the private index in the database 220 may be searched to perform the private tag search. After the private tag search is performed, the process may continue to block 710.

At block 710, the search result set may be personalized. Personalization may include reordering the search result sets based on user-defined parameters. For example, the user may provide a data source preference list which identifies a ranking of results from each data source. In such an example, a result from a higher ranked data source may be listed more prominently (e.g., nearer to the first presentation position on the result list) than other results. In one embodiment, the search result may be reordered based on the prioritization derived from the user's general profile. After the search result is personalized, the process may continue to block 712.

At block 712, the search result set may be sent to the requester's device. After the search result set is sent to the requester's device, the process ends.

Figure 8:
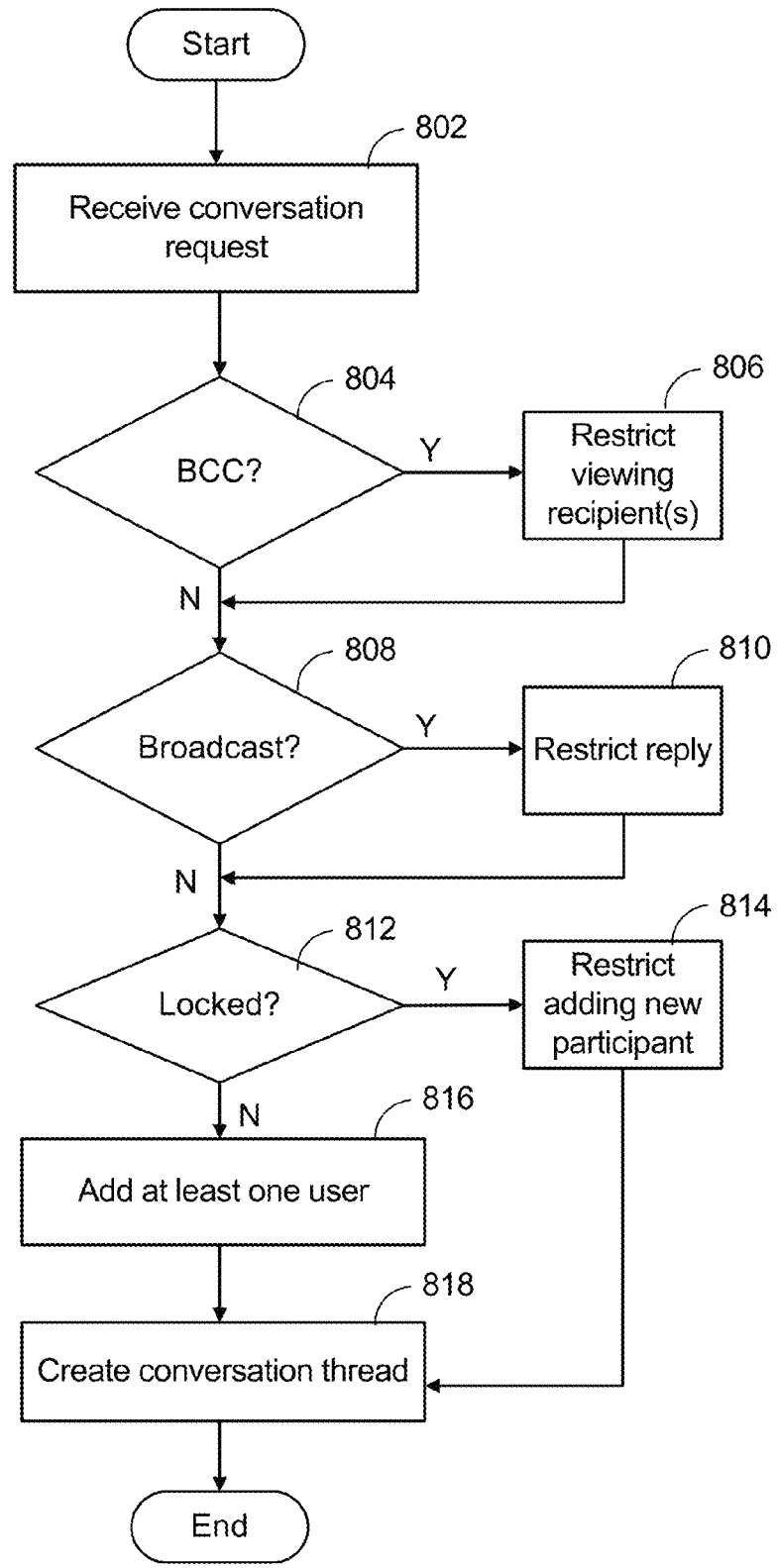
FIG. 8 is a flowchart for an exemplary method of creating a conversation thread in accordance with one embodiment.

FIG. 8 is a flowchart for an exemplary method of creating a conversation thread in accordance with one embodiment. The method shown in FIG. 8 may be implemented in the conversation module 240 in the communication server 102 as described in connection with FIGS. 1-2B, 5A, and 5B.

At block 802, a conversation request may be received. The conversation request may include a conversation type (e.g., BCC, group conversation, etc.) and one or more participants. In one embodiment, the conversation module 240 may receive additional conversation restrictions from the user. Conversation distribution restrictions may identify one or more of: who (e.g., users, client devices, tagged users, demographic based) can receive the conversation, what recipients can do within the conversation (e.g., reply, forward, and content types permitted to contribute), where the conversation is accessible (e.g., location based conversations), and when the conversation is accessible (e.g., time to live on the system, time to respond, time to send). After the conversation request is received, the process may continue to decision block 804.

At decision block 804, a determination is made as to whether the requested conversation involves blind carbon copy (BCC) as selected by the user. The BCC option may be chosen by the user when the user wishes to send a same conversation items to multiple other users without the other users discovering who else have received the same conversation items. If the BCC option is selected, the process may continue to block 806. If the BCC option is not selected, the process may continue to block 808.

At block 806, viewing the recipients of other recipients of the conversation thread may be restricted in response to the selection of the BCC option by the user. After the viewing of the recipients is restricted, the process may continue to decision block 808.

At decision block 808, a determination is made as to whether the requested conversation is in a broadcast mode as chosen by the user. The broadcast mode may allow the user to establish a one-way conversation thread and send out a conversation item to other users while not allowing the recipients to reply back to the user's conversation item. If the requested conversation is in the broadcast mode, the process may continue to block 810. If the requested conversation is not in the broadcast mode, the process may continue to decision block 812.

At block 810, the recipients of the conversation thread in the broadcast mode are restricted from replying in the conversation thread. After the recipients' replying options are restricted, the process may continue to decision block 812.

At decision block 812, a determination is made as to whether the requested conversation is in a locked mode. The locked mode may allow the user to establish a locked conversation thread with the recipients. In the locked mode, the recipients are restricted from adding any more participants to the conversation. If the requested conversation is in the locked mode, the process may continue to block 814. If the requested conversation is not in the locked mode, the process may continue to block 816.

At block 814, the recipients of the conversation thread in the locked mode are restricted from adding new participants. After adding new participants is restricted, the process may continue to block 818.

At block 816, at least one user may be added. The recipients may add more participants to the conversation as the conversation thread is not locked. After adding at least one user to the conversation, the process may continue to block 818. Optionally, a conversation thread may be created without adding another participant as in some implementations the content may be prepopulated. At a later time, additional participants may be added if the conversation thread is not locked, for example.

At block 818, a conversation thread reflecting one or more conversation restrictions, if any, is created. The conversation thread may or may not have one or more restrictions described above in connection with the method shown in FIG. 8. After the conversation thread reflecting the user's choices is created, the process ends.

Figure 9:
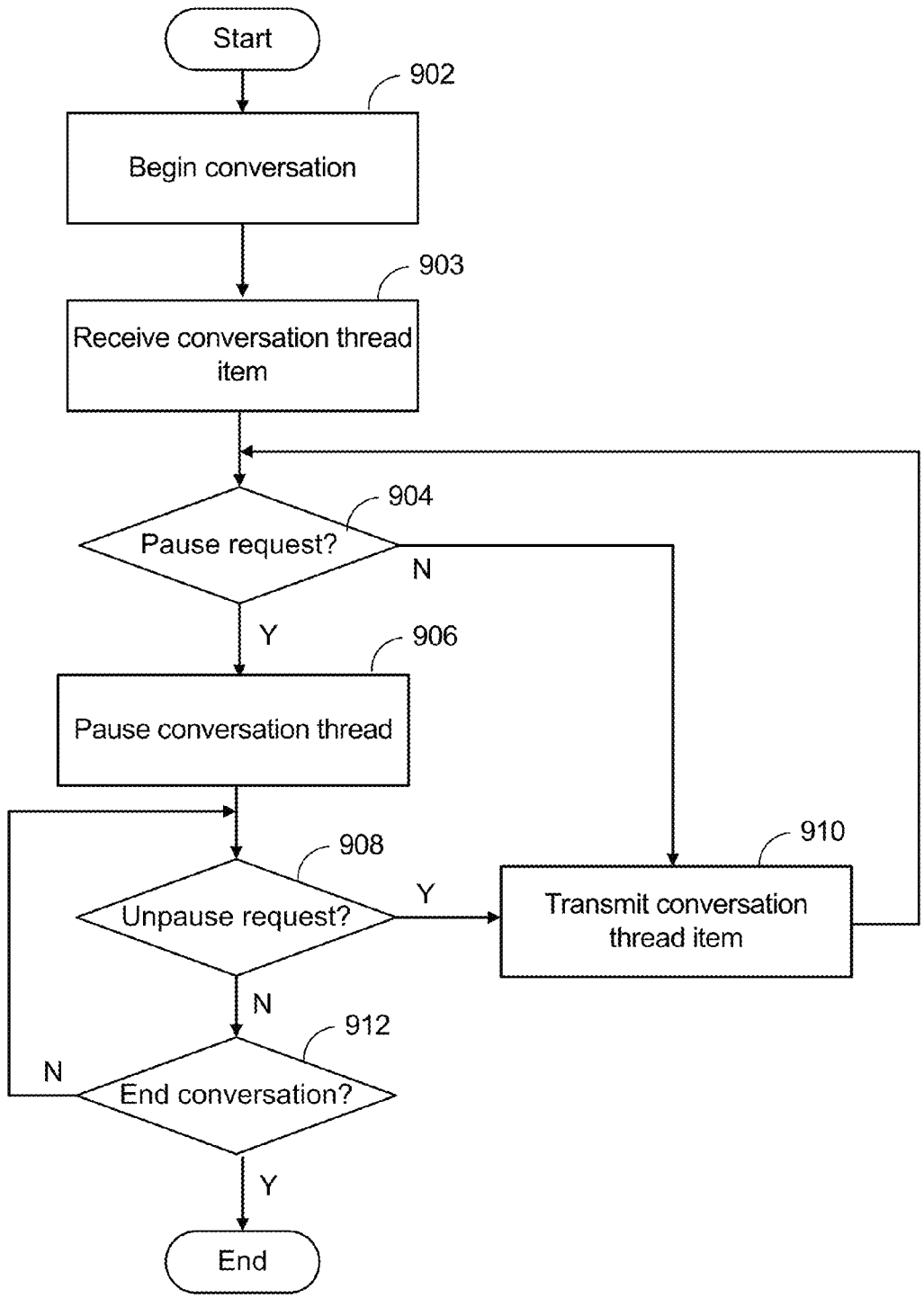
FIG. 9 is a flowchart for an exemplary method of pausing and unpausing a conversation thread in accordance with one embodiment.

FIG. 9 is a flowchart for an exemplary method of pausing and unpausing a conversation thread in accordance with one embodiment. The method shown in FIG. 9 may be implemented in the conversation module 240 in communication with the database 220 in FIGS. 2A-2B.

At block 902, a conversation thread is created and a conversation between two or more users may begin. As a conversation thread participant may send a conversation thread item, the process may continue to block 903.

At block 903, a conversation thread item may be received. In one embodiment, one or more conversation participant may be disallowed from sending a conversation thread item for a paused conversation, and the conversation thread item may not be received if the conversation is paused. In another embodiment, the conversation thread item may be received for later transmission regardless of whether the conversation is paused as depicted in the method of FIG. 9. As a conversation thread participant may send a pause request in the first embodiment, the process may continue to decision block 904.

At decision block 904, a determination is made as to whether a pause request was received. The pause request may include an identifier for the conversation thread to be paused. If a pause request is not received, the process may continue to block 910. If a pause request is received, the process may continue to block 906.

At block 906, the received conversation thread may be paused. In one embodiment, a conversation thread may be publically paused upon the conversation thread creator's request. In one embodiment, a conversation thread may be only privately paused upon any non-creator conversation participant's request. In another embodiment, the conversation may be publicly paused by any conversation participant's request. In one embodiment, the conversation thread may be configured by the thread creator to allow or disallow pausing by one or more of the conversation participants. After the conversation thread is paused, the process may continue to decision block 908.

At decision block 908, a determination is made as to whether an unpause request was received. The unpause request includes an identifier for the conversation thread. If an unpause request is received, the process may continue to block 910. If an unpause request is not received, the process may continue to decision block 912.

At block 910, a conversation thread item may be received. When there is no pause request, a conversation thread item may be received. For a paused conversation thread, upon receipt of an unpause request, the conversation thread item of interest may be received. In one embodiment, a conversation publicly paused may be publicly resumed. In one embodiment, a conversation privately pause may be privately resumed as long as the conversation is not publicly paused. After the conversation thread item is received, the process may continue to decision block 904 to determine receipt of a subsequent pause request.

At decision block 912, a determination is made as to whether the conversation has ended. If the conversation has not ended, the process may continue to decision block 908 to determine if an unpause request is made. If the conversation has ended, the method shown in FIG. 9 ends.

Figure 10:
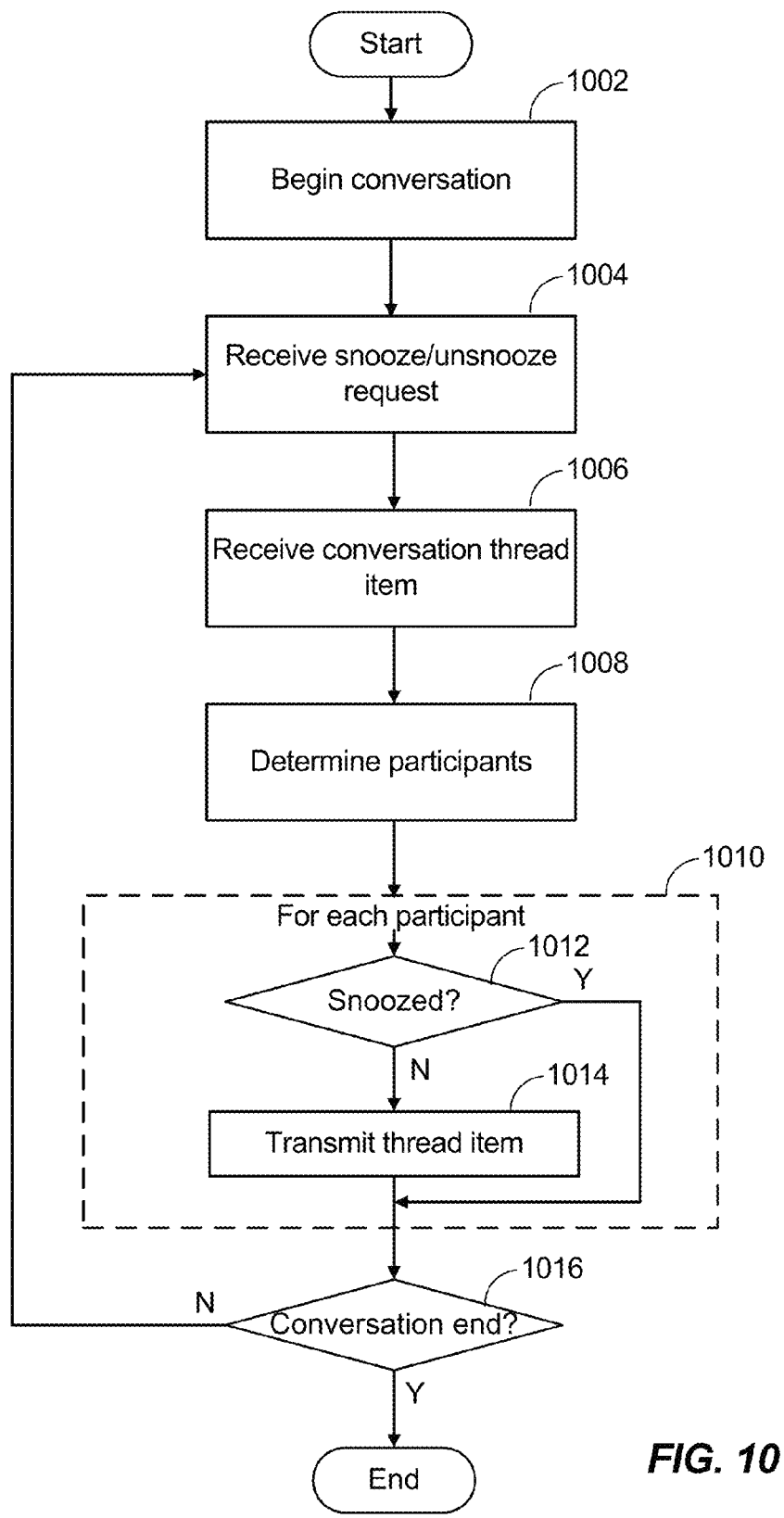
FIG. 10 is a flowchart for an exemplary method of snoozing a conversation thread in accordance with one embodiment.

FIG. 10 is a flowchart for an exemplary method of snoozing a conversation thread in accordance with one embodiment. The method shown in FIG. 10 may be implemented in the conversation module 240 in communication with the database 220 in FIGS. 2A-2B.

At block 1002, a conversation between two or more users may occur through a conversation thread. The conversation thread may have been snoozed or unsnoozed by one or more of the participants of the conversation. As a conversation thread participant may send a snooze or unsnooze request, the process may continue to block 1004.

At block 1004, a snooze or unsnooze request may be received. As a conversation thread participant may send a conversation thread item, the process may continue to block 1006.

At block 1006, a conversation thread item may be received. After the conversation thread item is received, the process may continue to block 1008.

At block 1008, participants of the conversation thread may be determined. In one embodiment, the participants of the conversation may be determined based on which users are linked to the conversation thread in database 220. After the conversation participants are determined, the process may continue to subprocess 1010 for each of the participant determined. For each participant, subprocess 1010 may continue to decision block 1012.

At decision block 1012, a determination is made as to whether the participant's conversation thread is snoozed. If the participant's conversation thread is snoozed, the subprocess 1010 ends for the participant. If the participant's conversation thread is not snoozed, the subprocess 1010 may continue to block 1014.

At block 1014, the conversation thread item is transmitted to the participant. Once the conversation thread item is transmitted to the participant, the subprocess 1010 may repeat for another participant determined at block 1008 until the subprocess 1010 is run for all the determined participants. Upon completion of subprocess(es) 1010, the process may continue to decision block 1016.

At decision block 1016, a determination is made as to whether the conversation has ended. If the conversation has not ended, the process may continue to block 1004 to receive a subsequent snooze or unsnooze request if any. If the conversation has ended, the method shown in FIG. 10 ends.

Figure 11:
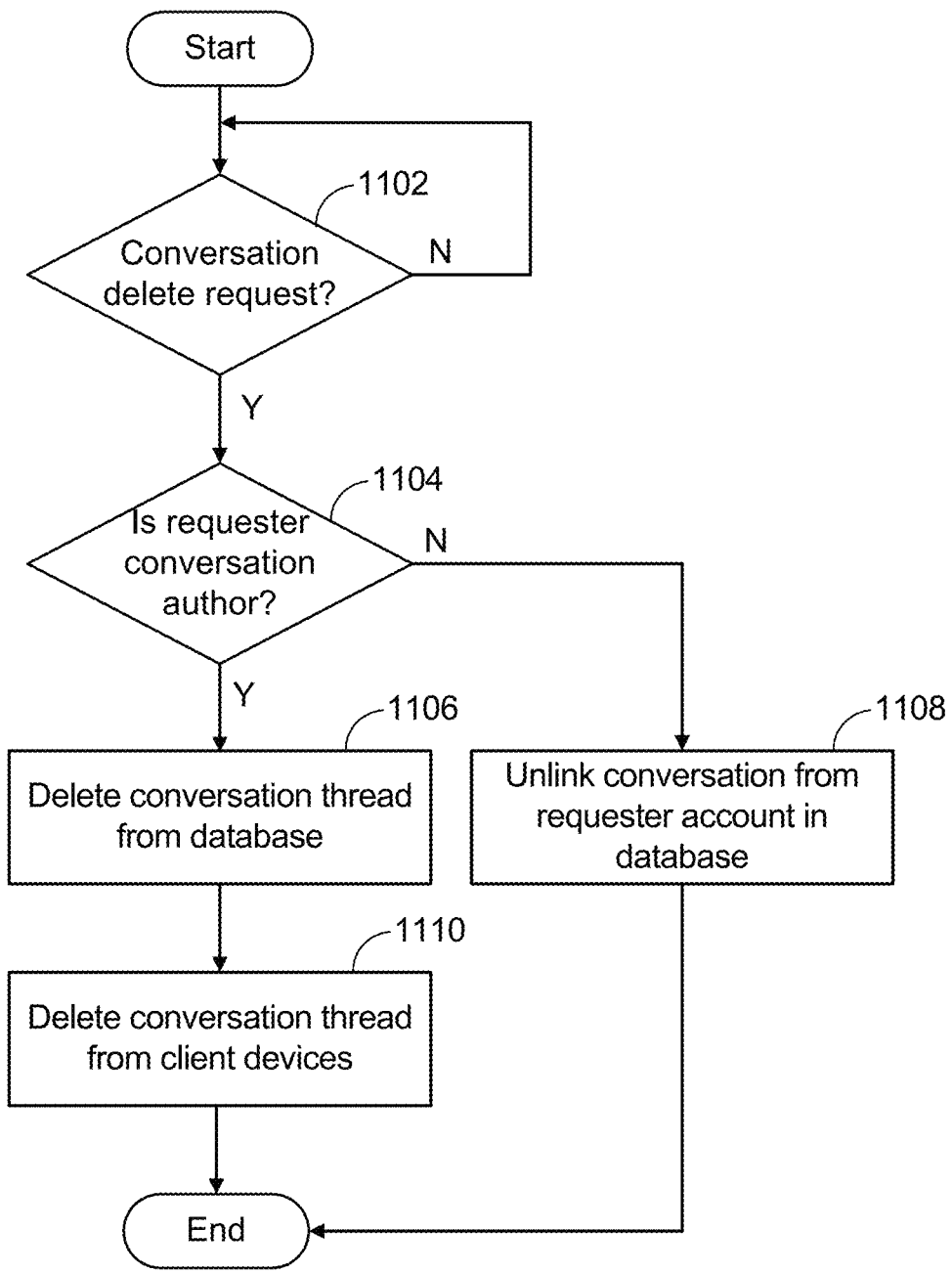
FIG. 11 is a flowchart for an exemplary method of deleting a conversation thread in accordance with one embodiment.

FIG. 11 is a flowchart for an exemplary method of deleting a conversation thread in accordance with one embodiment.

The method shown in FIG. 11 may be implemented in the conversation module 240 in communication with the database 220 in FIGS. 2A-2B.

At decision block 1102, a determination is made as to whether a conversation delete request is made. If a conversation delete request is not made by any conversation participant, the process may stay at decision block 1102. If a conversation delete request is made by a conversation participant, the process may continue to decision block 1104.

At decision block 1104, a determination is made as to whether the conversation delete requester is the author of the conversation thread. If the requester is the author, the process may continue to block 1106. If the requester is not the author, the process may continue to block 1108.

At block 1106, the conversation thread is deleted from database upon the conversation delete request from the author of the conversation thread. The database may be substantially similar to the database 220 in FIGS. 2A-2B. In one embodiment, the author may be given options to delete the conversation from the database 220, only delete from the author's device, and/or delete from other conversation participants' devices. In another embodiment, a delete request from the author of the conversation thread may delete the conversation thread from the database 220 by default. In one embodiment, the client may initiate deletion of a conversation thread, but the server may maintain the conversation history for a period of time (e.g., 30 days) while flagging the conversation thread to be deleted. Once the conversation thread is deleted from the database 220 or flagged as deleted in the database 220, the process may continue to block 1110.

At block 1108, the conversation thread may be unlinked from the non-author requester's account in the database 220. In one embodiment, the conversation may additionally be deleted only from the non-author's device. Once the non-author requester's account is unlinked from the conversation thread, the method of FIG. 11 ends.

At block 1110, the conversation thread may be deleted from all conversation participants' devices followed by the conversation author's delete request. In one embodiment, the non-author conversation participants may be given a notification that the conversation was deleted upon the author's request. In another embodiment, the non-author participants may not be given a notification regarding the deleted conversation. Upon deletion of the conversation thread from all participants' devices, the method of FIG. 11 ends.

Figure 12A:
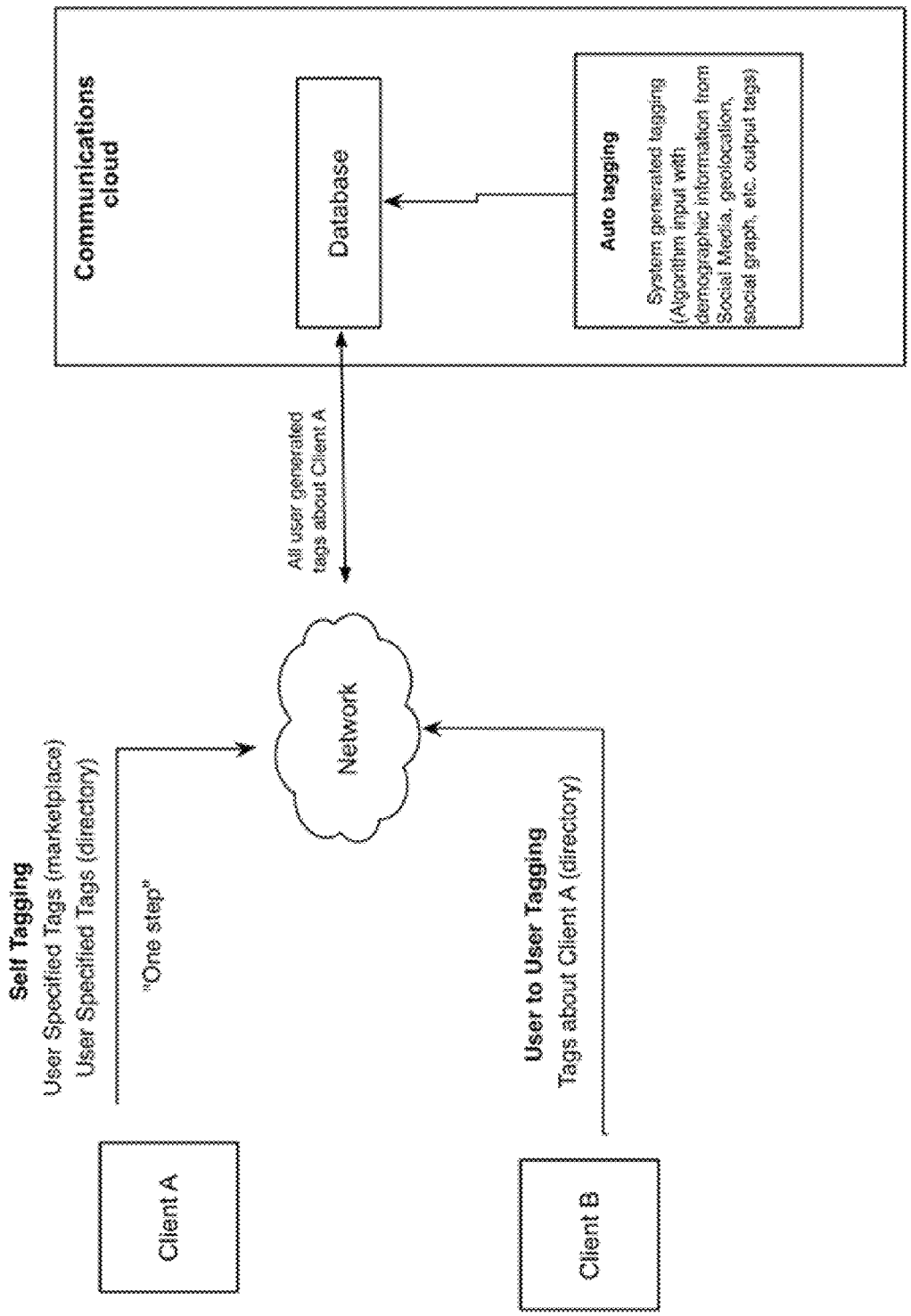
FIG. 12A is a functional block diagram of an exemplary communications network system in accordance with another embodiment.

FIG. 12A is a functional block diagram of an exemplary communications network system in accordance with another embodiment. As illustrated in FIG. 12A, the first user, Client A, may generate public user specified tags in the "marketplace," or private user specified tags in the "directory" specific to Client A. The second user, Client B may also generate tags including tags about other users such as Client A in this example. This tagging information may be communicated through a network and to a database of a communications cloud. The database also may have automatic, system-generated tags based on demographic information from social media, geolocation, and social graphs that the communications cloud may gather from the network. Thus, the system shown in FIG. 12A illustrates examples of the various sources for tags as well as the use of tags to facilitate providing a bidirectionally directed searchable marketplace and directory.

Figure 12B:
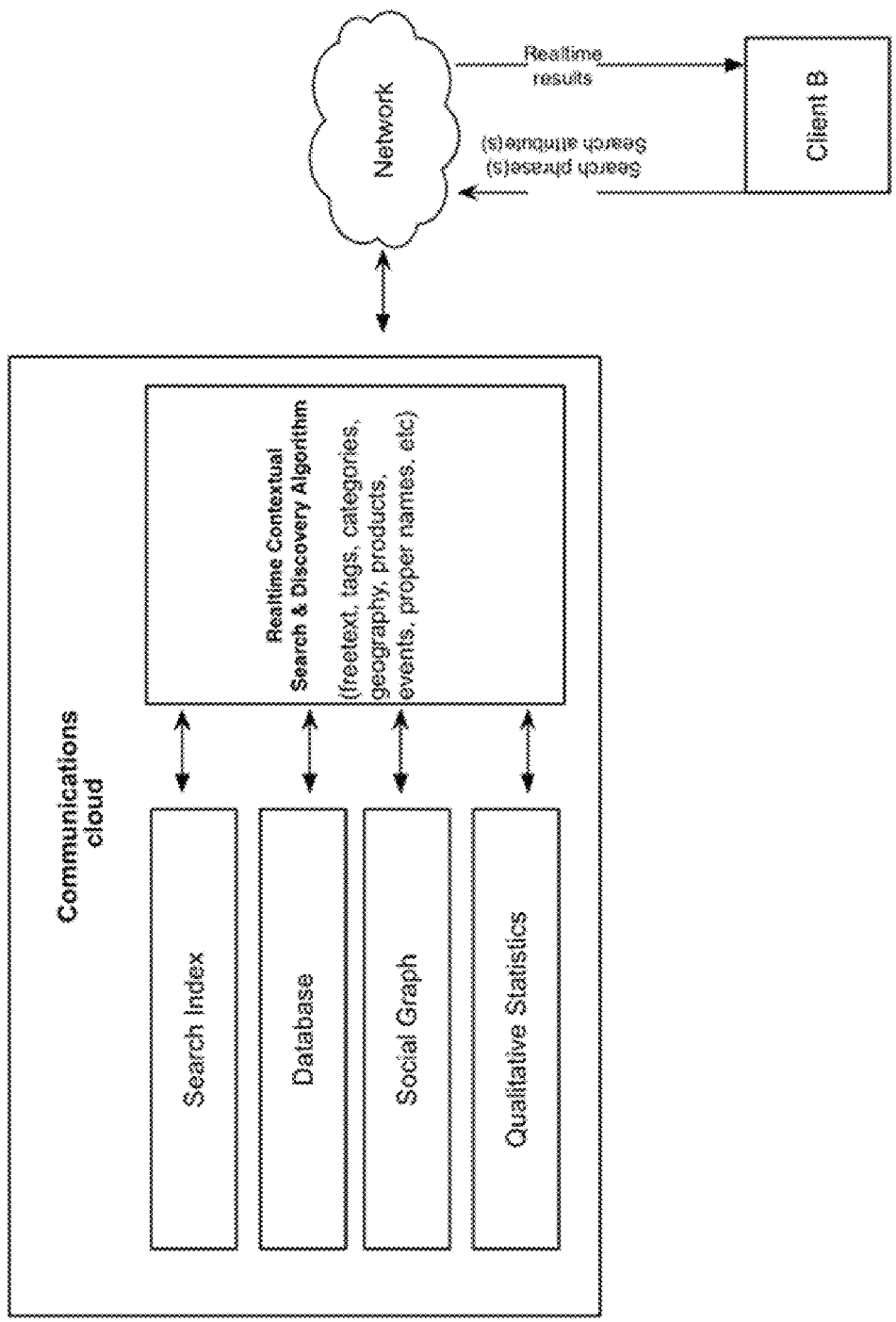
FIG. 12B is a functional block diagram of searching with an exemplary communications network system in accordance with another embodiment.

FIG. 12B is a functional block diagram of searching with an exemplary communications network system in accordance with another embodiment. The communications cloud may also comprise a search index module, database, social graph module, and qualitative statistics module that may operate in conjunction with a search module that implements a real-time contextual search and discovery algorithm using text, tags, categories, geography, products, events, and proper names, among others to perform searches. The communications cloud may communicate with users such as Client B in FIG. 12B through the network. Client B in this example may request a search based on one or more phrases or other search attributes. The communications cloud may perform the requested search through the search module and transmit real time results to Client B through the network. The tag information underlying the searches may be continually updated, such as discussed with reference to FIG. 12A. FIG. 12B illustrates how the information received from user about themselves (self tags) and about others (user to user tags) facilitate bidirectionally directed searches as the basis for the searches submitted by Client B consider both the self tags and user-to-user tags.

Figure 13A:
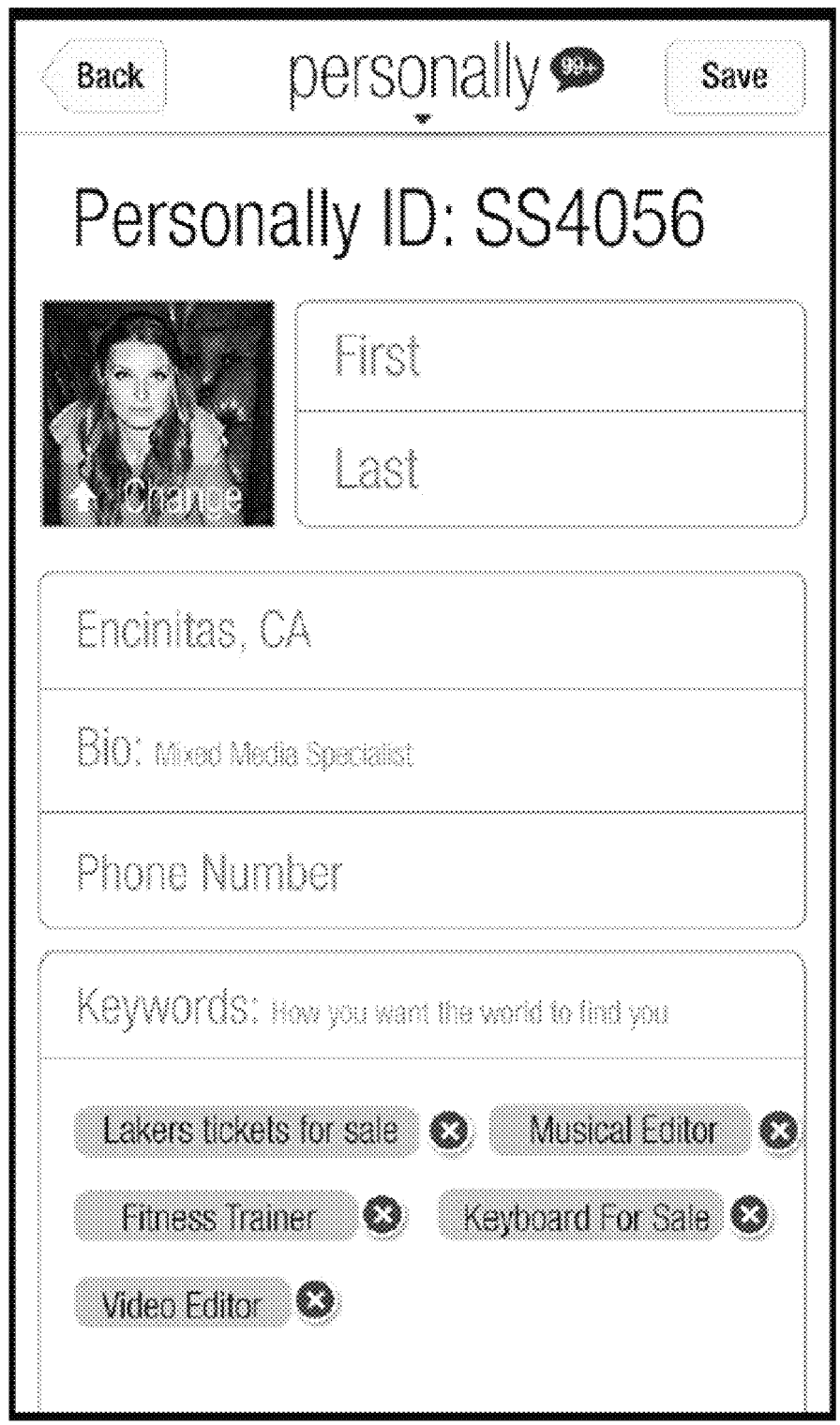
FIG. 13A is an exemplary user interface for a private user profile in accordance with one embodiment.

FIG. 13A is an exemplary user interface for a private user profile in accordance with one embodiment. The exemplary user interface illustrates public self tagging in accordance with one embodiment. Additionally, the exemplary user interface in FIG. 13A shows a user ID and entries for personal profile information, including first and last names, location, biographical information, phone number, and keywords or self-tags. In one embodiment, keywords or self-tags are public tags that may be short descriptions of the user publically available for others to view. In one embodiment, a user interface for public self tagging may include a suggestion field. In another embodiment, as the user types a public self-tags, the user may be prompted with suggestions. In one embodiment, the users may search and organize the user's public self-tags. In one embodiment, the users may delete the user's public self-tags, as illustrated in FIG. 13A with a circled-x icon next to each public self-tag. In one embodiment, the user may designate which group or groups may see which public self-tag. In one embodiment, the user may be given other options regarding public self-tags, such as expiration time or date.

Figure 13B:
FIG. 13B is an exemplary user interface for a public user profile in accordance with one embodiment.

FIG. 13B is an exemplary user interface for a public user profile in accordance with one embodiment. In the exemplary user interface, a profile of a user "Emily Rehm" is illustrated. The exemplary user interface illustrates the user's profile information including the user's contact information, biographical information, and tags. In one embodiment, automatic tags may be generated based on the user's online profile information, for example, as illustrated in FIG. 13B as "Country: USA," "Language: English," "City: Encinitas," and "Age: 21-25." In one embodiment, the automatically generated tags may by public tags viewable and searchable by others in the communication system. In another embodiment, the automatically generated tags may be searchable by others but not viewable by others along with the user's public profile. In the exemplary user interface, tags such as "Fitness Now Gym," "Fitness Trainer," "Encinitas Friends," "Fitness Model," and "Workout Girl" are self-tags. In one embodiment, self-tags are public tags that are viewable and searchable by others using the communication system disclosed herein. In one embodiment, each tag may be removed by selecting the delete symbol (a circled-x icon as in FIG. 13B) next to each tag.

Figure 14B:
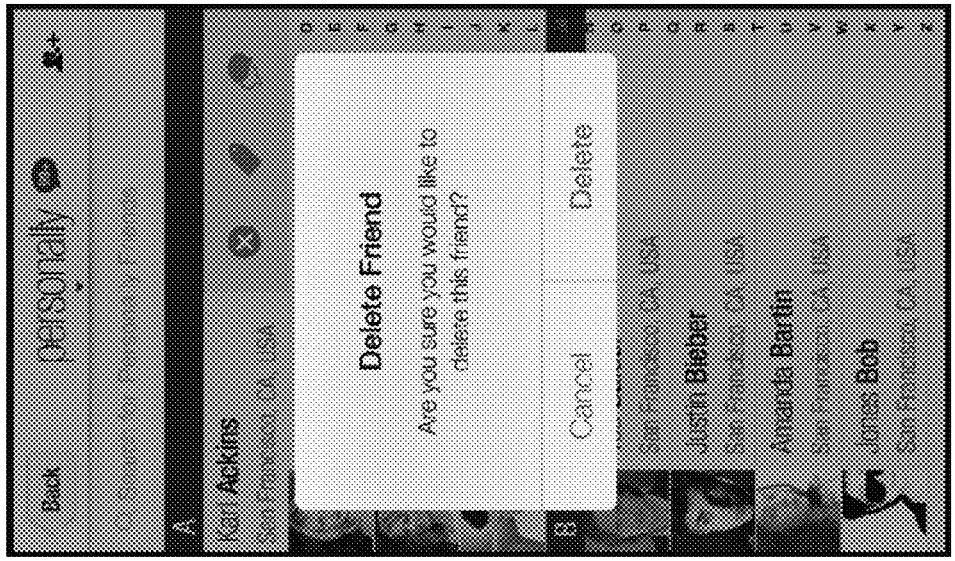
FIGS. 14A-14B are exemplary user interfaces for contact management in accordance with one embodiment.
Figure 14A:
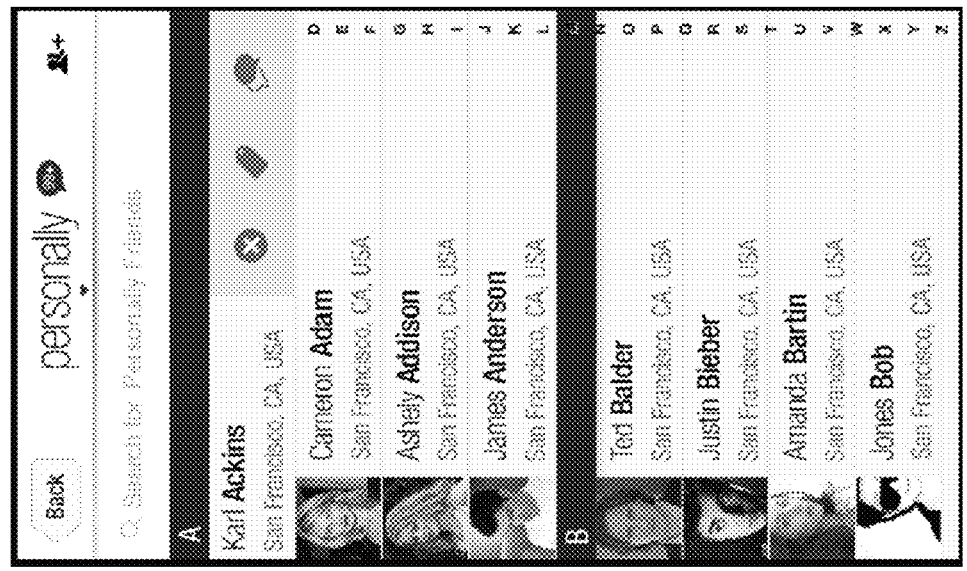

FIGS. 14A-14B are exemplary user interfaces for contact management in accordance with one embodiment. In this exemplary user interface the user's contacts are alphabetically listed by the contacts' last name. In one embodiment, the contacts may be listed based on a group the user selects. In another embodiment, the contacts may be listed based on tags the user assigned to the contacts. As illustrated in FIG. 14A with an exemplary contact "Karl Ackins," who is located in San Francisco, Calif., each contact entry may provide the user options to delete as denoted with a circled-x icon, tag as denoted with a tag icon, and create a conversation thread as denoted with a conversation balloon icon. In one embodiment, once the user selects to delete a contact, the user may be prompted with a confirmation message for deleting the contact as illustrated in FIG. 14B. In one embodiment, the user interface may allow the user to slide a contract listed to reveal options for the contact entry as illustrated in FIG. 14A for "Karl Ackins." In another embodiment, the user may select a contact listed to get the options for the contact entry. In another embodiment, the user may select an icon near the contact listed to get the options. In one embodiment, a contact tag is a public tag such that the tag is viewable and searchable by the user who created the tag as well as any and all users of the system 100 (FIG. 1).

Figure 15:
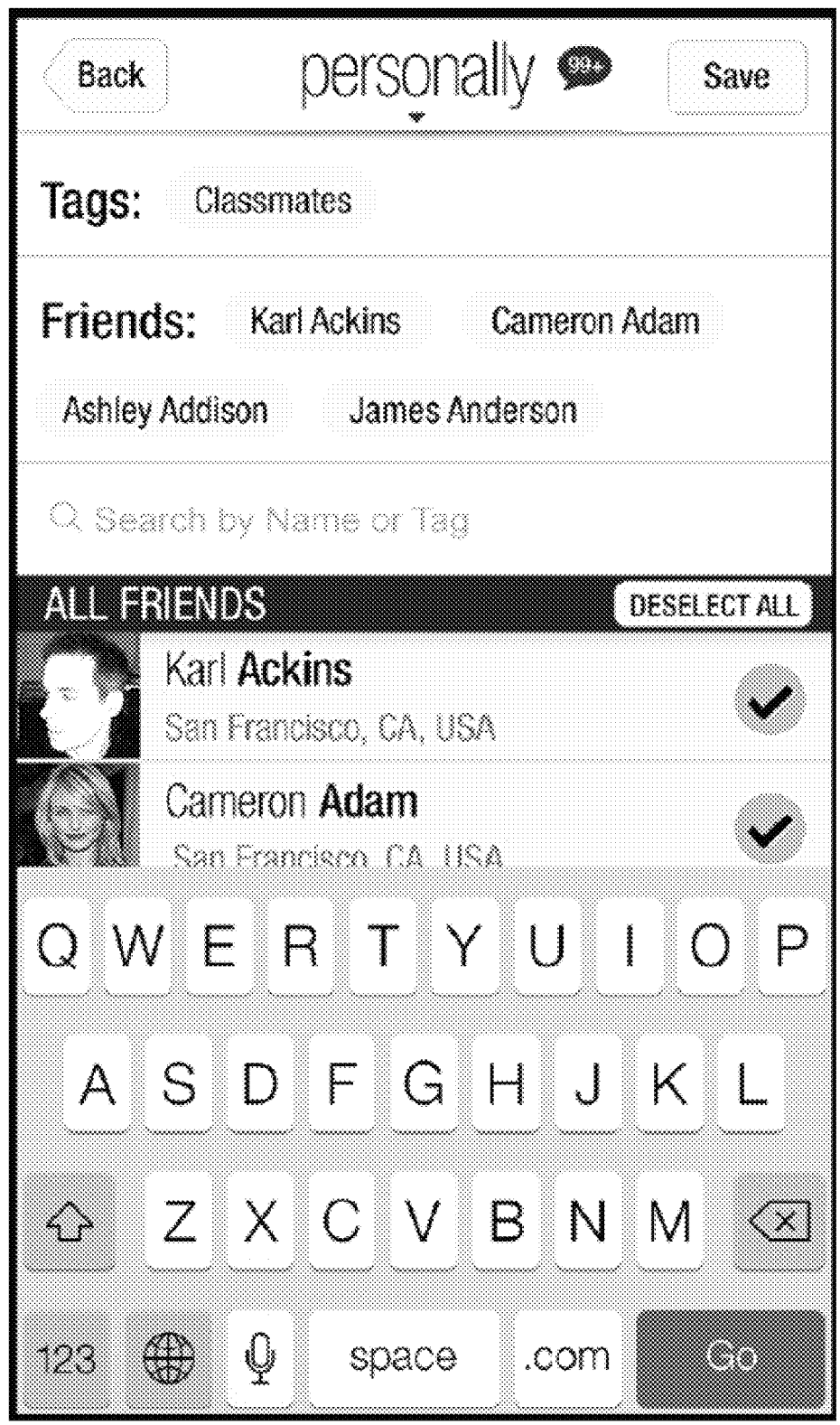
FIG. 15 is an exemplary user interface for private contact tagging in accordance with one embodiment.

FIG. 15 is an exemplary user interface for private contact tagging in accordance with one embodiment. In this exemplary user interface, the user has selected multiple contacts from the user's contact list and added "Classmates" as a common private tag for all the selected contacts, "Karl Ackins," "Cameron Adam," "Ashley Addison," and "James Anderson." In this exemplary user interface, the user also may search the user's contact list further by name or tag to add to the list of contacts to have the "Classmates" tag. In one embodiment, a contact tag is a private tag such that the tag is viewable and searchable by the user who created the tag.

Figure 16:
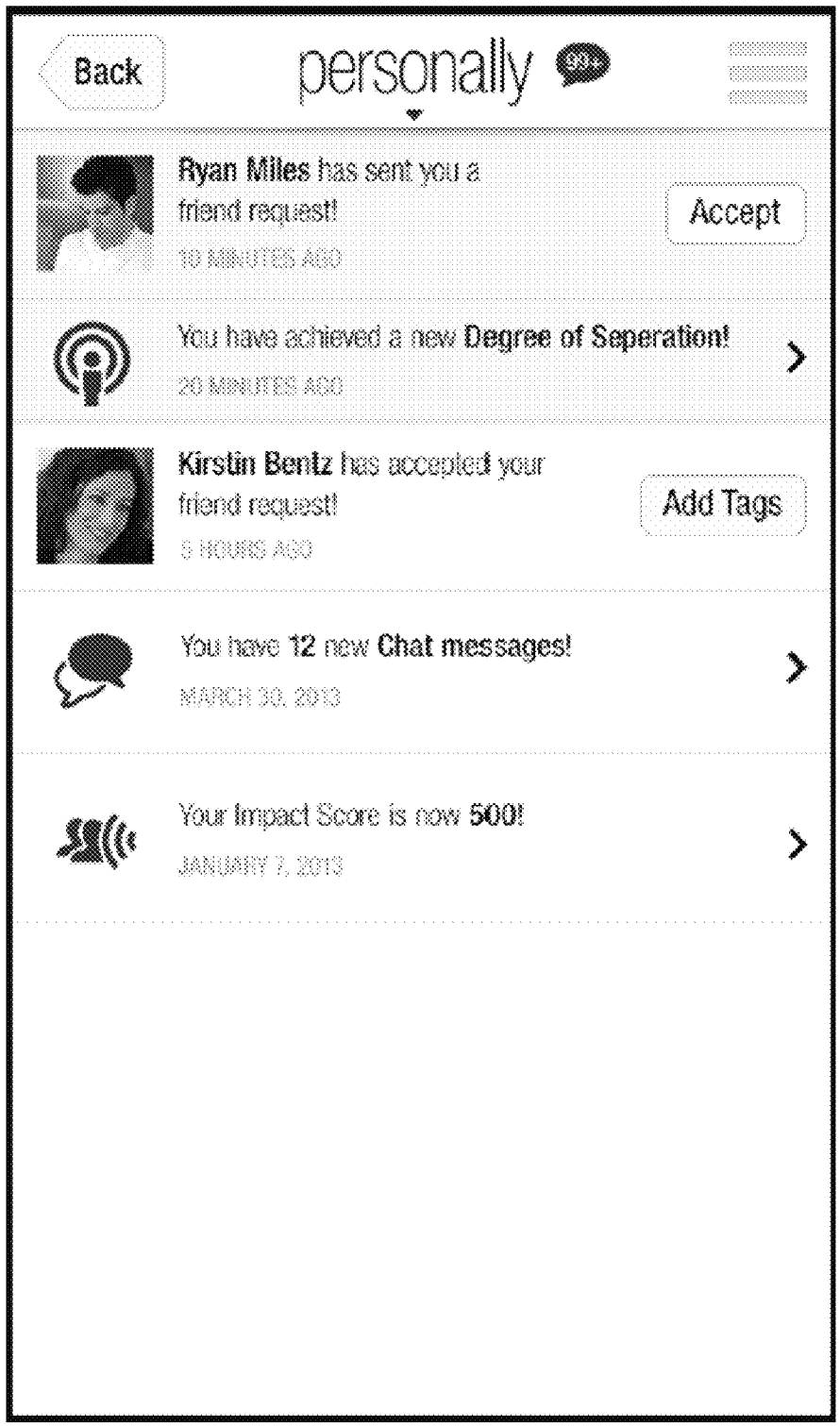
FIG. 16 is an exemplary user interface for notifications in accordance with one embodiment.

FIG. 16 is an exemplary user interface for notifications in accordance with one embodiment. In the exemplary user interface, the user is notified of, among others, a friend request by "Ryan Miles" and an acceptance of a friend request by "Kirstin Bentz." The user in this exemplary user interface may add tags to the friend who accepted the user's friend request ("Kirstin Bentz") to add descriptions to the new friend that are viewable and searchable only to the user.

Figure 17:
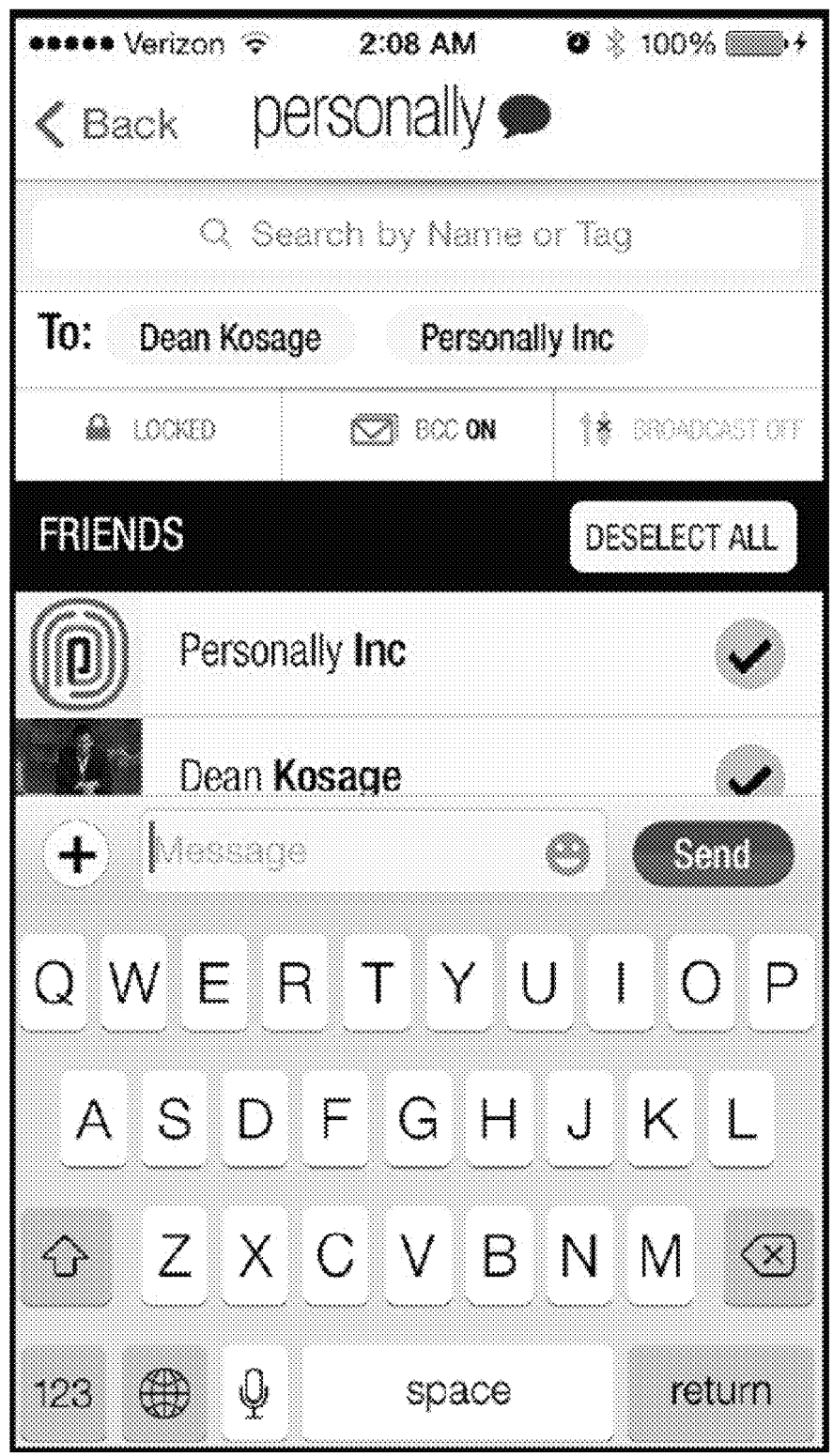
FIG. 17 is an exemplary user interface for creating a conversation thread in accordance with one embodiment.

FIG. 17 is an exemplary user interface for creating a conversation thread in accordance with one embodiment. In one embodiment, the user may create a conversation thread with other users selected from a list of contacts. In this exemplary user interface, the user is creating a conversation thread with "Dean Kosage" and "Personally, Inc." In one embodiment, the conversation thread may have options to lock the conversation thread, BCC recipients, or turn on a broadcast mode as described in detail in connection with FIGS. 5A, 5B, and 8. In this example, the user has selected to lock the conversation thread to limit adding new participants and turned on BCC to limit the recipients' viewing of other recipients of the same conversation thread.

Figure 18:
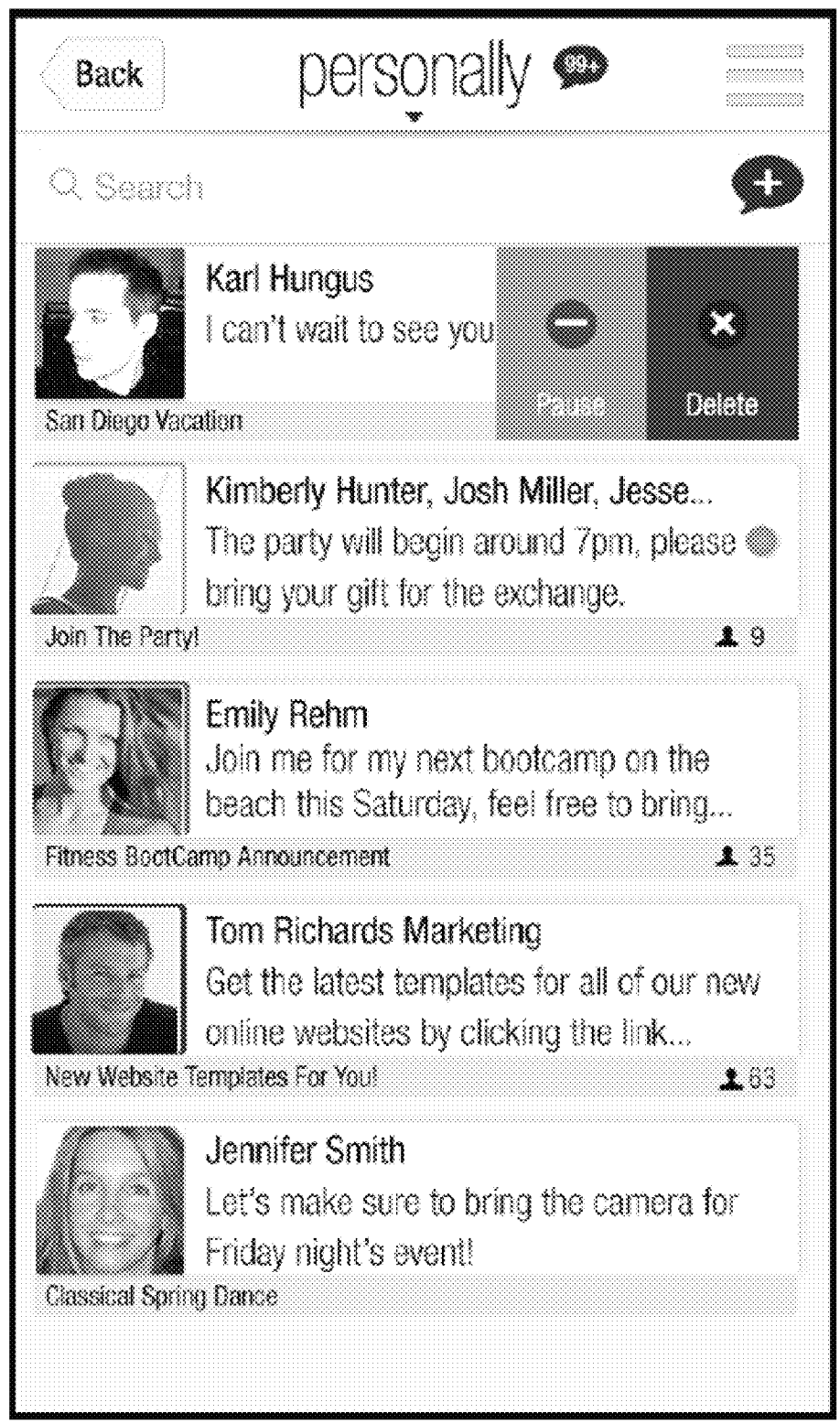
FIG. 18 is an exemplary user interface for managing a conversation thread and contacts in accordance with one embodiment.

FIG. 18 is an exemplary user interface for managing a conversation thread and contacts in accordance with one embodiment. In one embodiment the user may have an option to pause or delete a conversation. In this exemplary user interface, a conversation thread with "Karl Hungus" is selected by the user, and the user is given an option to pause or delete the conversation thread with him. In one embodiment, the user may also have an option to snooze (not shown) a conversation thread. Pausing and deleting a conversation thread is described in detail in connection with FIGS. 9-11. In one embodiment, the list of conversation threads may include information regarding each conversation thread. In this example, the number of participants is shown on the bottom right of each conversation thread. In one embodiment, the newest conversation item from a conversation thread may be displayed in the list of conversation threads. In one embodiment, the status the conversation thread, such as new conversation item received, paused, snoozed, broadcast, BCC'ed (for the author of the conversation thread), or locked may be displayed along with each conversation thread entry in the list. In one embodiment, a title of the conversation thread may be displayed as illustrated in FIG. 18A. In one embodiment, a picture of one or more participant may be displayed as illustrated in FIG. 18A.

Figure 19:
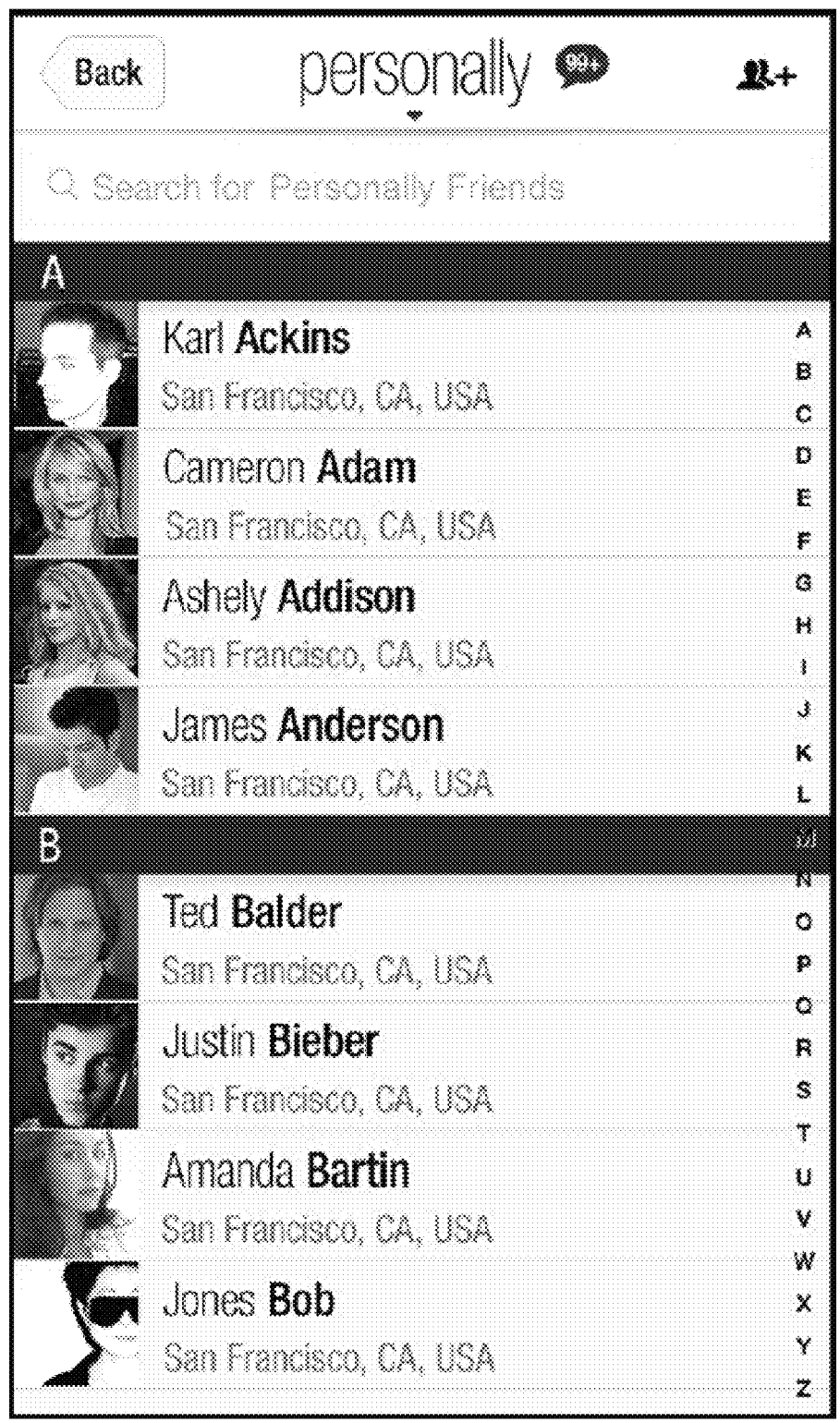
FIG. 19 is an exemplary user interface for searching contacts in accordance with one embodiment.

FIG. 19 is an exemplary user interface for searching contacts in accordance with one embodiment. In one embodiment, the search window may be at the top of the contact list of the user. In this example, the search window is at the top of the contact list. The user may search the contact by name, location, tags, keywords, or any other information. Searching user contacts is described in detail in connection with FIGS. 2, 5A, 7, and 12B.

Figure 20:
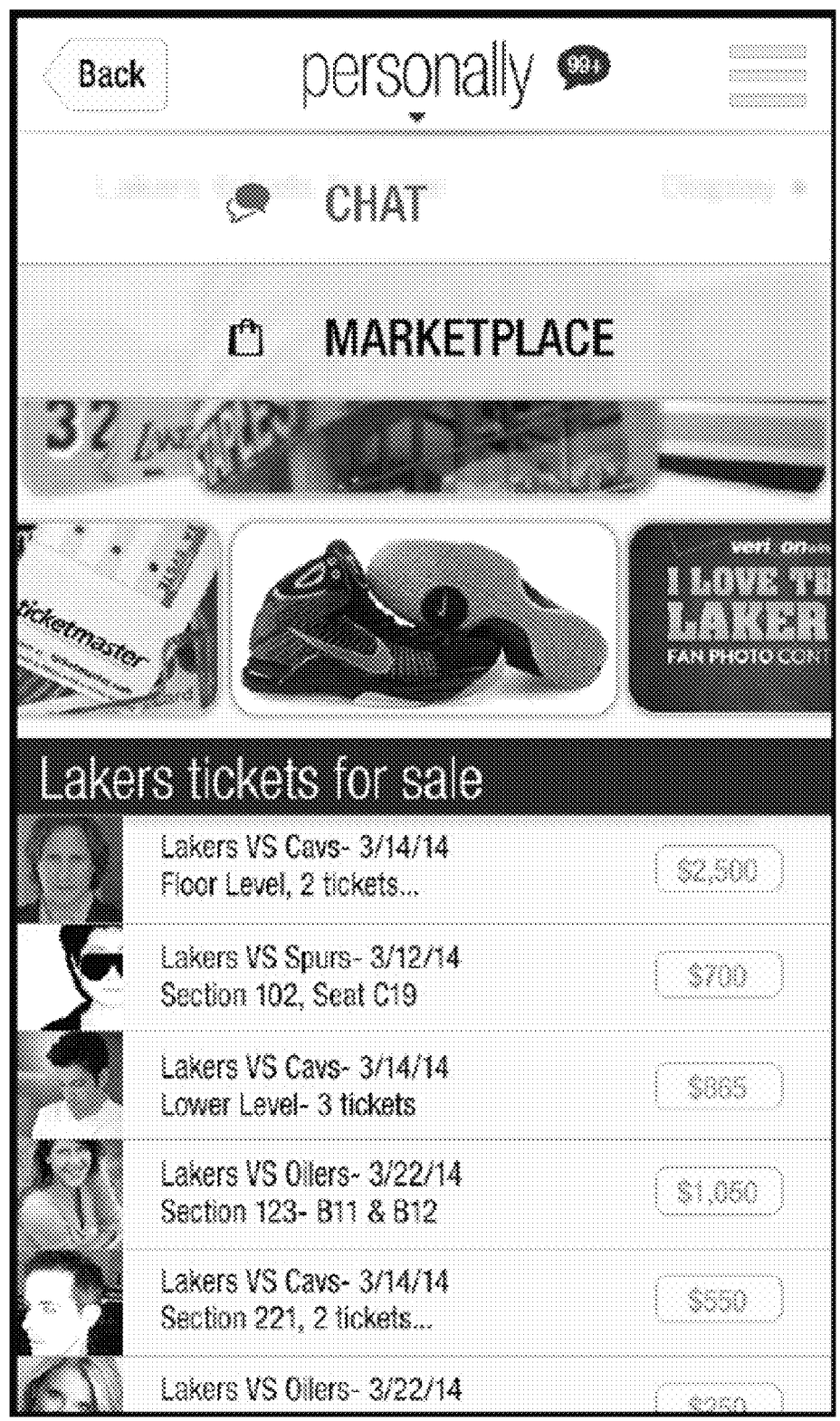
FIG. 20 is an exemplary user interface of marketplace in accordance with one embodiment.

FIG. 20 is an exemplary user interface of marketplace in accordance with one embodiment. In one embodiment, the user may select an option to start a communication, such as a conversation thread, with either one of the user's contacts. In one embodiment, the user may select an option to start a communication, such as a conversation thread, with other users who are not in the user's contact list. In this example, the contact communication option is illustrated as "Chat," and the non-contact communication option is illustrated as "Marketplace." In this example, the user has selected the "Marketplace" option to communicate with other non-contact users. In one embodiment, the user may search the non-contact communication space for an item or activity of interest, for example. In one embodiment, the user may describe what the user wants to buy, for example. In this illustration, the user has searched for "Lakers tickets for sale" in the public, non-contact space to find out if anyone is selling Lakers tickets. Searching the non-contact space is further described in connection with FIG. 21 below.

Figure 21:
FIG. 21 is an exemplary user interface for searching the marketplace in accordance with one embodiment.

FIG. 21 is an exemplary user interface for searching the marketplace in accordance with one embodiment. In one embodiment, the user may search the non-contact space, or "marketplace," and may use one or more keywords. The illustrated example shows that the user searched for "Lakers tickets for sale" in the non-contact space. In one embodiment the result of the search may be sorted by relevance to the searched key words. In another embodiment, the result of the search may be sorted by the tags the each thread creator attaches to his/her/its thread. For example, a sales communication (conversation) thread creator may add a tag of the price of the item for sale and the date the item may be available. In one embodiment, a communication thread may have automatic tags, such as location and date of creation, associated with the thread. In the illustrated example, the sales threads have tags or other background categorizing fields such as distance, price, date, etc. In one embodiment, the user may be given an option to sort the search result by any of the tags or other background fields of each communication thread. In this example, the user has selected to sort the search result for "Lakers tickets for sale" by the distance.

Figure 22A:
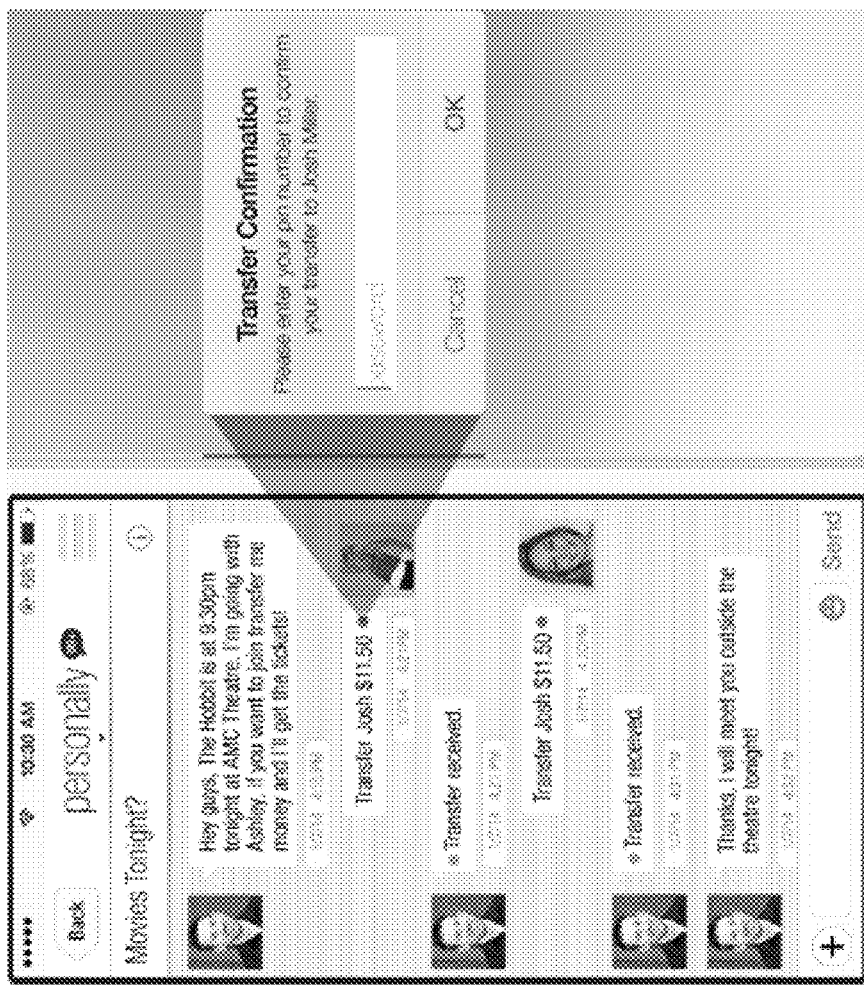
FIG. 22A illustrates exemplary user interfaces for in-app transaction in accordance with one embodiment.
Figure 22A:
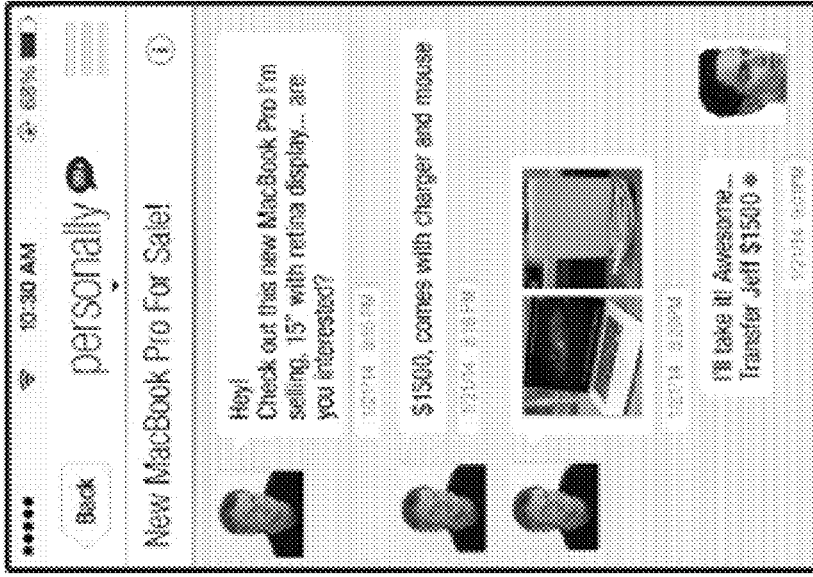

FIG. 22A illustrates exemplary user interfaces for in-app transaction in accordance with one embodiment. In one embodiment, the user may transact with a non-contact user as a result of a search in the non-contact space. In the first (left) illustrated example, the user has searched for a sales communication thread in the non-contact space, or "marketplace," for "New MacBook Pro For Sale." In another embodiment, a non-contact user may simply add a self-tag describing what the non-contact user is selling. In one embodiment, once the user selects the sales communication thread or the tagged non-contact user from the search result, the user may communicate with the non-contact user. In this example, the user is communicating with an interested seller of a laptop. In one embodiment, the user may transact with a non-contact user within the application. In this example, the user is paying $1500 within the application to the non-contact user who is selling a laptop to the user. The in-app transaction is described in detail in connection with FIGS. 1, 2, and 5B. Similarly, the user may search the user's contact space and transact with one or more of the user's contacts. In the second (right) illustrated example, a contact of the user has created a conversation thread asking "Movies Tonight?" In one embodiment, the user may transact with one or more of its contacts in the application through a conversation thread. In this example, the user's has responded in the conversation thread and transferred $11.50 for her movie ticket. In one embodiment, the user may be prompted to confirm the transaction by entering the user's pin number. In this example, the user is prompted to confirm her sending of $11.50 to Josh Miller.

Figure 22B:
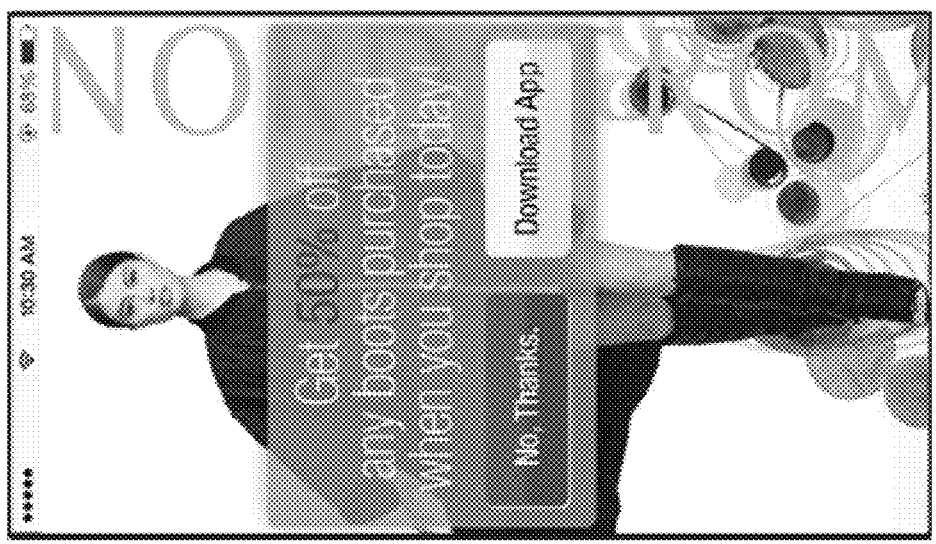
FIG. 22B illustrates exemplary user interfaces for on-site communication in accordance with one embodiment.
Figure 22B:
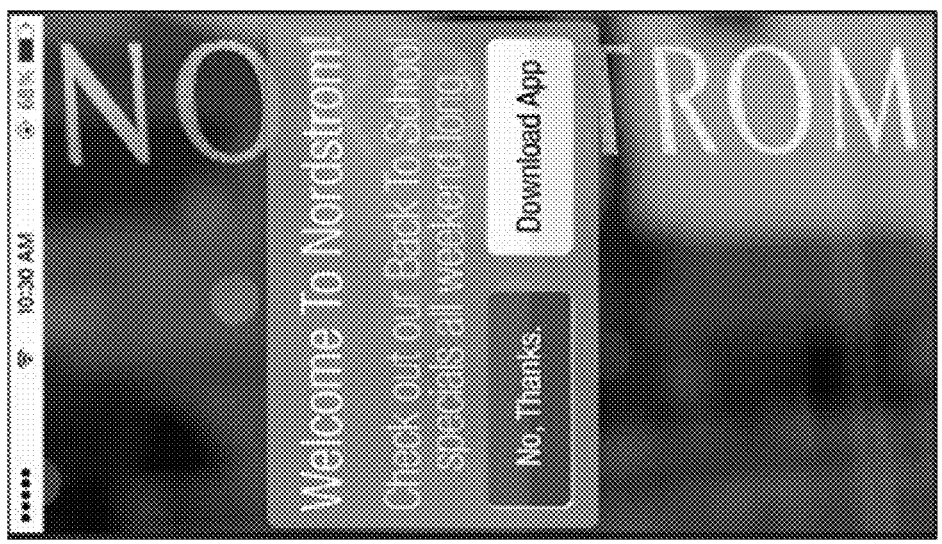

FIG. 22B illustrates exemplary user interfaces for on-site communication in accordance with one embodiment. In one embodiment, the user may be prompted with a message asking whether to download the communication application described herein when the user is at or near a commercial partner of the communication system provider of the current disclosure. In the first (left) example, the user is prompted with a welcoming conversation item or thread to Nordstrom when the user has arrived at one of its stores. In the second (right) example, the user is prompted with a promotional conversation item or thread from Nordstrom when the user has arrived at one of its stores. In one embodiment, the user may download the application associated with the current disclosure of communication system. Once the user downloads the application, further on-site communication may proceed as described below in connection with FIG. 22C.

Figure 22C:
FIG. 22C is an illustration of on-site communication in accordance with one embodiment.

FIG. 22C is an illustration of on-site communication in accordance with one embodiment. In one embodiment, at various locations of a merchant's store are the on-site information devices 130 (FIG. 1). In this example, at location 1 of the store, information regarding a personal stylist is provided to the user near the first on-site information device. At location 2 of the store, promotional information relevant to the section of the store ("Designer Slacks") is communicated to the user through the downloaded application. At location 3 of the store, promotional information relevant to that section of the store ("brand name dresses") is communicated to the user through the downloaded application. On-site information devices 130 (FIG. 1) and their communication with the client device 110 (FIG. 1) and others in the disclosed system is described in detail in connection with FIG. 1.

Figure 23:
FIG. 23 illustrates exemplary user interfaces for managing promotional information in accordance with one embodiment.

FIG. 23 illustrates exemplary user interfaces for managing promotional information in accordance with one embodiment. In one embodiment, a merchant/user who already established a communication thread with the customer/user may communicate promotional information to the customer/user. Promotional information may include coupons, discount information, QR codes, gift cards, or any other commercial offers or deals. If the customer/user does not wish to receive offer information or want to pause receiving such information, the customer/user may pause the conversation thread as illustrated in FIG. 23. Pausing a conversation thread containing promotional materials may be substantially similar to pausing a conversation thread as described in connection with FIGS. 9-11.

Figure 24:
FIG. 24 is an exemplary user interface for managing user privacy in accordance with one embodiment.

FIG. 24 is an exemplary user interface for managing user privacy in accordance with one embodiment. In one embodiment, the system may assign a unique ID for a new user or a new contact, and when two or more users communicate through the disclosed system, the users need not share any personal information. In one embodiment, the user may be given options to hide personal information including biographical information, cell phone number, e-mail address, and home or work address.

One non-limiting advantage of the described aspects is real-time contextual public directory management. The user may further curate the user's listing in the dynamic directory to reflect the user's current status and interests and limit persistence of past, irrelevant information.

Another non-limiting advantage of the described aspects is personalized private contact directory management. The user may add or remove descriptions of the user's contacts and the user's communication threads to organize and facilitate search of the user's own directory available exclusively to the user.

Another non-limiting advantage of the described aspect is communications and privacy management. The user may prescribe rules to a communications or conversation thread to restrict reply, viewing of recipients, or adding new participants. The user may further pause, snooze, or globally (system-wide) delete an existing (or user-created) communication or conversation thread so that the user may reduce disturbances from constant communications and control user-created communications threads.

The attached Appendix A illustrates possible implementations of one or more of the features described.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a specially configured digital communication processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Some implementations may include a microprocessor, but in the alternative, the digital communication processor may be a commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

The interfaces shown represent example implementations of a tangible device configured to perform one or more of the features described. The interface elements may be implemented via the execution of machine readable instructions to generate a graphical representation of the interface on a device. The graphical representation may be, for example, a machine readable mark-up language (e.g., HTML), executable machine readable instructions (e.g., Javascript), or combinations of these or other display technologies. In some implementations, the interface may be constructed of physical components such as buttons, circuits, lights, and the like. The interface components may be controlled by a circuit configured to implement the methods described above. In some implementations, it may be desirable to control the interface components via a processor configured to execute stored instructions which cause the interface components to perform aspects of the methods described.

As used herein, the terms "display" or "displaying" encompass a variety of actions. For example, "displaying" may include presenting in audio form, visual form, or some other form that can be made known to the senses. The term may also include a combination of two or more of the foregoing.

As used herein, the terms "determine" or "determining" encompass a variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed/transmitted/stored/received/etc. in multiple parts.

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrequited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; and use of terms like 'preferably,' 'preferred,' 'desired,' or 'desirable,' and words of similar meaning should not be understood as implying that certain features are critical, essential, or even important to the structure or function, but instead as merely intended to highlight alternative or additional features that may or may not be utilized in a particular embodiment. In addition, the term "comprising" is to be interpreted synonymously with the phrases "having at least" or "including at least". When used in the context of a process, the term "comprising" means that the process includes at least the recited steps, but may include additional steps. When used in the context of a system or device, the term "comprising" means that the system or device includes at least the recited features or components, but may also include additional features or components. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A communication device comprising:
    an access controller configured to:
        receive credentials from a sender device of a user account; and
        provide access to the user account based on the received credentials;
    a contact manager configured to, for an accessed user account:
        receive contact information for a contact, the contact information including a contact identifier, a public descriptor, and a private descriptor, wherein the public descriptor is received from a central contact directory and the private descriptor is provided by the user account, wherein the private descriptor is searchable only for a search request for the user account; and
        transmit a public user account descriptor to the central contact directory, the public user account descriptor including information for the user account, the information being searchable during searches submitted by other users;
    a search engine configured to:
        receive a search string from the sender device of the user account; and
        compare the search string to at least one of the public descriptor for the contact and the private descriptor for the contact to identify the contact;
    a conversation module configured to:
        receive an identifier for the identified contact;
        receive content to be transmitted to a receiver device of the identified contact; and
        communicate the content between the user account and the identified contact based at least in part on a conversation rule; and
    a transaction module configured to consummate a transaction between the user and one or more identified contacts based on content communicated between the user account and the identified contact.

2. The communication device of claim 1, wherein the conversation module is further configured to receive the conversation rule, wherein the conversation rule identifies:
    available response actions to respond to the content;
    a receipt time period identifying a period of time the content may be accessed; and
    a response time period identifying a period of time during which an associated response action may be taken.

3. The communication device of claim 1, wherein at least one of the public descriptor or the private descriptor include location information, wherein the search engine is further configured to:
    receive device location information; and
    compare the device location information to the location information included in the at least one of the public descriptor for the contact and the private descriptor for the contact to identify the contact.

4. A communication server comprising:
    an account manager configured to receive user account information including credentials;
    a tag manager configured to receive public descriptors and private descriptors for a user account;
    a search engine configured to receive and execute search requests, wherein execution of a search request for the user account includes consideration of the public descriptor for the user account, and wherein execution of the search request from the user account includes consideration of the private descriptors for the user account; and
    a conversation module configured to receive and transmit content between user accounts based at least in part on a conversation request, the conversation request identifying:
        the content, and
        users to receive the content; and
    a transaction module configured to consummate a transaction between the user account and one or more of the users to receive the content based on the content transmitted between the user account and the one or more of the users.

5. The communication server of claim 4 wherein the conversation request further includes a conversation rule, the conversation rule identifying:
   available response actions to respond to the content, the response actions including a transaction;
   a receipt time period identifying a period of time the content may be accessible by the users; and
   a response time period identifying a period of time users may take an associated response action,
   wherein the content is received and transmitted using the conversation rule.

6. A computer-implemented method for bidirectional searching, the method comprising:
   under control of one or more computing devices configured with specific computer-executable instructions,
      receiving a request to create a public account descriptor for a user account based on one or more strings;
      generating the public account descriptor based on the one or more strings;
      associating the public account descriptor to the user account, wherein said associating of the public account descriptor is a factor for a public search;
      receiving another request to create a private descriptor based on another one or more strings;
      generating the private descriptor based on the another one or more strings;
      associating the private descriptor to a contact of the user account, wherein said associating of the private descriptor is a factor for a private search;
      receiving a search string from a requestor device;
      comparing the search string to at least one of the public descriptor for the user account and the private descriptor for the user account to identify the user account;
      transmitting content between user accounts based at least in part on a conversation request, the conversation request identifying:
         the content, and
         users to receive the content; and
      consummating a transaction between the user account and one or more of the users to receive the content based on the content transmitted between the user account and the one or more of the users.

7. The computer-implemented method of claim 6, wherein the public account descriptor is viewable by a user who is not associated with the user account, and wherein the private account descriptor is viewable only by a user of the user account.

8. The computer-implemented method of claim 6, wherein the public search comprises a search for one or more public account descriptors, and wherein the private search comprises a search for one or more private account descriptors.

9. The computer-implemented method of claim 6, further comprising:
   receiving a request to remove at least one of the public descriptor or the private descriptor; and
   dissociating the at least one of the public descriptor or the private descriptor from the user account.

10. The computer-implemented method of claim 6, further comprising:
    receiving a request to create a communication thread between a plurality of users; and
    generating the communication thread.

11. The computer-implemented method of claim 10, further comprising applying one or more filters of at least one of the plurality of users, wherein the communication thread is not provided to the at least one of the plurality of users if a value in the communication thread matches an applied filter.

12. The computer-implemented method of claim 10, further comprising:
    receiving a request to restrict the communication thread between a plurality of users; and
    restricting the communication thread based on the request to restrict,
    wherein the request to restrict comprises at least one of:
       limiting an addition of users to the communication thread;
       restricting a view of a recipient list for the communication thread; and
       restricting users permitted to reply to the communication thread.

13. The computer-implemented method of claim 10, further comprising:
    receiving a request to create a public communication descriptor for the communication thread based on a string input;
    creating the public communication descriptor based on the string input; and
    associating the public communication descriptor to the communication thread.

14. The computer-implemented method of claim 10, further comprising:
    receiving a request to pause the communication thread from a device associated with a requesting user account; and
    pausing transmission of information for the communication thread devices associated with the requesting user account.

15. A bidirectionally guided directory system, the system comprising:
    a user directory of user accounts, the user directory identifying a first association of a public descriptor to a user account, the user directory further identifying a second association of a private descriptor to a contact of the user account;
    a content directory identifying available content items, each available content item associated with another public descriptor; and
    a search engine configured to:
       receive a search request transmitted from a client device associated with the user account, the search request including a descriptor;
       search the content directory and the user directory based on the received search request, wherein the search of the user directory is based on a comparison of the descriptor included in the search request with the private and public descriptors associated with the requesting user account; and
       transmit a search result including at least an identifier for a user account or a content item matching the search request;
    a communication module configured to:
       receive a communication request from a requesting device, the communication request including the identifier of the user account or the content item, and
       initiate a communication session between the requesting device and a device of the user account or the content item; and
    a transaction module configured to consummate a transaction between the requesting device and the device of the user account or the content item based on the content item transmitted between the requesting device and the device of the user account or the content item.

16. The bidirectionally guided directory system if claim 15, wherein the communication request includes a second identifier for another user account or another content item, and wherein the communication module is further configured to initiate the communication session between the requesting device and another device of the another user account or another content item, wherein the user account or the content item are not identified to the another user account or another content item.

* * * * *